United States Patent
Rahman et al.

(10) Patent No.: US 10,200,103 B2
(45) Date of Patent: Feb. 5, 2019

(54) METHOD AND APPARATUS TO ENABLE MULTI-RESOLUTION CSI REPORTING IN ADVANCED WIRELESS COMMUNICATION SYSTEMS

(71) Applicant: Samsung Electronics Co., Ltd, Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/796,584

(22) Filed: Oct. 27, 2017

(65) Prior Publication Data

US 2018/0145737 A1    May 24, 2018

Related U.S. Application Data

(60) Provisional application No. 62/426,099, filed on Nov. 23, 2016, provisional application No. 62/444,101, filed on Jan. 9, 2017, provisional application No. 62/447,668, filed on Jan. 18, 2017, provisional application No. 62/504,645, filed on May 11, 2017, provisional application No. 62/538,636, filed on Jul. 28, 2017, provisional application No. 62/539,865, filed on Aug. 1, 2017, provisional application No. 62/543,115, filed on Aug. 9, 2017, provisional application No. 62/543,447, filed on Aug. 10, 2017.

(51) Int. Cl.
     *H04B 7/06*    (2006.01)

(52) U.S. Cl.
     CPC ......... *H04B 7/0626* (2013.01); *H04B 7/0634* (2013.01)

(58) Field of Classification Search
     CPC ........................... H04B 7/0626; H04B 7/0634
     See application file for complete search history.

(56) References Cited

U.S. PATENT DOCUMENTS

| | | | |
|---|---|---|---|
| 9,088,323 B2* | 7/2015 | Park ..................... | H04B 7/0486 |
| 2011/0249763 A1* | 10/2011 | Tosato ................. | H04B 7/0626 |
| | | | 375/260 |
| 2014/0254508 A1* | 9/2014 | Krishnamurthy .... | H04B 7/0417 |
| | | | 370/329 |
| 2016/0072562 A1 | 3/2016 | Onggosanusi et al. | |

(Continued)

OTHER PUBLICATIONS

"Forward," 3GPP TS 36.211 V14.2.0, Release 14, Mar. 2017, pp. 8-196.

(Continued)

*Primary Examiner* — Vineeta S Panwalkar

(57) ABSTRACT

A method of user equipment (UE) for channel state information (CSI) feedback in a wireless communication system. The method comprises receiving, from a base station (BS), CSI feedback configuration information for a pre-coding matrix indicator (PMI) feedback indicating a linear combination (LC) pre-coding matrix that corresponds to a linear combination of a plurality of L beams and a plurality of coefficients, determining the first PMI ($i_1$) and the second PMI ($i_2$), and transmitting, to the BS, the CSI feedback including the first PMI ($i_1$) and the second PMI ($i_2$) over an uplink channel.

20 Claims, 14 Drawing Sheets

(56) References Cited

U.S. PATENT DOCUMENTS

2016/0142117 A1 5/2016 Rahman et al.
2016/0218791 A1 7/2016 Ko et al.

OTHER PUBLICATIONS

"3rd Generation Partnership Project; Technical Specification Group Radio Access Network; Evolved Universal Terrestrial Radio Access (E-UTRA); Multiplexing and Channel Coding (Release 14)" 3GPP TS 36.212, V14.2.0, Mar. 2017, 197 pages.
"3rd Generation Partnership Project; Technical Specification Group Radio Access Network; Evolved Universal Terrestrial Radio Access (E-UTRA); Physical Layer Procedures (Release 14)" 3GPP TS 36.213, V14.2.0, Mar. 2017, 7 pages.
"Forward," 3GPP TS 36.213 V14.2.0, Release 14, Mar. 2017, pp. 8-49.
"Random Access Procedure," 3GPP TS 36.213, V14.2.0, Release 14, Mar. 2017, pp. 50-302.
"Physical Uplink Control Channel Procedures," 3GPP TS 36.213, V14.2.0, Release 14, Mar. 2017, pp. 303-384.
"UE Procedures Related to Sidelink," 3GPP TS 36.213, V14.2.0, Release 14, Mar. 2017, pp. 385-441.
"Annex A (informative): Change History," 3GPP TS 36.213, V14.2.0, Release 14, Mar. 2017, pp. 442-454.
"3rd Generation Partnership Project; Technical Specification Group Radio Access Network; Evolved Universal Terrestrial Radio Access (E-UTRA); Medium Access Control (MAC) Protocol Specification (Release 14)" 3GPP TS 36.321, V14.2.0, Mar. 2017, 106 pages.
"3rd Generation Partnership Project; Technical Specification Group Radio Access Network; Evolved Universal Terrestrial Radio Access (E-UTRA); Radio Resource Control (RRC) Protocol Specification (Release 14)" 3GPP TS 36.331, V14.2.0, Mar. 2017, 106 pages.
"3rd Generation Partnership Project; Technical Specification Group Services and System Aspects; Feasibility Studyon New Services and Markets Technology Enablers; Stage 1 (Release 14)" 3GPP TR 22.891, V1.2.0, Nov. 2015, 36 pages.
International Search Report dated Mar. 20, 2018 in connection with International Patent Application No. PCT/KR2017/013354.
Ericsson, "Wideband vs. Subband Amplitude Feedback", 3GPP TSG-RAN WG1 #87, 7 Pages, R1-1612663.
ZTE et al., "Feedback mechanism for linear combination based CSI", 3GPP TSG RAN WG1 Meeting #86bis, Oct. 14-18, 2016, 4 pages, R1-1611427.

* cited by examiner

METHOD AND APPARATUS TO ENABLE MULTI-RESOLUTION CSI REPORTING IN ADVANCED WIRELESS COMMUNICATION SYSTEMS

CROSS-REFERENCE TO RELATED APPLICATIONS AND CLAIM OF PRIORITY

The present application claims priority to U.S. Provisional Patent Application Ser. No. 62/426,099, filed on Nov. 23, 2016; U.S. Provisional Patent Application Ser. No. 62/444, 101, filed on Jan. 9, 2017; U.S. Provisional Patent Application Ser. No. 62/447,668, filed on Jan. 18, 2017; U.S. Provisional Patent Application Ser. No. 62/504,645, filed on May 11, 2017; U.S. Provisional Patent Application Ser. No. 62/538,636, filed on Jul. 28, 2017; U.S. Provisional Patent Application Ser. No. 62/539,865, filed on Aug. 1, 2017; U.S. Provisional Patent Application Ser. No. 62/543,115, filed on Aug. 9, 2017; and U.S. Provisional Patent Application Ser. No. 62/543,447, filed on Aug. 10, 2017. The content of the above-identified patent document is incorporated herein by reference.

TECHNICAL FIELD

The present application relates generally to CSI reporting operation in advanced communication systems. More specifically, this disclosure relates to linear combination pre-coding matrix indicator (PMI) codebook based CSI reporting in wireless communication systems.

BACKGROUND

5th generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While all the requirements need not be met simultaneously, the design of 5G networks may provide flexibility to support various applications meeting part of the above requirements on a use case basis.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide an advanced CSI reporting based on linear combination codebook for MIMO wireless communication systems.

In one embodiment, a user equipment (UE) for channel state information (CSI) feedback in a wireless communication system is provided. The UE comprises a transceiver configured to receive, from a base station (BS), CSI feedback configuration information for a pre-coding matrix indicator (PMI) feedback indicating a linear combination (LC) pre-coding matrix that corresponds to a linear combination of a plurality of L beams and a plurality of coefficients, wherein: each of the plurality of coefficients comprises at least an amplitude coefficient and a phase coefficient, and the PMI comprises a first PMI ($i_1$) and a second PMI ($i_2$) indicating wideband (WB) and subband (SB) components of the LC pre-coding matrix, respectively, wherein: the first PMI ($i_1$) includes a first set and a second set of indicators indicating common WB components for all layers of a plurality of layers and independent WB components for each layer of the plurality of layers, respectively, the second PMI ($i_2$) includes a set of indicators indicating independent SB components for each layer of the plurality of layers, and the plurality of layers is determined based on a value v associated with a rank indicator (RI); and at least one processor configured to determine the first PMI ($i_1$) and the second PMI ($i_2$), wherein the transceiver is further configured to transmit, to the BS, the CSI feedback including the first PMI ($i_1$) and the second PMI ($i_2$) over an uplink channel.

In another embodiment, a method of user equipment (UE) for channel state information (CSI) feedback in a wireless communication system is provided. The method comprises receiving, from a base station (BS), CSI feedback configuration information for a pre-coding matrix indicator (PMI) feedback indicating a linear combination (LC) pre-coding matrix that corresponds to a linear combination of a plurality of L beams and a plurality of coefficients, wherein: each of the plurality of coefficients comprises at least an amplitude coefficient and a phase coefficient, and the PMI comprises a first PMI ($i_1$) and a second PMI ($i_2$) indicating wideband (WB) and subband (SB) components of the LC pre-coding matrix, respectively, wherein: the first PMI ($i_1$) includes a first set and a second set of indicators indicating common WB components for all layers of a plurality of layers and independent WB components for each layer of the plurality of layers, respectively, the second PMI ($i_2$) includes a set of indicators indicating independent SB components for each layer of the plurality of layers, and the plurality of layers is determined based on a value associated with a rank indicator (RI); determining the first PMI ($i_1$) and the second PMI ($i_2$); and transmitting, to the BS, the CSI feedback including the first PMI ($i_1$) and the second PMI ($i_2$) over an uplink channel.

In yet another embodiment, a base station (BS) for channel state information (CSI) feedback in a wireless communication system is provided. The BS comprises a transceiver configured to transmit, to a user equipment (UE), CSI feedback configuration information for a pre-coding matrix indicator (PMI) feedback indicating a linear combination (LC) pre-coding matrix that corresponds to a linear combination of a plurality of L beams and a plurality of coefficients, wherein: each of the plurality of coefficients comprises at least one of an amplitude coefficient and a phase coefficient, and the PMI comprises a first PMI ($i_1$) and a second PMI ($i_2$) indicating a wideband (WB) and subband (SB) components of the LC pre-coding matrix, respectively, wherein: the first PMI ($i_1$) includes a first set and a second set of indicators indicating common WB components for all layers of a plurality of layers and independent WB components for each layer of the plurality of layers, respectively, the second PMI ($i_2$) includes a set of indicators indicating independent SB components for each layer of the plurality of layers, and the plurality of layers is determined based on a value v associated with a rank indicator (RI); and at least one processor configured to reconstruct the LC pre-coding matrix indicated by the first PMI ($i_1$) and the second PMI ($i_2$), wherein the transceiver is further configured to receive, from the UE, the CSI feedback including the first PMI ($i_1$) and the second PMI ($i_2$) over an uplink channel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v14.2.0, "E-UTRA, Physical channels and modulation (REF 1);" 3GPP TS 36.212 v14.2.0, "E-UTRA, Multiplexing and Channel coding; (REF 2);" 3GPP TS 36.213 v14.2.0, "E-UTRA, Physical Layer Procedures (REF 3);" 3GPP TS 36.321 v14.2.0, "E-UTRA, Medium Access Control (MAC) protocol specification (REF 4);" 3GPP TS 36.331 v14.2.0, "Radio Resource Control (RRC) Protocol Specification (REF 5);" and 3GPP TR 22.891 v1.2.0, "Technical Specification Group Services and System Aspects; Feasibility Study on New Services and Markets Technology; Enablers; Stage 1; (Release 14)."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
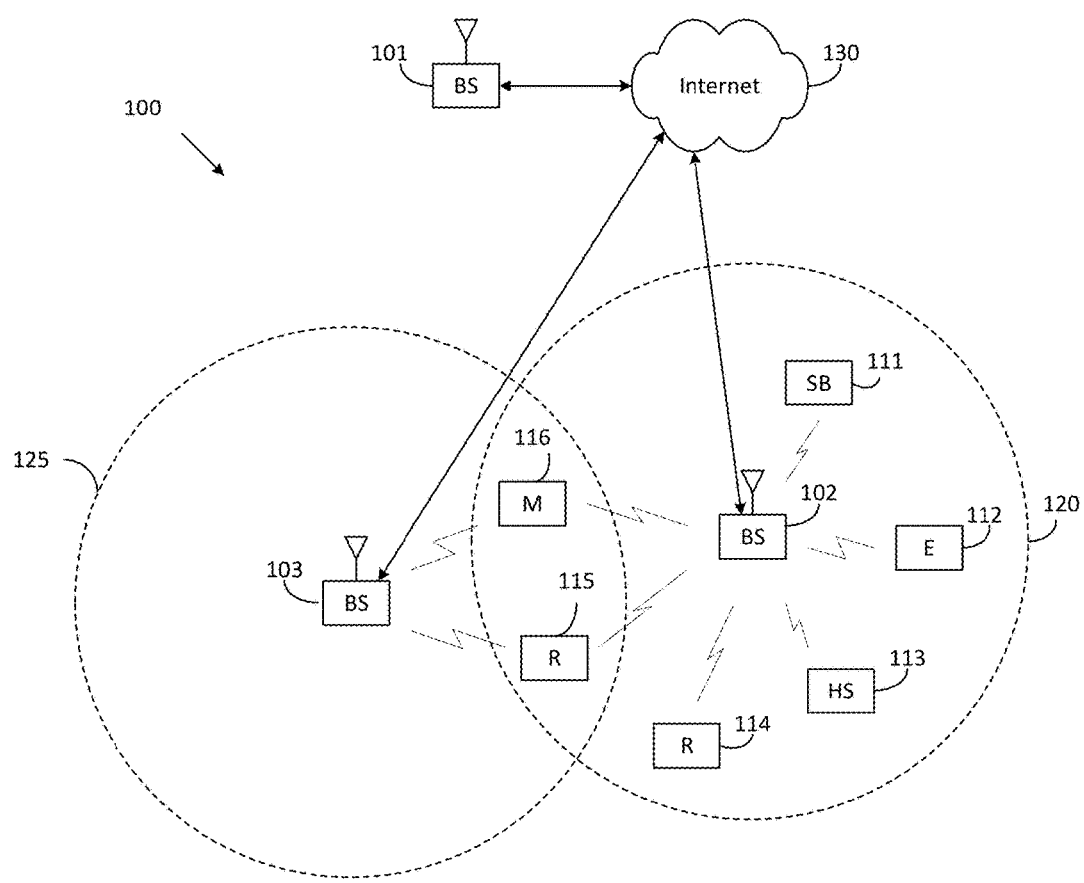
FIG. 1 illustrates an example wireless network according to embodiments of the present disclosure.
Figure 2:
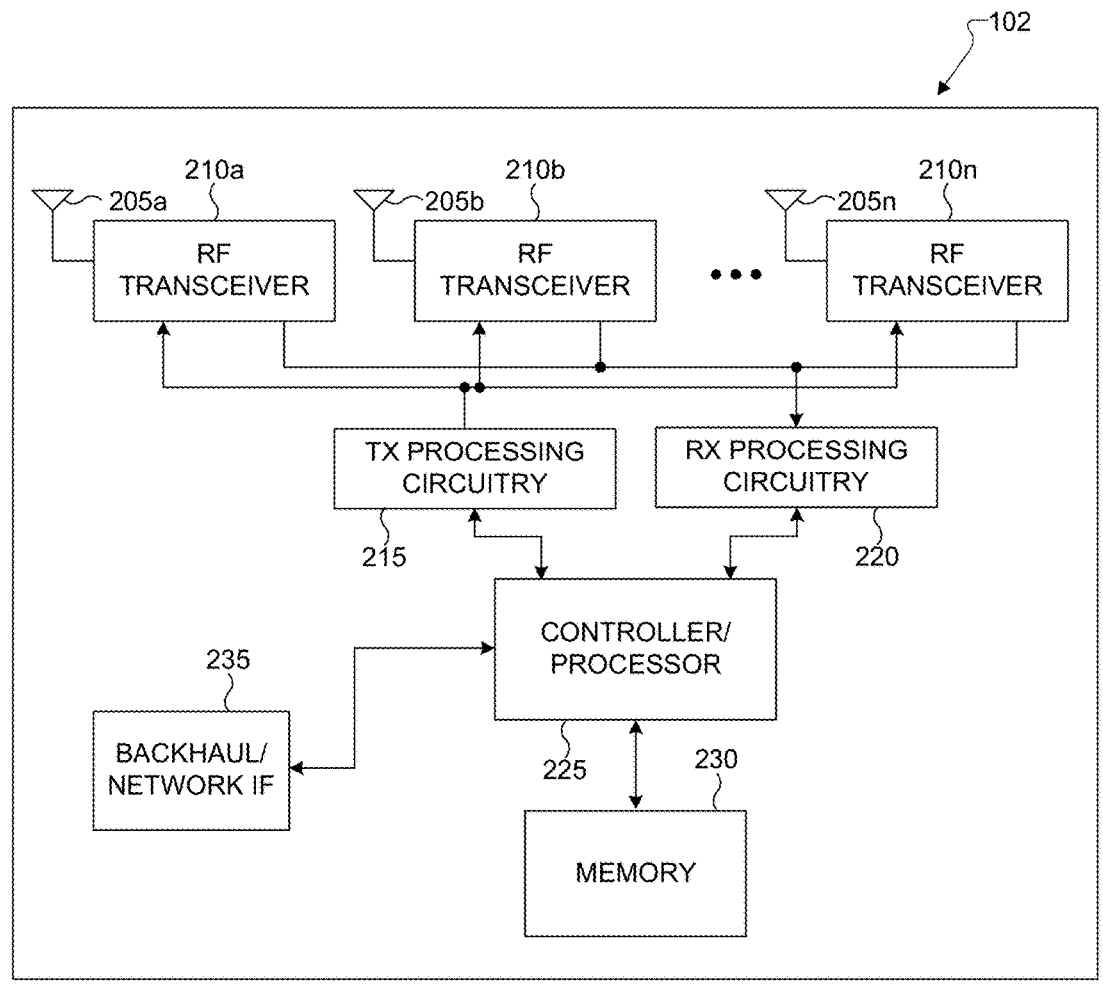
FIG. 2 illustrates an example eNB according to embodiments of the present disclosure.
Figure 3:
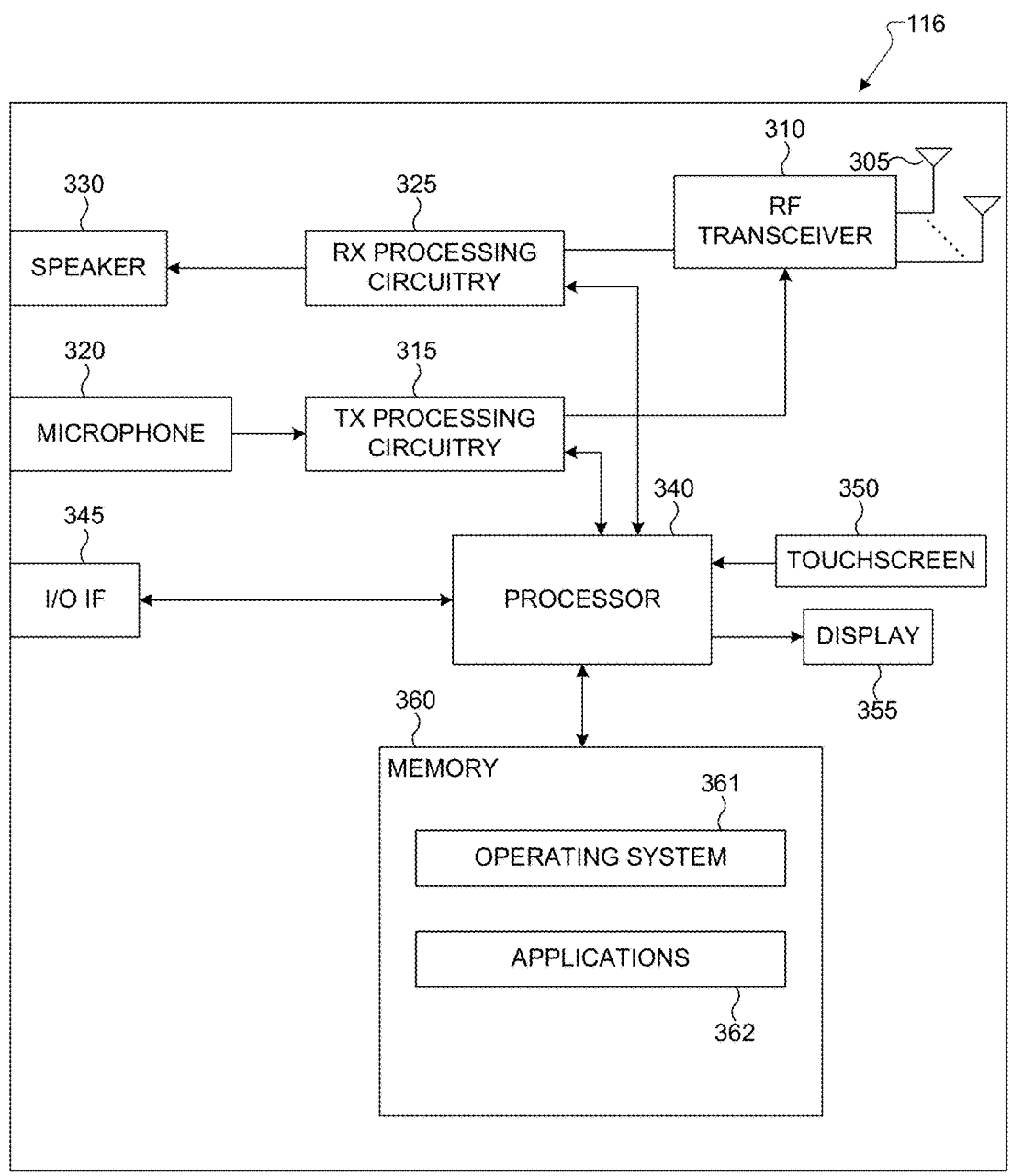
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a subband (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient CSI reporting on PUCCH in an advanced wireless communication system. In certain embodiments, and one or more of the eNBs 101-103 includes circuitry, programming, or a combination thereof, for receiving efficient CSI reporting on PUCCH in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceiver 210a-201n is capable of transmitting, to a user equipment (UE), CSI feedback configuration information for a pre-coding matrix indicator (PMI) feedback indicating a linear combination (LC) pre-coding matrix that corresponds to a linear combination of a plurality of L beams and a plurality of coefficients.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving, from a base station (BS), CSI feedback configuration information for a pre-coding matrix indicator (PMI) feedback indicating a linear combination (LC) pre-coding matrix that corresponds to a linear combination of a plurality of L beams and a plurality of coefficients.

In some embodiments, the RF transceiver 310 is capable of transmitting, to the BS, the CSI feedback including the first PMI ($i_1$) and the second PMI ($i_2$) over an uplink channel.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

In some embodiments, the processor 340 is also capable of determining the first PMI ($i_1$) and the second PMI ($i_2$).

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
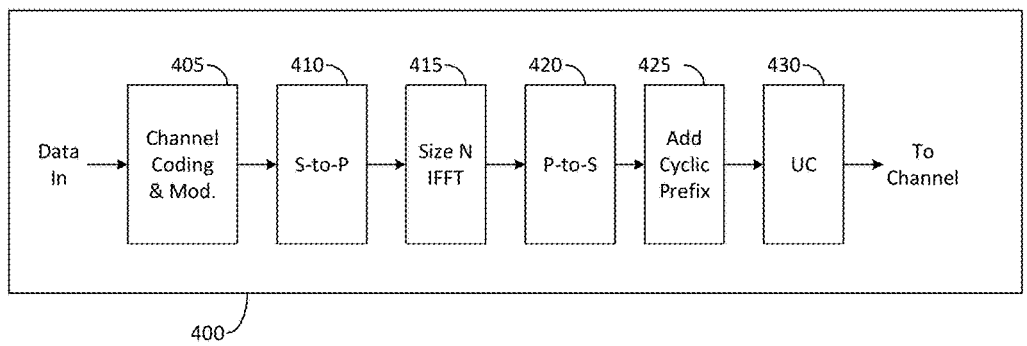
FIG. 4A illustrates an example high-level diagram of an orthogonal frequency division multiple access transmit path according to embodiments of the present disclosure.
Figure 4B:
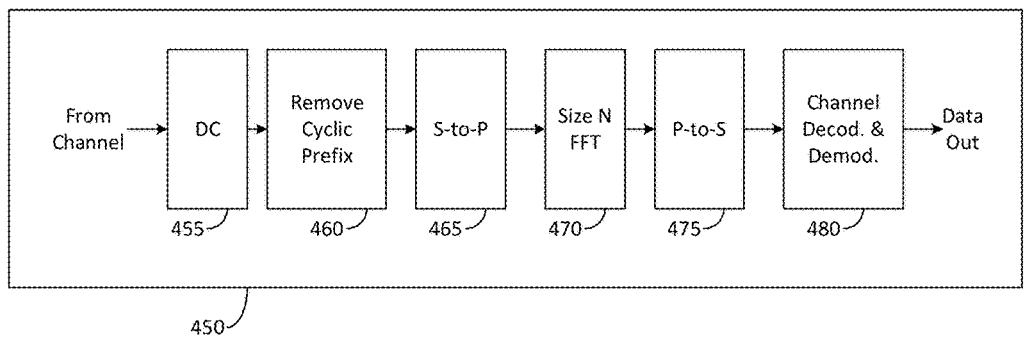
FIG. 4B illustrates an example high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It will be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It will be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Various embodiments of the present disclosure provides for a high-performance, scalability with respect to the number and geometry of transmit antennas, and a flexible CSI feedback (e.g., reporting) framework and structure for LTE enhancements when FD-MIMO with large two-dimensional antenna arrays is supported. To achieve high performance, more accurate CSI in terms MIMO channel is needed at the eNB especially for FDD scenarios. In this case, embodiments of the present disclosure recognize that the previous LTE specification precoding framework (PMI-based feedback) may need to be replaced. In this disclosure, properties of FD-MIMO are factored in for the present disclosure. For example, the use of closely spaced large 2D antenna arrays that is primarily geared toward high beamforming gain rather than spatial multiplexing along with relatively small angular spread for each UE. Therefore, compression or dimensionality reduction of the channel feedback in accordance with a fixed set of basic functions and vectors may be achieved. In another example, updated channel feedback parameters (e.g., the channel angular spreads) may be obtained at low mobility using UE-specific higher-layer signaling. In addition, a CSI reporting (feedback) may also be performed cumulatively.

Another embodiment of the present disclosure incorporates a CSI reporting method and procedure with a reduced PMI feedback. This PMI reporting at a lower rate pertains to long-term DL channel statistics and represents a choice of a group of precoding vectors recommended by a UE to an eNB. The present disclosure also includes a DL transmission scheme wherein an eNB transmits data to a UE over a plurality of beamforming vectors while utilizing an open-loop diversity scheme. Accordingly, the use of long-term precoding ensures that open-loop transmit diversity is applied only across a limited number of ports (rather than all the ports available for FD-MIMO, e.g., 64). This avoids having to support excessively high dimension for open-loop transmit diversity that reduces CSI feedback overhead and improves robustness when CSI measurement quality is questionable.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

In LTE technologies, a time interval X which can contain one or more of the DL transmission part, guard, UL transmission part, and a combination of thereof regardless of they are indicated dynamically and/or semi-statically. Furthermore, in one example, the DL transmission part of time interval X contains downlink control information and/or downlink data transmissions and/or reference signals. In another example, the UL transmission part of time interval X contains uplink control information and/or uplink data transmissions and/or reference signals. In addition, the usage of DL and UL does not preclude other deployment scenarios e.g., sidelink, backhaul, relay). In some embodiments of the current disclosure, "a subframe" is another name to refer to "a time interval X," or vice versa. In order for the 5G network to support these diverse services are called network slicing.

In some embodiments, "a subframe" and "a time slot" can be used interchangeably. In some embodiments, "a subframe" refers to a transmit time interval (TTI), which may comprise an aggregation of "time slots" for UE"s data transmission/reception.

Figure 5:
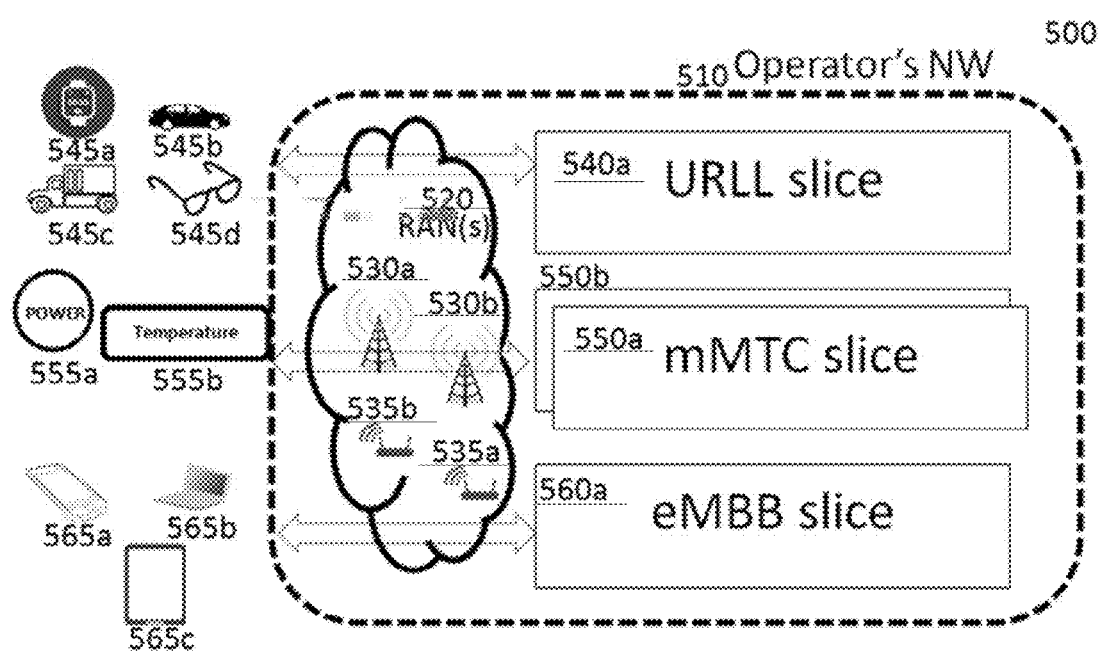
FIG. 5 illustrates an example network slicing according to embodiments of the present disclosure.

FIG. 5 illustrates a network slicing 500 according to embodiments of the present disclosure. An embodiment of the network slicing 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

As shown in FIG. 5, the network slicing 500 comprises an operator's network 510, a plurality of RANS 520, a plurality of eNBs 530a, 530b, a plurality of small cell base stations 535a, 535b, a URLL slice 540a, a smart watch 545a, a car 545b, a, truck 545c, a smart glasses 545d, a power 555a, a temperature 555b, an mMTC slice 550a, an eMBB slice 560a, a smart phone (e.g., cell phones) 565a, a laptop 565b, and a tablet 565c (e.g., tablet PCs).

The operator's network 510 includes a number of radio access network(s) 520 RAN(s)—that are associated with network devices, e.g., eNBs 530a and 530b, small cell base stations (femto/pico eNBs or Wi-Fi access points) 535a and 535b, etc. The operator's network 510 can support various services relying on the slice concept. In one example, four slices, 540a, 550a, 550b and 560a, are supported by the network. The URLL slice 540a to serve UEs requiring URLL services, e.g., cars 545b, trucks 545c, smart watches 545a, smart glasses 545d, etc. Two mMTC slices 550a and 550b serve UEs requiring mMTC services such as power meters and temperature control (e.g., 555b), and one eMBB slice 560a requiring eMBB serves such as cells phones 565a, laptops 565b, tablets 565c.

In short, network slicing is a method to cope with various different qualities of services (QoS) in the network level. For supporting these various QoS efficiently, slice-specific PHY optimization may also be necessary. Devices 545a/b/c/d, 555a/b are 565a/b/c examples of user equipment (UE) of different types. The different types of user equipment (UE) shown in FIG. 5 are not necessarily associated with particular types of slices. For example, the cell phone 565a, the laptop 565b and the tablet 565c are associated with the eMBB slice 560a, but this is just for illustration and these devices can be associated with any types of slices.

In some embodiments, one device is configured with more than one slice. In one embodiment, the UE, (e.g., 565a/b/c) is associated with two slices, the URLL slice 540a and the eMBB slice 560a. This can be useful for supporting online gaming application, in which graphical information are transmitted through the eMBB slice 560a, and user interaction related information are exchanged through the URLL slice 540a.

In the current LTE standard, no slice-level PHY is available, and most of the PHY functions are utilized slice-agnostic. A UE is typically configured with a single set of PHY parameters (including transmit time interval (TTI) length, OFDM symbol length, subcarrier spacing, etc.), which is likely to prevent the network from (1) fast adapting to dynamically changing QoS; and (2) supporting various QoS simultaneously.

In some embodiments, corresponding PHY designs to cope with different QoS with network slicing concept are disclosed. It is noted that "slice" is a terminology introduced just for convenience to refer to a logical entity that is associated with common features, for example, numerology, an upper-layer (including medium access control/radio resource control (MAC/RRC)), and shared UL/DL time-frequency resources. Alternative names for "slice" include virtual cells, hyper cells, cells, etc.

Figure 6:
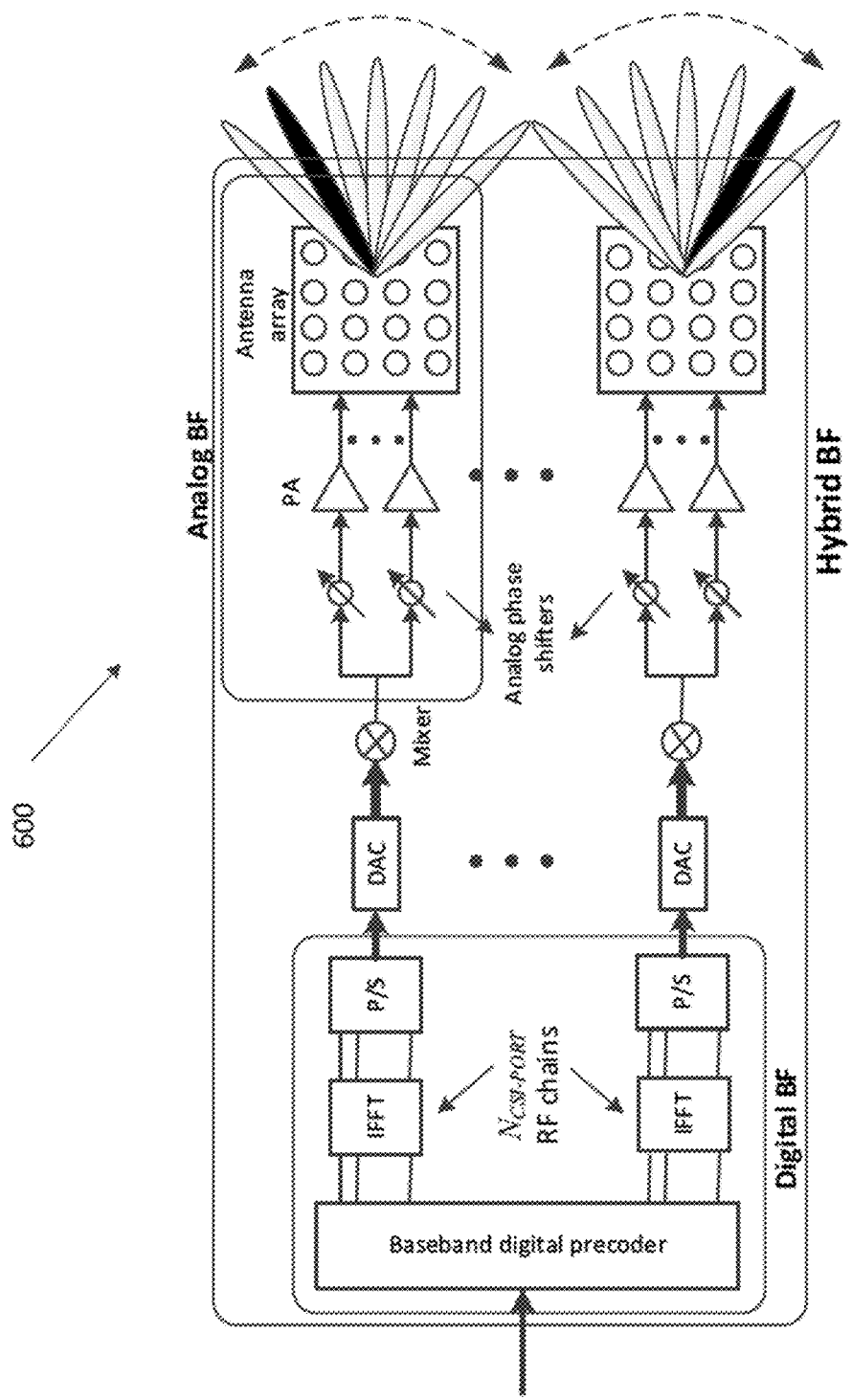
FIG. 6 illustrates an example number of digital chains according to embodiments of the present disclosure.

FIG. 6 illustrates an example number of digital chains 600 according to embodiments of the present disclosure. An embodiment of the number of digital chains 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6. In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase precoding gain. While analog beams are wideband (hence not frequency-selective), digital precoding can be varied across frequency sub-bands or resource blocks.

To enable digital precoding, an efficient design of CSI-RS is a crucial factor. For this reason, three types of CSI reporting mechanism corresponding to three types of CSI-RS measurement behavior are supported in LTE specification) "CLASS A" CSI reporting which corresponds to non-precoded CSI-RS, 2) "CLASS B" reporting with K=1 CSI-RS resource which corresponds to UE-specific beamformed CSI-RS, 3) "CLASS B" reporting with K>1 CSI-RS resources which corresponds to cell-specific beamformed CSI-RS.

For non-precoded (NP) CSI-RS, a cell-specific one-to-one mapping between CSI-RS port and TXRU is utilized. Here, different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (consisting of multiple ports). Here, (at least at a given time/frequency) CSI-RS ports have narrow beam widths and hence not cell wide coverage, and (at least from the eNB perspective) at least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of representation of the DL-long-term channel statistics). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In LTE specification for eFD-MIMO, MIMO has been identified as an essential feature in order to achieve high system throughput requirements and MIMO may continue to be the same in NR. One of the key components of a MIMO transmission scheme is the accurate CSI acquisition at the eNB (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, it can be acquired using the CSI-RS transmission from eNB, and CSI acquisition and feedback from UE. In legacy (up to LTE specification) FDD systems, the CSI feedback framework is "implicit" in the form of CQI/PMFRI (and CRI in the LTE specification) derived from a codebook assuming SU transmission from eNB. Because of the inherent SU assumption while deriving CSI, this implicit CSI feedback is inadequate for MU transmission.

Since future (e.g. NR) systems are likely to be more MU-centric, this SU-MU CSI mismatch may be a bottleneck in achieving high MU performance gains. Another issue with implicit feedback is the scalability with larger number of antenna ports at eNB. For large number of antenna ports, the codebook design for implicit feedback is quite complicated (for example, in the LTE specification, the total number of Class A codebooks=44), and the designed codebook is not guaranteed to bring justifiable performance benefits in practical deployment scenarios (for example, only a small percentage gain can be shown at the most). Realizing aforementioned issues, RAN1 has agreed to provide specification support to advanced CSI reporting in the LTE specification of eFD-MIMO, which, at the very least, can serve as a good starting point to design advanced CSI scheme in NR MIMO.

Figure 7:
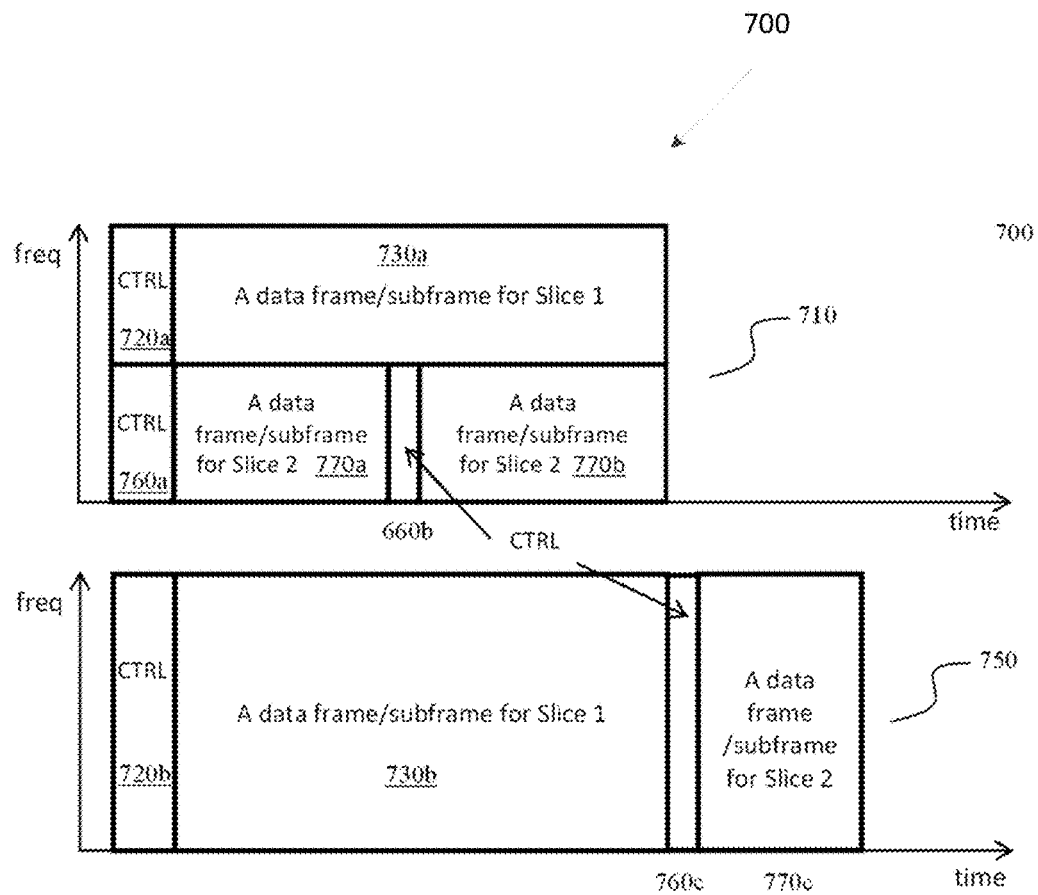
FIG. 7 illustrates an example multiplexing two slices according to embodiments of the present disclosure.

FIG. 7 illustrates an example multiplexing two slices 700 according to embodiments of the present disclosure. An embodiment of the multiplexing two slices 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

To utilize PHY resources efficiently and multiplex various slices (with different resource allocation schemes, numerologies, and scheduling strategies) in DL-SCH, a flexible and self-contained frame or subframe design is utilized. Two exemplary instances of multiplexing two slices within a common subframe or frame are depicted in FIG. 7. In FIG. 7, a slice can be composed of one or two transmission instances where one transmission instance consists of a control (CTRL) component (720*a*, 760*a*, 760*b*, 720*b*, and 760*c*) and a data component (730*a*, 770*a*, 770*b*, 730*b*, and 770*c*). In FIG. 7, the two slides (e.g., 710) are multiplexed in frequency domain whereas slices are multiplexed in time domain (e.g., 750).

Figure 8:
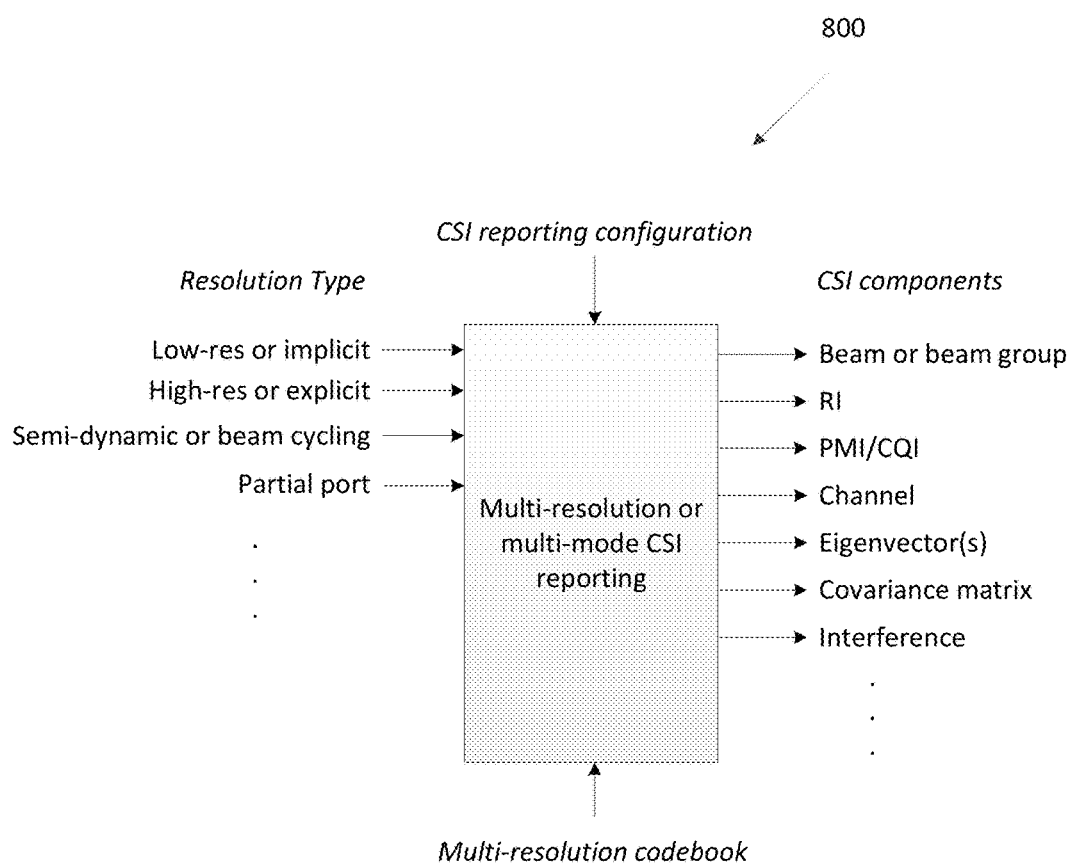
FIG. 8 illustrates an example CSI reporting framework according to embodiments of the present disclosure.

FIG. 8 illustrates an example CSI reporting framework 800 according to embodiments of the present disclosure. An embodiment of the CSI reporting framework 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

In the following, for brevity, both FDD and TDD are considered as the duplex method for both DL and UL signaling. Although exemplary descriptions and embodiments to follow assume orthogonal frequency division multiplexing (OFDM) or orthogonal frequency division multiple access (OFDMA), the present disclosure is can be extended to other OFDM-based transmission waveforms or multiple access schemes such as filtered OFDM (F-OFDM).

In some embodiments 0, a multi-resolution CSI reporting framework is supported in 5G or NR or future generation of communication systems, an illustration of which is shown in FIG. 8. In this framework, a UE receives a CSI reporting configuration about the CSI resolution or CSI type, for example, via higher-layer (e.g. RRC) or MAC layer (e.g. MAC CE) signalling. A few examples of CSI resolution or type include the following: low-res or implicit where PM/CQI/RI is reported using a codebook; high-res or explicit where a form of channel or/and interference is reported; semi-dynamic or beam cycling where a beam group is reported for pre-coder cycling; and partial port where the CSI corresponding to a subset of antenna ports is reported.

The UE may be configured with multiple CSI types or resolutions. For example, the UE may be configured with both high-res (or explicit) and partial port CSI reporting. According to the configuration, the UE reports explicit CSI for the partial antenna ports. Based on the configured CSI resolution(s) or type(s), the UE reports CSI which includes at least one or a combination of the following CSI components: beam index (BI) or beam group index (BGI); RI; PMI/CQI; channel; eigenvector(s); covariance matrix; and interference. The UE uses either a configured or a fixed multi-resolution codebook to report the CSI.

Such a framework provides more flexible CSI acquisition at gNB by supporting different use cases such as users with different CSI reporting capabilities (e.g. CSI resolution (implicit, explicit), number of ports (all-port, partial-port) etc.) and low to high mobility users (e.g. 0-500 kmph). In one example, a set (S1) of UEs may be capable of reporting implicit or low-resolution CSIs only and another set (S2) of UEs may be capable of reporting both low-res (e.g. codebook-based implicit CSI) and high-res (e.g. explicit channel reporting). An example of S1 is LTE UEs and an example of S2 is 5G or NR eMBB UEs. The gNB serving two types of UEs (S1 and S2) can use the proposed multi-resolution CSI reporting framework and configure a CSI reporting resolution to each UE depending on its CSI reporting capabilities. In another example, the set S1 of UEs may be low-mobility UEs and another set S2 of UEs may be high-mobility UEs. The gNB can then configure low-res CSI reporting to UEs in set S1 and semi-dynamic or beam cycling to UEs in set S2.

Figure 9:
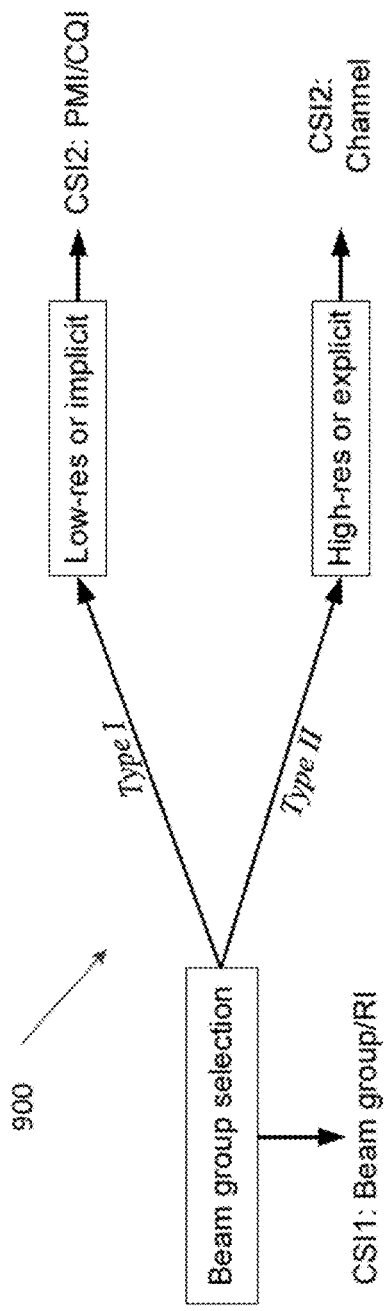
FIG. 9 illustrates an example dual-resolution CSI reporting framework according to embodiments of the present disclosure.

FIG. 9 illustrates an example dual-resolution CSI reporting framework 900 according to embodiments of the present disclosure. An embodiment of the dual-resolution CSI reporting framework 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

In some sub-embodiments 0, a dual-res or dual-type CSI reporting framework is shown in FIG. 9 in which the CSI has two components. The first CSI component (i.e., CSI 1) is common to both resolutions and indicates the selection of a beam group (comprising of L beams). CSI 1 may also include a rank indicator (i.e., RI) associated with the selected beam group. The second CSI component (i.e., CSI 2) is specific to the configured CSI reporting resolution.

In one example of Type I Low-resolution CSI reporting, CSI 2 is derived based implicit CSI reporting framework (e.g. LTE specification) and includes CSI components such as PMI/CQI. This CSI type can be configured to users who are not capable of reporting high-resolution (explicit) CSI or users who are scheduled for SU transmission. Also, this CSI reporting type can be the default CSI reporting type for all NR UEs.

In another example of Type II High-resolution CSI reporting CSI 2 is derived to report a form of quantized DL channel explicitly in order to facilitate more accurate CSI to the eNB. This CSI type can be configured to users who are capable of reporting high-resolution CSI or/and can be scheduled for MU transmission.

Figure 10:
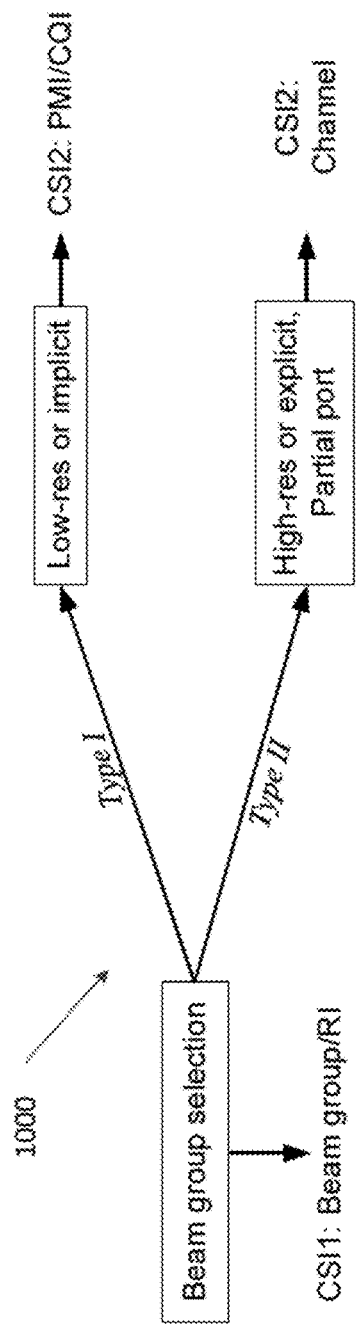
FIG. 10 illustrates another example dual-resolution CSI reporting framework according to embodiments of the present disclosure.

FIG. 10 illustrates another example dual-resolution CSI reporting framework 1000 according to embodiments of the present disclosure. An embodiment of the dual-resolution CSI reporting framework 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

Dual-type CSI reporting is shown in FIG. 10 in which (e.g., Type II) corresponds to high-res or explicit CSI reporting for partial antenna ports. The two CSIs, CSI1 and CSI2, are then reported for partial antenna ports.

Figure 11:
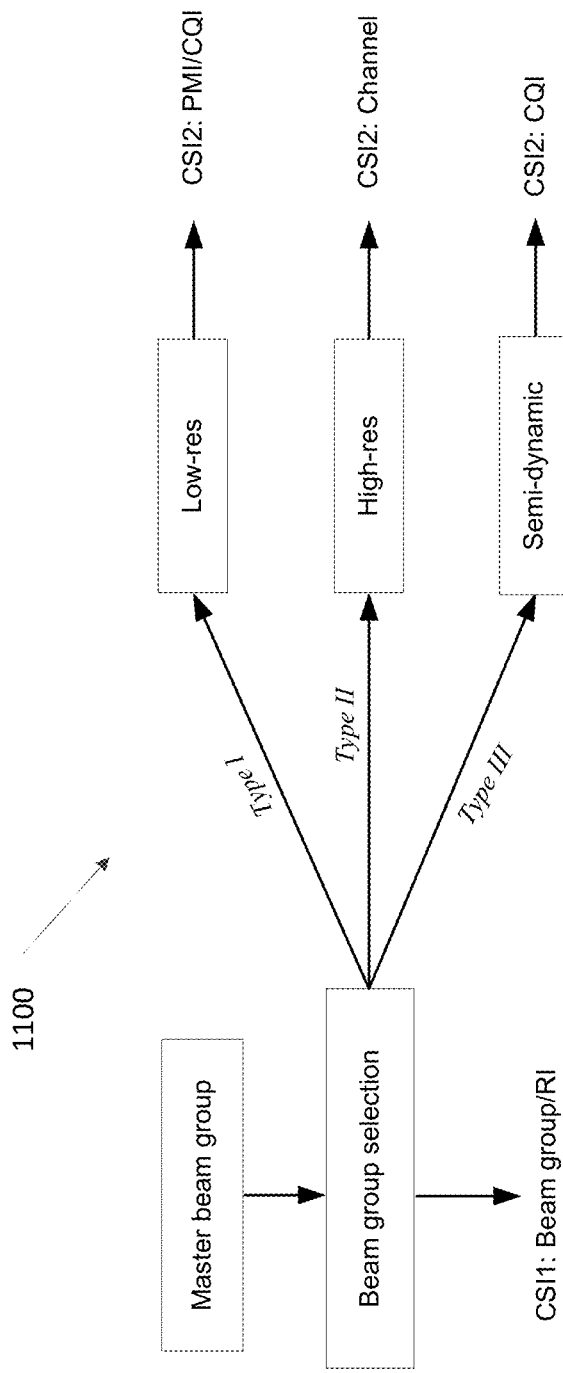
FIG. 11 illustrates an example triple-resolution CSI reporting framework according to embodiments of the present disclosure.

FIG. 11 illustrates an example triple-resolution CSI reporting framework 1100 according to embodiments of the present disclosure. An embodiment of the triple-resolution CSI reporting framework 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

In some sub-embodiments 1, a triple-res or triple-type CSI feedback framework is shown in FIG. 11 in which the CSI has two components. The first CSI component (i.e., CSI 1) is common to all CSI types and indicates the selection of a beam group (comprising of L beams) from a master beam group. CSI 1 may also include a rank indicator (i.e., RI) associated with the selected beam group in some CSI reporting types. The second CSI component (i.e., CSI 2) is specific to the configured CSI reporting resolution.

In one example of Type I CSI reporting, low-resolution CSI feedback as explained in sub-embodiment 0 is configured. In another example of Type II CSI reporting, high-resolution CSI feedback as explained in sub-embodiment 0 is configured. In yet another example of Type III CSI reporting, semi-dynamic beamforming is configured. In such example, CSI 2 is derived to report CQI assuming semi-dynamic beamforming or pre-coder cycling using L beams reported in CSI1. Note that PMI is not reported in CSI 2. This type can be configured to high mobility users.

In some sub-embodiments 2, the codebook for the proposed multi-resolution or multi-type CSI reporting framework is a dual-stage codebook: $W = W_1 W_2$, where the first stage $W_1$ codebook is common to all or some of the types or resolutions (e.g. similar to LTE specification Class A $W_1$ codebook for beam groups) and the second stage $W_2$ codebook depends on the configured resolution or type.

Figure 12:
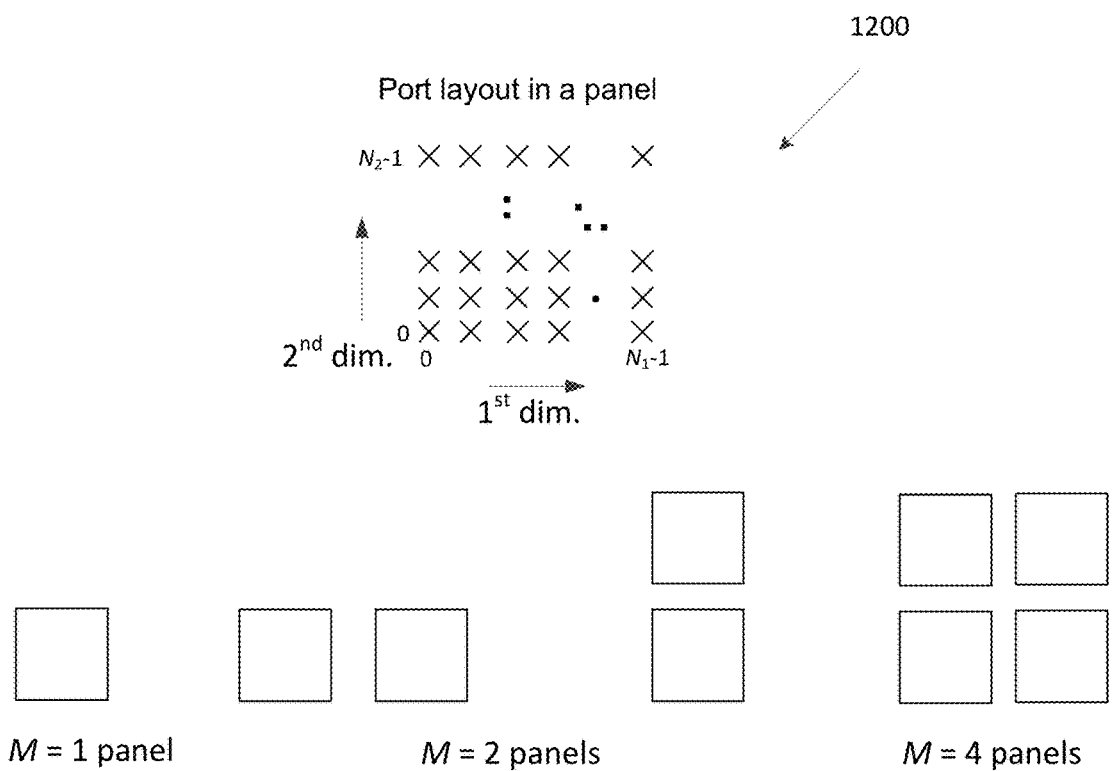
FIG. 12 illustrates an example multiple antenna panels according to embodiments of the present disclosure.

FIG. 12 illustrates an example multiple antenna panels 1200 according to embodiments of the present disclosure. An embodiment of the multiple antenna panels 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

In the following, $N_1$ and $N_2$ are assumed as the number of antenna ports with the same polarization in the first and second dimensions, respectively. For 2D antenna port layouts, we have $N_1 > 1$, $N_2 > 1$, and for 1D antenna port layouts $N_1 > 1$ and $N_2 = 1$. So, for a dual-polarized antenna port layout, the total number of antenna ports is $2N_1 N_2$.

Also, the embodiments of the present disclosure is applicable to a setup in which we have multiple antenna panels where each panel is a dual-polarized antenna ports with $N_1$ and $N_2$ ports in two dimensions. An illustration is shown in FIG. 12 in which there are M antenna panels. Note that the antenna port layouts may or may not be the same in different antenna panel.

In some embodiments 1, a UE is configured with a $W_1$ codebook which comprises of the following components, basis set and beam group selection, each of which can be configurable via higher-layer signalling, e.g. RRC.

In one example of the first $W_1$ codebook component, basis set is configured, where depending on whether the UE is configured with CSI reporting with or without dimension reduction, the UE is configured with a basis set of one of the following examples.

In one example, full dimension basis set is configured. In such example, the basis set is given by:

$$B = \begin{bmatrix} I_{N_1 N_2} & 0 \\ 0 & I_{N_1 N_2} \end{bmatrix},$$

where $I_{N_1 N_2}$ is an $N_1 N_2 \times N_1 N_2$ identity matrix. In one example, the UE can be configured with the full dimension basis for Type II (explicit) CSI reporting. In another example, the UE can be configured with the full dimension basis if the number of ports is at most X, e.g. X=8.

In another example, port selection basis set is configured. In such example, the basis set is given by $$B = \begin{bmatrix} E_{\frac{X}{2} \times L} & \\ & E_{\frac{X}{2} \times L} \end{bmatrix}, E_{\frac{X}{2} \times L}$$

is a port selection matrix, where L>1, e.g., L∈{2,3,4}, is configurable, and X>=2L. In one alternative, X=P=2N$_1$N$_2$∈{4, 8, 12, 16, 24, 32}, the number of ports. In another alternative, X∈{2, 4, 8}.

In yet another example, reduced dimension basis set is configured. In such example, the basis set is a 2×2 block diagonal matrix whose diagonal blocks are of size $N_1 N_2 \times L_1 L_2$. The two diagonal blocks may or may not be identical. Assuming identical diagonal blocks, the basis set has the following structure:

$$B = \begin{bmatrix} W & 0 \\ 0 & W \end{bmatrix},$$

where W is $N_1 N_2 \times L_1 L_2$, $L_1 \in \{1, 2, \ldots, N_1 -1\}$, and $L_2 \in \{1, 2, \ldots, N_2 -1\}$ for 2D port layouts, and $L_2 = 1$ for 1D port layouts. In one example, the UE can be configured with the reduced dimension basis set for both Type I (implicit) and Type II (explicit) CSI reporting. In another example, the UE can be configured with the reduced dimension basis set if the number of ports is larger than X, e.g. X=8. An example of basis set for dimension reduction is shown in FIG. 13.

Figure 13:
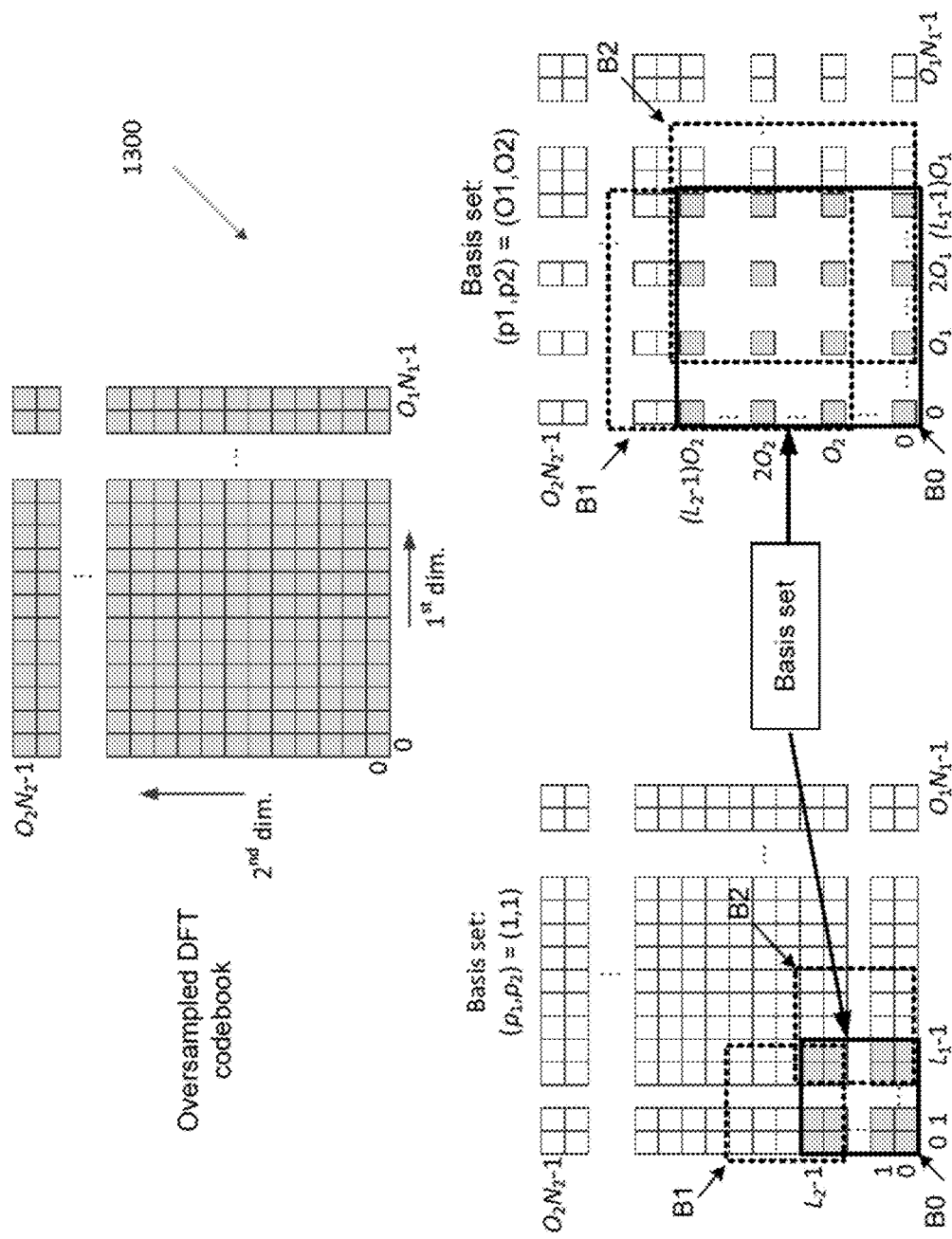
FIG. 13 illustrates example basis set for dimension reduction according to embodiments of the present disclosure.

FIG. 13 illustrates example basis set for dimension reduction 1300 according to embodiments of the present disclosure. An embodiment of the basis set for dimension reduction 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

An oversampled DFT codebook serves as the basis set comprising of $O_1 N_1 \times O_2 N_2$ DFT beams, where $O_1$ and $O_2$ are oversampling factors in first and second dimensions, respectively. A basis set comprises of $L_1$ and $L_2$ uniformly spaced beams in the two dimensions. So, the number of beams in a basis set is $L_1 L_2$. The basis set is further parameterized by beam spacing parameters ($p_1$, $p_2$) which represent spacing between two adjacent beams in two dimensions. A few example values for $L_d$ and $p_d$, where d=1, 2 belong to $\{1, 2, \ldots, N_d\}$ and $\{1, 2, \ldots, O_d\}$, respectively. An illustration of two types of basis set is shown in FIG. 13, where each small square represents a 2D DFT beam. When ($p_1$, $p_2$)=(1, 1), the basis set corresponds to $L_1 L_2$ closely spaced beams, and when $(p_r, p_2) = (O_1, O_2)$, it corresponds to $L_1L_2$ orthogonal beams. A UE is configured with one of the basis set types by configuring $(L_1, L_2)$ and $(p_1, p_2)$.

Figure 14:
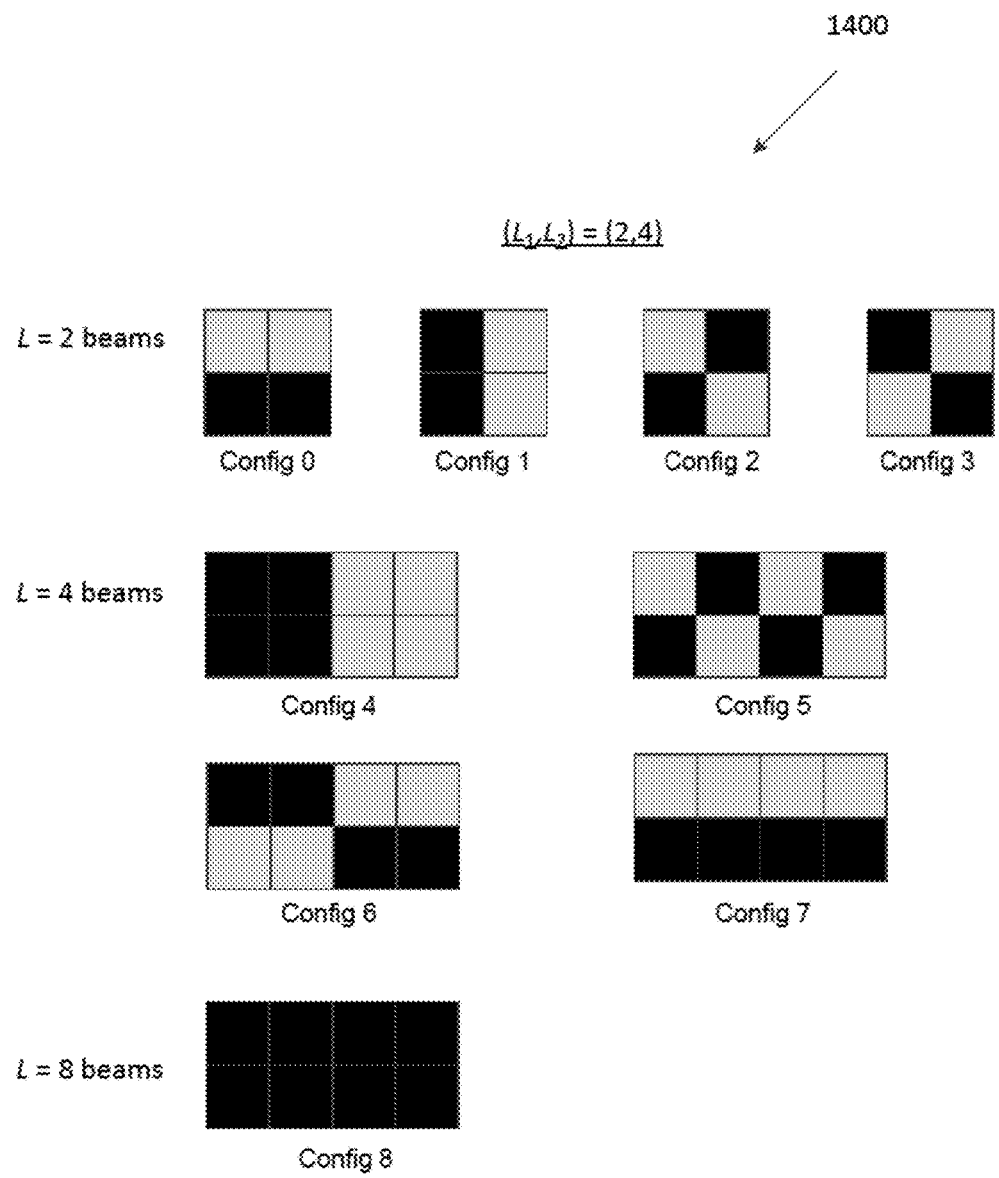
FIG. 14 illustrates an example parameterized beam group according to embodiments of the present disclosure.

In one example of the second $W_1$ codebook component, beam group selection is configured. In such example, L out $L_1L_2$ beams are selected from the reported basis set. A few examples of L values belong to $\{1, 2, \ldots, L_1L_2\}$. Two alternatives for the beam selection are as follows. A UE is configured with one of these alternatives. In one example of parameterized, the selection of L beams is fixed and is parameterized by a codebook parameter Config. A few examples are shown in FIG. 14. In another example of unconstrained, the selection of L beams is unconstrained and any L out of $L_1L_2$ beams can be reported. The basis after beam selection is given by $W_I$, where $I = \{(i_l, j_l): l=0, 1, \ldots, L-1\}$ is the index set of L selected beams, and $i_1 \in \{0, 1, \ldots, L_1-1\}$ and $j_l \in \{0, 1, \ldots, L_2-1\}$.

FIG. 14 illustrates an example parameterized beam group 1400 according to embodiments of the present disclosure. An embodiment of the parameterized beam group 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

In some sub-embodiments 3, a UE is configured with one of the following two types of basis, where $W_I$ is defined in the aforementioned embodiments 1. In one example of basis 0, $$B_I = \begin{bmatrix} W_I & 0 \\ 0 & W_I \end{bmatrix},$$

which is configured if $W_I$ is orthogonal (i.e., has orthogonal columns). In another example of basis 1:

$$B_I = \begin{bmatrix} W_I(W_I^H W_I)^{-1} & 0 \\ 0 & W_I(W_I^H W_I)^{-1} \end{bmatrix}$$

which is configured if $W_I$ is non-orthogonal (i.e., has non-orthogonal columns). Note that if $W_I$ has orthogonal columns, then Basis 0 and Basis 1 are identical because $B^H B = 1$.

In some sub-embodiments 4, a UE is configured with W1 basis for Type I and Type II CSIs (FIG. 9 and FIG. 10) according to at least one of the following alternatives. In one example of Alt 0, both Basis 0 and Basis 1 can be configured for both Type I and Type II CSIs. In one example of alt 1, only Basis 0 can be configured for Type I CSI and both Basis 0 and Basis 1 can be configured for Type II CSI. In one example of Alt 2, only Basis 1 can be configured for Type I CSI and both Basis 0 and Basis 1 can be configured for Type II CSI. In one example of Alt 3, only Basis 0 can be configured for Type II CSI and both Basis 0 and Basis 1 can be configured for Type I CSI. In one example of Alt 4, only Basis 1 can be configured for Type II CSI and both Basis 0 and Basis 1 can be configured for Type I CSI. In one example of Alt 5, only Basis 0 can be configured for Type I CSI and only Basis 0 can be configured for Type II CSI. In one example of Alt 6, only Basis 0 can be configured for Type I CSI and only Basis 1 can be configured for Type II CSI. In one example of Alt 7, only Basis 1 can be configured for Type I CSI and only Basis 0 can be configured for Type II CSI. In one example of Alt 8, only Basis 1 can be configured for Type I CSI and only Basis 1 can be configured for Type II CSI.

In some embodiments 2, a UE is configured with $W_1$ codebook for multiple antenna panels (as shown in FIG. 12) with $M \geq 1$ panels, which has a block diagonal structure with 2M blocks, where the first 2 consecutive blocks are associated with the two polarizations of the $1^{st}$ antenna panel, the next 2 consecutive blocks are associated with the two polarizations of the $2^{nd}$ antenna panel, and so on.

In one example of M=2 antenna panels, the W1 basis is according to one of the following alternatives. In the following, the subscript I may be dropped for brevity.

For Basis 0 only, some examples may be configured as follows. In one example of Basis 0-0, $$W = \begin{bmatrix} B_0 & 0 & 0 & 0 \\ 0 & B_0 & 0 & 0 \\ 0 & 0 & B_0 & 0 \\ 0 & 0 & 0 & B_0 \end{bmatrix},$$

$B_0$ is a basis of type Basis 0, which is common to both panels. Such a basis can be configured if port layouts of both panels are identical. In another example of Basis 0-1, $$W = \begin{bmatrix} B_0 & 0 & 0 & 0 \\ 0 & B_0 & 0 & 0 \\ 0 & 0 & B_1 & 0 \\ 0 & 0 & 0 & B_1 \end{bmatrix},$$

$B_0$ and $B_1$ are two basis of type Basis 0 for panels 0 and 1, respectively. Such a basis can be configured if port layouts of the two panels are different.

For Basis 1 only, some examples may be configured as follows: In one example of Basis 1-0, $$W = \begin{bmatrix} B_0(B_0^H B_0)^{-1} & 0 & 0 & 0 \\ 0 & B_0(B_0^H B_0)^{-1} & 0 & 0 \\ 0 & 0 & B_0(B_0^H B_0)^{-1} & 0 \\ 0 & 0 & 0 & B_0(B_0^H B_0)^{-1} \end{bmatrix},$$

$B_0$ is a basis of type Basis 1, which is common to both panels. Such a basis can be configured if port layouts of both panels are identical. In another example of Basis 1-1, $$W = \begin{bmatrix} B_0(B_0^H B_0)^{-1} & 0 & 0 & 0 \\ 0 & B_0(B_0^H B_0)^{-1} & 0 & 0 \\ 0 & 0 & B_1(B_1^H B_1)^{-1} & 0 \\ 0 & 0 & 0 & B_1(B_1^H B_1)^{-1} \end{bmatrix},$$

$B_0$ and $B_1$ are two basis of type Basis 1 for panels 0 and 1, respectively. Such a basis can be configured if port layouts of the two panels are different.

For both Basis 0 and Basis 1, there may be some alternatives. In one example of Basis 01:

$$W = \begin{bmatrix} B_0 & 0 & 0 & 0 \\ 0 & B_0 & 0 & 0 \\ 0 & 0 & B_1(B_1^H B_1)^{-1} & 0 \\ 0 & 0 & 0 & B_1(B_1^H B_1)^{-1} \end{bmatrix},$$

$B_0$ is a basis of type Basis 0 for panel 0, and $B_1$ is a basis of Type Basis 1 for panel 1. In another example of Basis 10:

$$W = \begin{bmatrix} B_0(B_0^H B_0)^{-1} & 0 & 0 & 0 \\ 0 & B_0(B_0^H B_0)^{-1} & 0 & 0 \\ 0 & 0 & B_1 & 0 \\ 0 & 0 & 0 & B_1 \end{bmatrix},$$

$B_0$ is a basis of type Basis 0 for panel 0, and $B_1$ is a basis of Type Basis 1 for panel 1. It is straightforward to extend this example to more than 2 antenna panels, for example 4 panels.

In some embodiments 3, a UE is configured with $W_2$ codebook for single panel and Type I and II CSIs (as shown in FIG. 9 and FIG. 10) according to at least one of the following alternatives. In one example of Type I CSI (implicit), the Type I pre-coder represents either beam selection or combination and has the following expression:

$$p = \frac{B_l c}{\|B_l c\|},$$

where for selection, $c = [e_i \; e_i \phi_n]^T$ where $e_i$ is a selection vector of length L whose i-th entry is 1 and the rest all are zero, where $i = 0, 1, \ldots, L-1$. An example of such selection is LTE Release 13 and 14 Class A codebook and where for combination, $c = [1 \; c_1 \; \ldots \; c_{2L-1}]^T$ where $c_i$ are quantized a coefficient codebook. Two examples of which are QPSK or 8-PSK codebook for phase and N-bit uniform for amplitude. An example of such a codebook is LTE Release 14 advanced CSI codebook.

In another example of Type II CSI (explicit), the Type II pre-coder represents beam combination to report channel/ eigenvectors/covariance matrix as follows: Channel: $H_{k,r} \approx [\Sigma_{l=0}^{L-1} c_l b_l \; \Sigma_{l=L}^{2L-1} c_l b_l]^T$ for receive antenna r; Covariance matrix:

$$K = \frac{1}{|f|} \sum_{k \in f} ((H_k)(H_k)^H) \approx B_l C B_l^H;$$

Eigenvector: $e \approx [\Sigma_{l=0}^{L-1} c_l b_l \; \Sigma_{l=L}^{2L-1} c_l b_l]T$; $b_l$ are columns of $B_l$; and Coefficients $\{c_l\}_{l=0}^{2L-1}$ for channel and eigenvector reporting and $\{c_{i,j}\}$ for covariance matrix reporting are quantized using the $W_2$ codebook.

In some embodiments 4, a UE is configured with $W_2$ codebook for multiple panels and Type I and II CSIs (FIG. 9 and FIG. 10) according to at least one of the following alternatives: In one example, the pre-coder has the structure, kron(c,d), where c is for intra-panel CSI, and d is for inter-panel CSI (Basis 0-0 and Basis 1-0), where kron(c, d) represents the Kronecker product of c and d. In another example, the pre-coder has the structure $[C_0 \; c_1]^T$, where $c_0$ and $c_1$ are W2 for two panels (for all types of basis).

In some embodiments 5, a UE is configured with an UL codebook which is the same as the DL codebook for Type I CSI in Embodiment 3 for 2, 4, and 8 antenna ports at the UE. Unlike DL codebook, which is parameterized by parameters such as number of ports in two dimensions, ($N_1$, $N_2$), oversampling factors in two dimensions, ($O_1$, $O_2$), one of non-orthogonal or orthogonal basis set, and number of beams (L=1, 2, or 4) for beam group selection from the basis set, for the proposed UL codebook, ($N_1$, $N_2$), ($O_1$, $O_2$) (e.g. (8, 8)), and basis set type (e.g. non-orthogonal) are fixed. However, the number of beams (L value) is configured to the UE via UL transmission related configuration in UL or DL DCI.

In some embodiments 6, a UE is configured with the DL codebook for Type II CSI (Embodiments 3) such that the $W_2$ codebook performs separate quantization of amplitude and phase of each beam combination coefficients, $\{c_i\}$ or $\{c_{i,j}\}$, where phase quantization is reported SB and amplitude quantization is reported either wideband (WB) only (Alt. 6-0) or, SB only (Alt. 6-1) or, both WB and SB (Alt. 6-2), where WB reporting is used to report the WB component of amplitude (that is common to all SBs) and SB reporting is used to report per SB component of amplitude. In such embodiments, one of alternatives may be fixed in specification. Alternatively, one of alternatives (Alt.6-0 through 6-22) is configured to the UE via higher-layer (e.g. RRC) or more dynamic (MAC CE based or DCI) signalling. For this later alternative, either all three (Alt. 6-0 through 6-2) alternatives are supported or two of them are supported, which correspond to either Alt. 6-0 and 6-1 or Alt. 6-0 and 6-2 or Alt. 6-1 and 6-2.

In some embodiments, the amplitude quantization type is according to one of the following four alternatives. In one example, Amplitude Type 0 corresponds to the case in which for each of the L beams, the reported amplitude is the same for the two antenna polarizations, and the same for a plurality of layers, for example, for two layers, the coefficient amplitude for two layers can be expressed as $$\begin{bmatrix} 1 & a_1 & \ldots & a_{L-1} & 1 & a_1 & \ldots & a_{L-1} \\ 1 & a_1 & \ldots & a_{L-1} & 1 & a_1 & \ldots & a_{L-1} \end{bmatrix}^T.$$

In another example, Amplitude Type 1 corresponds to the case in which for each of the L beams, the reported amplitude is the same for the two antenna polarizations, and different for the plurality of layers, for example, for two layers, the coefficient amplitude for two layers can be expressed as $$\begin{bmatrix} 1 & a_1 & \ldots & a_{L-1} & 1 & a_1 & \ldots & a_{L-1} \\ 1 & a'_1 & \ldots & a'_{L-1} & 1 & a'_1 & \ldots & a'_{L-1} \end{bmatrix}^T.$$

In yet another example, Amplitude Type 2 corresponds to the case in which for each of the L beams, the reported amplitude is different for the two antenna polarizations, and the same for the plurality of layers, for example, for two layers, the coefficient amplitude for two layers can be expressed as $$\begin{bmatrix} 1 & a_1 & \ldots & a_{L-1} & a_L & a_{L+1} & \ldots & a_{2L-1} \\ 1 & a_1 & \ldots & a_{L-1} & a_L & a_{L+1} & \ldots & a_{2L-1} \end{bmatrix}^T.$$

In yet another example, Amplitude Type 3 corresponds to the case in which for each of the L beams, the reported amplitude is different for the two antenna polarizations, and different for a plurality of layers, for example, for two layers, the coefficient amplitude for two layers can be expressed as $$\begin{bmatrix} 1 & a_1 & \ldots & a_{L-1} & a_L & a_{L+1} & \ldots & a_{2L-1} \\ 1 & a'_1 & \ldots & a'_{L-1} & a'_L & a'_{L+1} & \ldots & a'_{2L-1} \end{bmatrix}^T.$$

One of the aforementioned examples will be discussed and fixed in the present disclosure. Alternatively, one of the aforementioned examples is configured to the UE via higher-layer (e.g. RRC) or more dynamic (MAC CE based or DCI) signalling. Alternatively, one of the aforementioned examples (e.g., Amplitude Type 0-3) is either fixed or configured if amplitude is reported WB, another one of the aforementioned examples (e.g., Amplitude Type 0-3) is either fixed or configured if amplitude is reported SB, and another one of the aforementioned examples (e.g., Amplitude Type 0-3) is either fixed or configured if amplitude is reported both WB and SB.

In some embodiments, the amplitude quantization codebook for either WB or SB reporting (Alt. 6-0 and 6-1 above) is according to one of the following:

$$C_{A,0} = \left\{ \frac{1}{\sqrt{2^i}} : i = 0, 1, 2, \ldots, N_A - 1 \right\}; \text{ and}$$

$$C_{A,1} = \{0\} \cup \left\{ \frac{1}{\sqrt{2^i}} : i = 0, 1, 2, \ldots, N_A - 2 \right\},$$

where $N_A$ is the number of bits to quantize each amplitude. For example, if $N_A=2$, then $c_{A,0}=\{1, \sqrt{0.5}, \sqrt{0.25}, \sqrt{0.125}\}$ and $c_{A,1}=\{1, \sqrt{0.5}, \sqrt{0.25}, 0\}$, and if $N_A=3$, then $c_{A,0}=$ and $c_{A,1}=\{1, \sqrt{0.5}, \sqrt{0.25}, \sqrt{0.125}, \sqrt{0.0625}, \sqrt{0.0313}, \sqrt{0.0156}, 0\}$. Let $N_{A,WB}$ and $N_{A,SB}$ be number of bits to report quantized WB and SB amplitudes, respectively.

In some embodiments, the amplitude quantization codebook for both WB and SB reporting (e.g., Alt. 6-2 above) is as follows. Let $\alpha_{WB}$ and $\alpha_{SB}$ denote the quantized WB and SB amplitude of a coefficient, respectively.

For WB reporting, the WB amplitude of each coefficient ($\alpha_{WB}$) is reported using one of $N_{A,WB}$-bit codebooks $c_{A,0}$ and $c_{A,1}$.

For SB reporting, the SB amplitude of each coefficient ($\alpha_{SB}$) is reported using the corresponding WB amplitude $\alpha_{WB}$ and one of the following $N_{A,SB}$-bit codebooks. In one example, $$C_{A,S,B,0} = \begin{bmatrix} -s_{\frac{N_{A,SB}}{2}-1} & \ldots & -s_1 & -s_0 & s_0 & s_1 & \ldots & s_{\frac{N_{A,SB}}{2}-1} \end{bmatrix},$$

where $s_i = \frac{1}{\sqrt{2^{i+1}}}$.

The reconstructed amplitude using both WB and SB amplitude components is given by $\alpha_{WB}(1+\alpha_{SB})$. In another example, $$C_{A,S,B,1} = \begin{bmatrix} -s_{\frac{N_{A,SB}}{2}-1} & \ldots & -s_1 & -s_0 & 0 & s_0 & s_1 & \ldots & s_{\frac{N_{A,SB}}{2}-2} \end{bmatrix},$$

where $s_i = \frac{1}{\sqrt{2^{i+1}}}$.

The reconstructed amplitude using both WB and SB amplitude components is given by $\alpha_{WB}(1+\alpha_{SB})$. In yet another example, $c_{A,SB,2}$ is a $N_{A,SB}$-bit codebook which is a subset $D(\alpha_{WB})$ of the $N_A$-bit full codebook $c_{A,1}$, where $N_A$ is fixed and the subset $D(\alpha_{WB})$ is determined based on the reported WB component $\alpha_{WB}$.

For example, if $N_A=3$, then $c_{A,1}=\{1, \sqrt{0.5}, \sqrt{0.25}, \sqrt{0.125}, \sqrt{0.0625}, \sqrt{0.0313}, \sqrt{0.0156}, 0\}$ and $N_{A,SB}$-bit subset codebook $D(\alpha_{WB})$ for SB amplitude reporting is determined as follows. In step 0, the index of the codeword is found in the full codebook $c_{A,1}$ which is closest to the reported WB amplitude $\alpha_{WB}$ in Euclidean distance. Let J be the corresponding codeword index. In step 1, the subset codebook $D(\alpha_{WB})$ is determined as follows: If $J \leq 2^{n_{A,SB}-1}-1$, then the selected codeword indices of $c_{A,1}$ that comprise $D(\alpha_{WB})$ are $\Phi=1$ to $2^{N_{A,SB}}$, else if $2^{N_A}-J<2^{N_{A,SB}-1}$, then the selected codeword indices of $c_{A,1}$ that comprise $D(\alpha_{WB})$ are $\Phi=2^{N_A}-2^{N_{A,SB}}+1$ to $2^{N_A}$; and else the selected codeword indices of $c_{A,1}$ that comprise $D(\alpha_{WB})$ are $\Phi=J-2^{N_{A,SB}-1}+1$ to $J+2^{N_{A,SB}-1}$. In other words, the $N_{A,SB}$-bit subset codebook $D(\alpha_{WB})$ for SB amplitude reporting is given by $c_{A,1}(\Phi)$ where $\Phi$ is the set of indices of the selected codewords in $c_{A,1}$.

In some embodiments, the number of bits for both WB and SB amplitude quantization is according to at least one of the following alternatives: $N_{A,WB}=2$ and $N_{A,SB}=1$; $N_{A,WB}=2$ and $N_{A,SB}=2$; $N_{A,WB}=3$ and $N_{A,SB}=1$; $N_{A,WB}=3$ and $N_{A,SB}=2$; $N_{A,WB}=4$ and $N_{A,SB}=1$; and $N_{A,WB}=4$ and $N_{A,SB}=2$. Either one of the aforementioned alternatives is supported in the present disclosure and one of the aforementioned alternatives is configured via higher-layer RRC or more dynamic MAC CE based or DCI signaling.

In some embodiments, when both WB and SB amplitude are reported (Alt. 6-2 above), then it is according to at least one of the following alternatives. In one example, for each coefficient, one WB and one SB amplitude are reported. In another example, for each beam (out of L $W_1$ beams), amplitudes of the two coefficients associated with two polarizations are reported using a common WB amplitude and two different SB amplitudes. In yet another example, for each beam (out of L $W_1$ beams), amplitudes of the two coefficients associated with two layers are reported using a common WB amplitude and two different SB amplitudes. For more than 2 layers, a common WB amplitude and SB amplitude for each layer are reported. In yet another example, for each beam (out of L $W_1$ beams), amplitudes of the four coefficients associated with two layers and two polarizations are reported using a common WB amplitude and four different SB amplitudes. For more than 2 layers, a common WB amplitude and SB amplitude for each layer and each polarization are reported. Either one of the aforementioned examples is supported in the present disclosure and one of the aforementioned examples is configured via higher-layer RRC or more dynamic MAC CE based or DCI signaling.

In some embodiments 7, a UE is configured with the DL codebook for Type II CSI (Embodiment 3) in which $W_1$ beam are selected freely or unconstrained according to one of the following alternatives. In one example of Alt 7-0, similar to LTE specification advanced CSI codebook, beam (0, 0) is always selected, and remaining L-1 beams are selected freely from remaining $L_1L_2-1$ beams. In another example of Alt 7-1, any L out of $L_1L_2$ beams can be selected. For higher rank Type II CSI reporting, the nested property in $W_1$ beam groups in maintained, i.e., the $W_1$ beam groups is the same for all layers.

In some embodiments 8, a UE is configured with the DL codebook for Type II CSI (Embodiment 3) in which the $W_2$ codebook for Type II CSI is based on beam combination and is used to report at least one of the following two CSI sub-types. In one example of Type II-A, the $W_2$ codebook is used to quantize pre-coders, which can be an estimate of channel eigenvectors or any general beamforming vectors. In such example, the linear combination based quantization of pre-coder is given by $$p = \frac{B_I c}{\|B_I c\|},$$

where $c = [c_0 \ c_1 \ldots c_{L-1} \ c_{L+1} \ldots c_{2L-1}]^T$, and $c_i$ is a complex coefficient for i-th beam in basis $B_I$ and to report rank r CSI, r dominant pre-coders are reported independently using linear combination of L beams. For r layers, either r separate PMIs or a single PMI is reported. In another example of Type II-B, the $W_2$ codebook is used to quantize a matrix, a $2N_1N_2 \times 2N_1N_2$ matrix, as Type II CSI, where the linear combination based quantization is given by $P = B_I C B_I^H$, where C is a 2L×2L Hermitian matrix. The matrix is therefore Hermitian and non-negative definite. An example is an estimate of channel covariance matrix E ($H^H H$).

For CSI Type II-A, the number of coefficients is K=2L, and for CSI Type II-B, the number of coefficients is K=2L(2L+1)/2=L(2L+1), because of C is a Hermitian matrix. The $W_2$ codebook is used to quantize K coefficients as follows. In one embodiment of strongest beam/coefficient selection, the strongest beam/coefficient corresponding to the coefficient with the largest amplitude is selected and reported, and the rest of the K−1 coefficients are normalized by dividing them by the strongest coefficient and the normalized K−1 coefficients are reported. Two alternatives of the strongest beam/coefficient selection are as follows. In one alternative (Alt 8-0), beam (0, 0) of the basis set is the strongest beam. Note that in case of Type II-B CSI, this corresponds to the diagonal coefficients corresponding to Beam (0, 0). In one example (Alt 8-0-0), beam (0, 0) at a fixed antenna polarization, e.g. +45, is the strongest beam. In this case, no indication of the strongest beam is needed. In yet another example (Alt 8-0-1), beam (0, 0) at any one of the two antenna polarizations can be the strongest beam. In this case, 1-bit indication is needed to indicate the polarization of the strongest beam. In another alternative (Alt 8-1), any one of the L beams can be the strongest beam. Note that in case of Type II-B CSI, this corresponds to the diagonal coefficients corresponding to 2L beams. In one example (Alt 8-1-0), the strongest beam is selected from a fixed antenna polarization, e.g. +45. In this case, $\log_2\lceil L \rceil$-bit indication is needed to indicate the strongest beam. In another example (Alt 8-1-1), the strongest beam is selected from any of the two polarizations. In this case, $\log_2\lceil 2L \rceil$-bit indication is needed to indicate the strongest beam The selection of the strongest beam/coefficient can be reported in a WB manner (e.g., one common report for all SBs) or in a SB manner (e.g., independent report for each SB). If it is WB, it can be reported with PMI1 either jointly with at least one WB CSI report or separately as a separate WB report. Alternatively, it can be reported as a WB component of PMI2.

In one embodiment of Quantization, after normalization, the strongest coefficient becomes one, hence need not be reported. The normalized remaining K−1 coefficients are quantized using scalar quantization of amplitude and phase separately. In one example of amplitude quantization, the codebook for amplitude quantization is a $B_A$ bit scalar codebook over [0, 1], where $B_A$=2, 3, or 4. The amplitude quantization is either WB or SB or both WB and SB (Alt. 6-0 through 6-2 in Embodiment 6). There are two alternatives for amplitude quantization across two polarizations. In another example of Alt 8-2-0, the amplitudes of the two coefficients (associated with two polarizations) for each one of L beams are the same (Amplitude Type 0 and 1 in Embodiment 6). In yet another example of Alt 8-2-1, the amplitudes of the two coefficients (associated with two polarizations) for each one of L beams are different and are independently quantized (Amplitude Type 2 and 3 in Embodiment 6).

In one embodiment of phase quantization, the codebook for phase quantization is a $B_P$ bit $2^{B_P}$-PSK codebook, where $B_P$=2, 3, or 4. The phase quantization is reported in a SB manner.

For higher layer Type II-A CSI reporting, the $W_2$ codebook is according to the following. In one example, the strongest beam/coefficient selection for all layers is according to one of the following two alternatives. In one instance of Alt 8-3-0, the strongest beam is the same for all layers. In another instance of Alt 8-3-1, the strongest beam can be different (independent selection) for all layers. In another example, the amplitude quantization for all layers is according to one of the following two alternatives. In one instance of Alt 8-4-0, the quantized amplitudes are the same for all layers (Amplitude Type 0 and 2 in Embodiment 6). In another instance of Alt 8-4-1, the quantized amplitudes are different (independent quantization) for all layers (Amplitude Type 1 and 3 in Embodiment 6). The phase quantization is independent for all layers.

In some embodiments, a UE is configured to report a dual-stage $W=W_1W_2$ codebook for Type II CSI reporting wherein the PMI to report the LC pre-coding matrix comprises at least two PMIs, a first PMI ($i_1$) and a second PMI ($i_2$) indicating wideband (WB) and subband (SB) components of the LC pre-coding matrix, respectively. Also, the first PMI ($i_1$) includes a first set and a second set of indicators indicating common WB components for all layers of a plurality of layers and independent WB components for each layer of the plurality of layers, respectively, the second PMI ($i_2$) includes a set of indicators indicating independent SB components for each layer of the plurality of layers, and the plurality of layers is determined based on a value ν associated with a rank indicator (RI). In one example, the first PMI ($i_1$) includes the first set of indicators indicating the plurality of L beams that comprise common WB components for all layers of the plurality of layers, and the second set of indicators to indicate independent WB components for each layer of the plurality of V layers, where the independent WB components for each layer comprise at least a strongest coefficient among the plurality of coefficients and WB amplitude coefficients for the remaining coefficients (all coefficients except the strongest). In another example, the second PMI ($i_2$) includes the set of indicator to indicate independent SB components for each layer of the plurality of V layers, where the independent SB components for each layer comprise at least SB phase and SB amplitude coefficients for the remaining coefficients (all coefficients except the strongest).

In some embodiments 9, a UE is configured with a dual-stage $W=W_1W_2$ codebook for Type II CSI reporting for single-panel in which $W_1$ codebook is used to select an orthogonal basis set comprising of uniformly spaced ($L_1$, $L_2$) DFT beams, and to select $L \in \{2, 3, 4, 6, 8\}$ beams freely out of the $L_1L_2$ DFT beams in a basis set group, where L is either (e.g. RRC) configurable or UE reports a preferred L value. This selection is WB. Two examples of basis set sizes are $(L_1, L_2)=(4,2)$ and $(N_1, N_2)$, one of which is either fixed or configured. For layer 1, the basis comprising of L $W_1$ beams is given by $B_l=[b_{k_{1,l}^{(0)},k_{2,l}^{(0)}}, \ldots, b_{k_{1,l}^{(L-1)},k_{2,l}^{(L-1)}}]$, where, $b_{k_1,k_2}$ is a 2D DFT beam, $B_l^H B_l = I$ and $\{(k_{1,l}^{(i)}, k_{2,l}^{(i)}): i, 0, 1, \ldots, L-1\}$ are indices of L beams after sorting them so that beam $(k_{1,l}^{(0)}, k_{2,l}^{(0)})$ is the strongest beam for layer 1. Note that for rank>1, the strongest beam index can be different for different layers, hence the index of the strongest beam is indicated per layer and this indication is WB.

In some embodiments 9, a UE is configured with a dual-stage $W=W_1 W_2$ codebook for Type II CSI reporting for single-panel in which $W_2$ codebook is used to combine L beams independently per layer with a common $W_1$ beam group, i.e., the selected L beams are the same for all layers. The amplitude and phase of the combining coefficients are reported separately where phase is reported per SB and amplitude is reported WB or SB or both WB and SB according to at least one of the alternatives in Embodiment 6. The amplitude scaling matrix $A_{r,l}$ is a L×L diagonal matrix with diagonal elements in [0,1] which correspond to amplitudes of L coefficients for polarization r and layer l. The phase of coefficients for polarization r and layer l is given by $c_{r,l}=[c_{r,l,0}, \ldots, c_{r,l,L-1}]^T$, where $$c_{r,l,i} = \exp\left(\frac{j2\pi n}{2^N}\right) \; \forall \; r, l, i; N \in \{2, 3, 4\}.$$

For rank 1 and rank 2, the precoders are given by $$W = \begin{bmatrix} \tilde{w}_{0,0} \\ \tilde{w}_{1,1} \end{bmatrix} \text{ and } W = \begin{bmatrix} \tilde{w}_{0,0} & \tilde{w}_{0,1} \\ \tilde{w}_{1,0} & \tilde{w}_{1,1} \end{bmatrix},$$

where $\tilde{w}_{r,l} = B_l p_{r,l} c_{r,l} = \sum_{i=0}^{L-1} b_{k_{1,l}^{(i)} k_{2,l}^{(i)}} \cdot p_{r,l,i} \cdot c_{r,l,i}$; =0, 1, l=0, 1, $k_1 = O_1 n_1 + q_1$, $n_1 = 0, 1, \ldots N_1 - 1$, $q_1 = 0, 1, \ldots, O_1 - 1$; and $k_2 = O_2 n_2 + q_2$, $n_2 = 0, 1, \ldots N_2 - 1$, $q_2 = 0, 1, \ldots, O_2 - 1$.

In some embodiments of joint reporting of L beams, assuming the full orthogonal basis set of size $(L_1, L_2) = (N_1, N_2)$, the number of bits to report a basis set is $B_{1,1} = \log_2 (O_1 O_2)$, that to report the strongest beam is either $B_{1,2} = \log_2 (L_1 L_2)$ if the strongest beam is selected common for all R layers or $B_{1,2} = \log_2 (RL_1 L_2)$ if the strongest beam is selected per layer, and that to report the remaining L−1 beams is $$B_{1,3} = \log_2 \binom{L_1 L_2 - 1}{L - 1}.$$

So, the total number of bits to report the first PMI (PMI1) is $$B_1 = B_{1,1} + B_{1,2} + B_{1,3} = \left\lceil \log_2(O_1 O_2) + \log_2(L_1 L_2) + \log_2\binom{L_1 L_2 - 1}{L - 1} \right\rceil \text{ or }$$

$$\left\lceil \log_2(O_1 O_2) + \log_2(RL_1 L_2) + \log_2\binom{L_1 L_2 - 1}{L - 1} \right\rceil.$$

In some embodiments, alternatively, the number of bits to report a basis set is $B_{1,1} = \log_2 (O_1 O_2)$, that to report L beams from the selected basis set is $$B_{1,2} = \log_2 \binom{L_1 L_2}{L},$$

and that to report the strongest beam is either $B_{1,3} = \lceil \log_2 L \rceil$ if the strongest beam is selected common for all R layers or $B_{1,3} = \log_2 (RL)$ if the strongest beam is selected per layer. So, the total number of bits to report the first PMI (PMI1) is $$B_1 = B_{1,1} + B_{1,2} + B_{1,3} = \left\lceil \log_2(O_1 O_2) + \log_2\binom{L_1 L_2}{L} + \log_2(L) \right\rceil \text{ or }$$

$$\left\lceil \log_2(O_1 O_2) + \log_2\binom{L_1 L_2}{L} + \log_2(RL) \right\rceil.$$

In some embodiments of independent reporting of L beams, alternatively, the number of bits to report a basis set is $B_{1,1} = \log_2 (O_1 O_2)$, that to report L beams from the selected basis set is $B_{1,2} = L \log_2(L_1 L_2)$, and that to report the strongest beam is either $B_{1,3} = \lceil \log_2 L \rceil$ if the strongest beam is selected common for all R layers or $B_{1,3} = \log_2 (RL)$ if the strongest beam is selected per layer. So, the total number of bits to report the first PMI (PMI1) is $B_1 = B_{1,1} + B_{1,2} + B_{1,3} = \lceil \log_2 (O_1 O_2) + L \log_2 (L_1 L_2) + \log_2 (L) \rceil \lceil \log_2(O_1 O_2) + L \log_2 (L_1 L_2) + \log_2 (RL) \rceil$.

In some embodiments 9-0, a UE is configured with a 1 layer and a 2 layer codebooks for Type II (high-resolution) CSI reporting as follows. For 4 antenna ports (e.g. {15, 16, 17, 18}), 8 antenna ports (e.g. {15, 16, . . . , 22}), 12 antenna ports (e.g. {15, 16, . . . , 26}), 16 antenna ports (e.g. {15, 16, . . . , 30}), 24 antenna ports (e.g. {15, 16, . . . , 38}), and 32 antenna ports (e.g. {15, 16, 46}), when the UE is configured with higher layer parameter TypeIICodebookEnabled; the values of $N_1$ and $N_2$ are configured with the higher-layer parameters CodebookConfig-N1 and CodebookConfig-N2, respectively. The supported configurations of $(N_1, N_2)$ for a given number of CSI-RS ports and the corresponding values of $(O_1, O_2)$ are given in TABLE 1. The number of CSI-RS ports, $P_{CSI-RS}$, is $2N_1 N_2$; the value of L is configured with the higher-layer parameter CodebookConfig-L, where $L \in \{2,3,4\}$. When $P_{CSI-RS}=4$, L>2 is not supported; the value of $N_{PSK}$ is configured with the higher-layer parameter CodebookConfig-Phase, where $N_{PSK} \in \{4, 8\}$; and the UE is configured with the higher-layer parameter CodebookConfig-Amp set to WB-Amplitude or WBPlusSB-Amplitude.

TABLE 1

Supported configurations of $(N_1, N_2)$ and $(O_1, O_2)$

| Number of CSI-RS antenna ports, $P_{CSI-RS}$ | $(N_1, N_2)$ | $(O_1, O_2)$ |
|---|---|---|
| 4 | (2, 1) | (4, 1) |
| 8 | (2, 2) | (4, 4) |
|   | (4, 1) | (4, 1) |
| 12 | (3, 2) | (4, 4) |
|   | (6, 1) | (4, 1) |
| 16 | (4, 2) | (4, 4) |
|   | (8, 1) | (4, 1) |
| 24 | (4, 3) | (4, 4) |
|   | (6, 2) | (4, 4) |
|   | (12, 1) | (4, 1) |
| 32 | (4, 4) | (4, 4) |
|   | (8, 2) | (4, 4) |
|   | (16, 1) | (4, 1) |

When $v \leq 2$, where $v$ is the associated RI value, each PMI value corresponds to the codebook indices $i_1$ and $i_2$ where $$i_1 = \begin{cases} [q \; n_1 \; b_1^{max} \; k_1^{(WB)}] & N_2=1, v=1 \\ [q \; n_1 \; b_1^{max} \; k_1^{(WB)} \; b_2^{max} \; k_2^{(WB)}] & N_2=1, v=2 \\ [q \; n_1 \; n_2 \; b_1^{max} \; k_1^{(WB)}] & N_2>1, v=1 \\ [q \; n_1 \; n_2 \; b_1^{max} \; k_1^{(WB)} \; b_2^{max} \; k_2^{(WB)}] & N_2>1, v=2 \end{cases}$$

$$i_2 = \begin{cases} [c_1] & [WB-\text{amplitude}], v=1 \\ [c_1 \; c_2] & [WB-\text{amplitude}], v=2 \\ [c_1 \; k_2^{(SB)}] & [WBPlusSB-\text{amplitude}], v=1 \\ [c_1 \; c_2 \; k_1^{(SB)} \; k_2^{(SB)}] & [WBPlusSB-\text{amplitude}], v=2 \end{cases}$$

The L vector (or DFT beams) for linear combination are identified by the quantities $q$, $n_1$, and $n_2$ where $$q = [q_1 \; q_2]$$
$$n_1 = [n_1^{(0)}, \ldots, n_1^{(L-1)}]$$
$$n_2 = [n_2^{(0)}, \ldots, n_2^{(L-1)}]$$
$$q_1 \in \{0, 1, \ldots, O_1-1\}$$
$$q_2 \in \{0, 1, \ldots, O_2-1\} \text{ and } n_1^{(i)} \in \{0, 1, \ldots, N_1-1\}$$
$$n_2^{(i)} \in \{0, 1, \ldots, N_2-1\}$$

In one example, if $N_2=1$, $q_2=0$ and $n_2^{(i)}=0$ for $i=0, 1, \ldots, L-1$, and neither $q_2$ nor $n_2$ are reported. In another example, when $(N_1, N_2)=(2,1)$, $n_1=[0,1]$ and $n_2=[0,0]$, and $n_1$ is not reported. In yet another example, when $(N_1, N_2)=(4,1)$ and $L=4$, $n_1=[0,1,2,3]$ and $n_2=[0,0,0,0]$, and $n_1$ is not reported. In yet another example, when $(N_1, N_2)=(2,2)$ and $L=4$, $n_1=[0,0,1,1]$ and $n_2=[0,1,0,1]$, and $n_1$ is not reported. The strongest beam (or coefficient) on layer $l, l=1, \ldots, v$ is identified by $b_l^{max}=[i_l^{max}, r_l^{max}]$ where $i_l^{max} \in \{0, 1, \ldots, L-1\}$ is the vector (or beam index and $r_l^{max} \in \{0,1\}$ identifies the polarization. $i_l^{max}$ and $r_l^{max}$ are reported for $l=1, \ldots, v$.

The beam (or coefficient) amplitude indicators $k_l^{(WB)}$ and $k_l^{(SB)}$ are $$k_l^{(WB)} = [k_{0,l,0}^{(WB)}, k_{1,l,0}^{(WB)}, \ldots, k_{0,l,L-1}^{(WB)}, k_{1,l,L-1}^{(WB)}]$$
$$k_l^{(SB)} = [k_{0,l,0}^{(SB)}, k_{1,l,0}^{(SB)}, \ldots, k_{0,l,L-1}^{(SB)}, k_{1,l,L-1}^{(SB)}]$$
$$k_{r,l,i}^{(WB)} \in \{0, 1, \ldots, 7\}$$
$$k_{r,l,i}^{(SB)} \in \{0, 1\}$$

for $l=1, \ldots, v$. The mapping from $k_{r,l,i}^{(WB)}$ to the beam (or coefficient) amplitude $p_{r,l,i}^{(WB)}$ is given in TABLE 2 and the mapping from $k_{r,l,i}^{(SB)}$ to the beam amplitude $p_{r,l,i}^{(SB)}$ is given in TABLE 3.

TABLE 2

Mapping of $k_{r,l,i}^{(WB)}$ to $p_{r,l,i}^{(WB)}$

| $k_{r,l,i}^{(WB)}$ | $p_{r,l,i}^{(WB)}$ |
| --- | --- |
| 0 | 0 |
| 1 | $\sqrt{1/64}$ |
| 2 | $\sqrt{1/32}$ |
| 3 | $\sqrt{1/16}$ |
| 4 | $\sqrt{1/8}$ |
| 5 | $\sqrt{1/4}$ |

TABLE 2-continued

Mapping of $k_{r,l,i}^{(WB)}$ to $p_{r,l,i}^{(WB)}$

| $k_{r,l,i}^{(WB)}$ | $p_{r,l,i}^{(WB)}$ |
| --- | --- |
| 6 | $\sqrt{1/2}$ |
| 7 | 1 |

TABLE 3

Mapping of $k_{r,l,i}^{(SB)}$ to $p_{r,l,i}^{(SB)}$

| $k_{r,l,i}^{(SB)}$ | $p_{r,l,i}^{(SB)}$ |
| --- | --- |
| 0 | $\sqrt{1/2}$ |
| 1 | 1 |

The beam (or coefficient) amplitudes are represented by $$p_l^{(WB)} = [p_{0,l,0}^{(WB)}, p_{1,l,0}^{(WB)}, \ldots, p_{0,l,L-1}^{(WB)}, p_{1,l,L-1}^{(WB)}]$$

$$p_l^{(WB)} = [p_{0,l,0}^{(SB)}, p_{1,l,0}^{(SB)}, \ldots, p_{0,l,L-1}^{(SB)}, p_{1,l,L-1}^{(SB)}]$$
for $l=1, \ldots, v$.

The beam (or coefficient) phase indicators are $c_l = [c_{0,l,0}, c_{1,l,0}, \ldots, c_{0,l,L-1}, c_{1,l,L-1}]$ for $l=1, \ldots, v$.

When CodebookConfig-Amp is set to WB-Amplitude, $k_{r,l,i}^{(WB)} \in \{0, 1, \ldots, 7\}$ and $k_{r,l,i}^{(SB)}=1$ for $r=0, 1, l=1, \ldots, v$, and $i=0, 1, \ldots, L-1$. $k_l^{(SB)}$ is not reported for $l=1, \ldots, v$. The indicators $k_{r_l^{max},l,i_l^{max}}^{(WB)}=7$ and $c_{r_l^{max},l,i_l^{max}}=0$ ($l=1, \ldots, v$). $k_{r_l^{max},l,i_l^{max}}^{(WB)}$ and $c_{r_l^{max},l,i_l^{max}}$ are not reported for $l=1, \ldots, v$. The remaining $2L-1$ elements of $k_l^{(WB)}$ ($l=1, \ldots, v$) are reported. The elements of $c_l$ ($l=1, \ldots, v$) corresponding to the coefficients $p_{r,l,i}^{(WB)} > 0$, as determined by the reported elements of $k_l^{(WB)}$, are reported, where $c_{r,l,i} \in \{0, 1, \ldots, N_{PSK}-1\}$.

When CodebookConfig-Amp is set to WBPlusSB-Amplitude, $k_{r,l,i}^{(WB)} \in \{0, 1, \ldots, 7\}$ $r=0, 1, l=1, \ldots, v$, and $i=0, 1, \ldots, L-1$. The indicators $k_{r_l^{max},l,i_l^{max}}^{(WB)}=7$, and $k_{r_l^{max},l,i_l^{max}}^{(SB)}=$, and $c_{r_l^{max},l,i_l^{max}}=0$ ($l=1, \ldots, v$). $k_{r_l^{max},l,i_l^{max}}^{(WB)}$, $k_{r_l^{max},l,i_l^{max}}^{(SB)}$ and $c_{r_l^{max},l,i_l^{max}}^{(SB)}$ are not reported for $l=1, \ldots, v$. The remaining $2L-1$ elements of $k_l^{(WB)}$ ($l=1, \ldots, v$) are reported. Let $M_l$ ($l=1, \ldots, v$) be the number of elements of $k_l^{(WB)}$ that satisfy $p_{r,l,i}^{(WB)} > 0$. The elements of $k_l^{(SB)}$ and $c_l$ ($l=1, \ldots, v$) corresponding to the min($M_l, K^{(SB)}$)−1 strongest beams (or coefficients) in the reported elements of $k_l^{(WB)}$, as determined by the corresponding elements of $p_l^{(WB)}$, are reported, where $k_{r,l,i}^{(SB)} \in \{0,1\}$ and $c_{r,l,i} \in \{0, 1, \ldots, N_{PSK}-1\}$. When two or more elements of $p_l^{(WB)}$ are identical, then the element with lower indices (starting from the left-hand-size of $p_l^{(WB)}$ have higher priority for $k_l^{(SB)}$ and $c_l$ ($l=1, \ldots, v$) reporting. The values of $K^{(SB)}$ are given in TABLE 4. The remaining $2L-\min(M_l, K^{(SB)})$ elements of $k_l^{(SB)}$ ($l=1, \ldots, v$) are not reported. The remaining $2L-\min(M_l, K^{(SB)})$ elements of $c_l$ ($l=1, \ldots, v$) are reported, where $c_{r,l,i} \in \{0,1,2,3\}$.

TABLE 4

Full resolution subband coefficients when WBPlusSB-Amplitude is configured

| L | $K^{(SB)}$ |
| --- | --- |
| 2 | 4 |
| 3 | 4 |
| 4 | 6 |

The codebook entry for v=1 is $W_{q,n_1,n_2,p_1^{(WB)},p_1^{(SB)},c_1}^{(1)}$ and the codebook entry for v=2 is $W_{q,n_1,n_2,p_1^{(WB)},p_1^{(SB)},c_1,p_2^{(WB)},p_2^{(SB)},c_2}^{(2)}$ where $$W_{q,n_1,n_2,p_l^{(WB)},p_l^{(SB)},c_l}^l = \frac{1}{\sqrt{N_1 N_2 \sum_{i=0}^{L-1}\left[(p_{0,l,i}^{(WB)} p_{0,l,i}^{(SB)})^2 + (p_{1,l,i}^{(WB)} p_{1,l,i}^{(SB)})^2\right]}} \begin{bmatrix} \sum_{i=0}^{L-1} v_{m_1^{(i)},m_2^{(i)}} p_{0,l,i}^{(WB)} p_{0,l,i}^{(SB)} \varphi_{0,l,i} \\ \sum_{i=0}^{L-1} v_{m_1^{(i)},m_2^{(i)}} p_{1,l,i}^{(WB)} p_{1,l,i}^{(SB)} \varphi_{1,l,i} \end{bmatrix},$$

l=1,2, $W_{q,n_1,n_2,p_1^{(WB)},p_1^{(SB)},c_1}^{(1)} = W_{q,n_1,n_2,p_1^{(WB)},p_1^{(SB)},c_1}^{1}$, and $$W_{q,n_1,n_2,p_1^{(WB)},p_1^{(SB)},c_1,p_2^{(WB)},p_2^{(SB)},c_2}^{(2)} = \frac{1}{\sqrt{2}}\left[ W_{q,n_1,n_2,p_1^{(WB)},p_1^{(SB)},c_1}^{1} \quad W_{q,n_1,n_2,p_2^{(WB)},p_2^{(SB)},c_2}^{2} \right].$$

The quantities $m_1^{(i)}$ and $m_2^{(i)}$ are given by $$m_1^{(i)} = O_1 n_1^{(i)} + q_1$$
$$m_2^{(i)} = O_2 n_2^{(i)} + q_2$$

for i=0, 1, ..., L−1. The quantities $\varphi_{r,l,i}$, $u_m$, and $v_{l,m}$ are given by $$\varphi_{r,l,i} = \begin{cases} e^{j2\pi c_{r,l,i}/N_{PSK}} & WB-\text{Amplitude} \\ e^{j2\pi c_{r,l,i}/N_{PSK}} & WBPlusSB-\text{Amplitude}, K^{(SB)} - \\ & 1 \text{ strongest beams (coefficients)} \\ e^{j2\pi c_{r,l,i}/4} & WBPlusSB-\text{Amplitude}, 2L - \\ & K^{(SB)} \text{ weakest beams (coefficients)} \end{cases}$$

$$u_m = \begin{cases} \left[ 1 \quad e^{j\frac{2\pi m}{O_2 N_2}} \quad \ldots \quad e^{j\frac{2\pi m(N_2-1)}{O_2 N_2}} \right] & N_2 > 1 \\ 1 & N_2 = 1 \end{cases}$$

$$v_{l,m} = \left[ u_m \quad e^{j\frac{2\pi l}{O_1 N_1}} u_m \quad \ldots \quad e^{j\frac{2\pi l(N_1-1)}{O_1 N_1}} u_m \right]^T$$

In some embodiments 9-1, a UE is configured with a 1 layer and a 2 layer codebooks for Type II (high-resolution) CSI reporting as follows. In one example, for 4 antenna ports (e.g. {3000, 3001, 3002, 3003}), 8 antenna ports (e.g. {3000, 3001, ..., 3007}), 12 antenna ports (e.g. {3000, 3001, ..., 3011}), 16 antenna ports (e.g. {3000, 3001, ..., 3015}), 24 antenna ports (e.g. {13000, 3001, ..., 3023}), and 32 antenna ports (e.g. {3000, 3001, ..., 3031}), when the UE is configured with higher layer parameters CodebookType set to TypeII and CodebookParameters set to Type2_Parameters, where Type2_Parameters contains parameters {CodebookConfig-N1, CodebookConfig-N2, NumberOfBeams, PhaseAlphabetSize, SubbandAmplitude}: The values of $N_1$ and $N_2$ are configured with the higher-layer parameters CodebookConfig-N1 and CodebookConfig-N2, respectively. The supported configurations of ($N_1$, $N_2$) for a given number of CSI-RS ports and the corresponding values of ($O_1$, $O_2$) are given in TABLE 1. The number of CSI-RS ports, $P_{CSI-RS}$, is $2N_1 N_2$; the value of L is configured with the higher-layer parameter NumberOfBeams, where L=2 when $P_{CSI-RS}$=4 and L∈{2,3,4} when $P_{CSI-RS}$>4; the value of $N_{PSK}$ is configured with the higher-layer parameter PhaseAlphabetSize, where $N_{PSK}$∈{4,8}; and the UE is configured with the higher-layer parameter SubbandAmplitude set to OFF or ON.

When v≤2, where v is the associated RI value, each PMI value corresponds to the codebook indices $i_1$ and $i_2$ where $$i_1 = \begin{cases} [i_{1,1} \quad i_{1,2} \quad i_{1,3} \quad i_{1,4,1} \quad i_{1,5,1}] & v = 1 \\ [i_{1,1} \quad i_{1,2} \quad i_{1,3} \quad i_{1,4,1} \quad i_{1,5,1} \quad i_{1,4,2} \quad i_{1,4,2}] & v = 2 \end{cases} \text{ and }$$

$$i_2 = \begin{cases} [i_{2,1,1}] & SubbandAmplitude = \text{OFF}, v = 1 \\ [i_{2,1,1} \quad i_{2,1,2}] & SubbandAmplitude = \text{OFF}, v = 2 \\ [i_{2,1,1} \quad i_{2,2,1}] & SubbandAmplitude = \text{ON}, v = 1 \\ [i_{2,1,1} \quad i_{2,2,1} \quad i_{2,1,2} \quad i_{2,2,2}] & SubbandAmplitude = \text{ON}, v = 2 \end{cases}.$$

The L vectors for combination are identified by the indices $i_{1,1}$, $i_{1,2}$, and $i_{1,3}$, where $$i_{1,3} = [n_1 \quad n_2]$$
$$n_1 = [n_1^{(0)}, \ldots, n_1^{(L-1)}]$$
$$i_{1,1} \in \{0, 1, \ldots, O_1 - 1\}$$
$$i_{1,2} \in \{0, 1, \ldots, O_2 - 1\} \text{ and } n_2 = [n_2^{(0)}, \ldots, n_2^{(L-1)}].$$
$$n_1^{(i)} \in \{0, 1, \ldots, N_1 - 1\}$$
$$n_2^{(i)} \in \{0, 1, \ldots, N_2 - 1\}$$

In one example, if $N_2$=1, $i_{1,2}$=0 and $n_2^{(i)}$=0 for i=0, 1, ..., L−1, and neither $i_{1,2}$ nor $n_2$ are reported. In another example, when ($N_1$, $N_2$)=(2,1), $n_1$=[0,1] and $n_2$=[0,0], and $i_{1,3}$ is not reported. In yet another example, when ($N_1$, $N_2$)=(4,1) and L=4, $n_1$=[0,1,2,3] and $n_2$=[0,0,0,0], and $i_{1,3}$ is not reported. In yet another example, when ($N_1$, $N_2$)=(2,2) and L=4, $n_1$=[0,0,1,1] and $n_2$=[0,1,0,1], and $i_{1,3}$ is not reported.

Two alternatives to report [$n_1$ $n_2$] are as follows. In one example of Alt 9-1-0 (independent reporting), ($n_1^{(i)}$,$n_2^{(i)}$) for i=0, 1, ..., L−1 are reported independently using ⌈$\log_2$($N_1 N_2$)⌉ bits per vector (beam). In another example of Alt 9-1-1 (joint reporting), ($n_1^{(i)}$,$n_2^{(i)}$) for i=0, 1, ..., L−1 are reported jointly in accordance with a combinatorial index $$r = \sum_{i=0}^{L-1} \begin{pmatrix} N_1 N_2 - 1 - s_i \\ L - i \end{pmatrix}$$

where $s_i = N_2 n_1^{(i)} + n_2^{(i)}$ are (sorted) orthogonal beam indices (where the corresponding oversampled DFT beam indices $k_j = O_j n_j^{(i)} + q_j$, j=1,2) and $$\begin{Bmatrix} x \\ y \end{Bmatrix} = \begin{cases} \begin{pmatrix} x \\ y \end{pmatrix} & x \geq y \\ 0 & x < y \end{cases}$$

is the extended binomial coefficient.

The strongest coefficient on layer $l, l=1, \ldots, \nu$ is identified by $i_{1,4,l} = b_l^{max} \in \{0, 1, \ldots, 2L-1\}$. The amplitude coefficient indicators $i_{1,5,l}$ and $i_{2,2,l}$ are $$i_{1,5,l} = k_l^{(1)} = [k_{l,0}^{(1)}, k_{l,1}^{(1)}, \ldots, k_{l,2L-1}^{(1)}]$$

$$i_{2,2,l} = k_l^{(2)} = [k_{l,0}^{(2)}, k_{l,1}^{(2)}, \ldots, k_{l,2L-1}^{(2)}]$$

$$k_{l,i}^{(1)} \in \{0, 1, \ldots, 7\}$$

$$k_{l,i}^{(2)} \in \{0, 1\}$$

for $l=1, \ldots, \nu$. The mapping from $k_{l,i}^{(1)}$ to the amplitude coefficient $p_{l,i}^{(1)}$ is given in TABLE 5 and the mapping from $k_{l,i}^{(2)}$ to the amplitude coefficient $p_{l,i}^{(2)}$ is given in TABLE 6. The amplitude coefficients are represented by $$p_l^{(1)} = [p_{l,0}^{(1)}, p_{l,1}^{(1)}, \ldots, p_{l,2L-1}^{(1)}]$$

$$p_l^{(2)} = [p_{l,0}^{(2)}, p_{l,1}^{(2)}, \ldots, p_{l,2L-1}^{(2)}]$$

for $l=1, \ldots, \nu$.

TABLE 5

Mapping of elements of $i_{1,5,l}$: $k_{l,i}^{(1)}$ to $p_{l,i}^{(1)}$

| $k_{l,i}^{(1)}$ | $p_{l,i}^{(1)}$ |
| --- | --- |
| 0 | 0 |
| 1 | $\sqrt{1/64}$ |
| 2 | $\sqrt{1/32}$ |
| 3 | $\sqrt{1/16}$ |
| 4 | $\sqrt{1/8}$ |
| 5 | $\sqrt{1/4}$ |
| 6 | $\sqrt{1/2}$ |
| 7 | 1 |

TABLE 6

Mapping of elements of $i_{2,2,l}$: $k_{l,i}^{(2)}$ to $p_{l,i}^{(2)}$

| $k_{l,i}^{(2)}$ | $p_{l,i}^{(2)}$ |
| --- | --- |
| 0 | $\sqrt{1/2}$ |
| 1 | 1 |

The phase coefficient indicators are $i_{2,1,l} = c_l = [c_{l,0}, c_{l,1}, \ldots, c_{l,2L-1}]$ for $l=1, \ldots, \nu$. The amplitude and phase coefficient indicators are reported as follows. In one example, the indicators $k_{l,b_l^{max}}^{(1)} = 7$, $k_{l,b_l^{max}}^{(2)} = 1$, and $c_{l,b_l^{max}} = 0$ ($l=1, \ldots, \nu$). $k_{l,b_l^{max}}^{(1)}$, $k_{l,b_l^{max}}^{(2)}$, and $c_{l,b_l^{max}}$ are not reported for $l=1, \ldots, \nu$. In another example, the remaining $2L-1$ elements of $k_l^{(1)}$ ($l=1, \ldots, \nu$) are reported, where $k_{l,i}^{(1)} \in \{0, 1, \ldots, 7\}$. Let $M_l$ ($l=1, \ldots, \nu$) be the number of elements of $k_l^{(1)}$ that satisfy $k_{l,i}^{(1)} > 0$. In yet another example, the remaining $2L-1$ elements of $k_l^{(2)}$ and $c_l$ ($l=1, \ldots, \nu$) are reported as follows. In one instance, when SubbandAmplitude=OFF, $k_{l,i}^{(2)} = 1$ for $l=1, \ldots, \nu$ and $i=0, 1, \ldots, 2L-1$. $k_l^{(2)}$ is not reported for $l=1, \ldots, \nu$; and for $l=1, \ldots, \nu$, the $M_l-1$ elements of $c_l$ corresponding to the coefficients that satisfy $k_{l,i}^{(1)} > 0$, as determined by the reported elements of $k_l^{(1)}$, are reported, where $c_{l,i} \in \{0, 1, \ldots, N_{PSK}-1\}$, and the remaining $2L-M_l$ elements of $c_l$ are not reported and are set to $c_{l,i} = 0$. In another instance, when SubbandAmplitude=ON, for $l=1, \ldots, \nu$, the elements of $k_l^{(2)}$ and $c_l$ corresponding to the $\min(M_l, K^{(2)})-1$ strongest coefficients, as determined by the corresponding elements of $k_l^{(1)}$, are reported, where $k_{l,i}^{(2)} \in \{0,1\}$ and $c_{l,i} \in \{0, 1, \ldots, N_{PSK}-1\}$. The values of $K^{(2)}$ are given in TABLE 7. The remaining $2L-\min(M_l, K^{(2)})$ elements of $k_l^{(2)}$ are not reported and are set to $k_{l,i}^{(2)}=1$. The remaining $2L-\min(M_l, K^{(2)})$ elements of $c_l$ are reported, where $c_{l,i} \in \{0, 1, 2, 3\}$. In another instance, when two elements, $k_{1,x}^{(1)}$ and $k_{1,y}^{(1)}$, of the reported $k_l^{(1)}$ are identical ($k_{1,x}^{(1)} = k_{1,y}^{(1)}$), then the element $\min(x,y)$ is prioritized to be included in the set of the $\min(M_l, K^{(2)})-1$ strongest coefficients for $k_l^{(2)}$ and $c_l$ ($l=1, \ldots, \nu$) reporting. In another alternative, $\max(x,y)$ is prioritized to be included in the set of the $\min(M_l, K^{(2)})-1$ strongest coefficients for $k_l^{(2)}$ and $c_l$ ($l=1, \ldots, \nu$) reporting.

TABLE 7

Full resolution subband coefficients when SubbandAmplitude = ON

| L | $K^{(2)}$ |
| --- | --- |
| 2 | 4 |
| 3 | 4 |
| 4 | 6 |

The codebook for 1-2 layers is given in TABLE 8, where the quantities $m_1^{(i)}$ and $m_2^{(i)}$ are given by $$m_1^{(i)} = O_1 n_1^{(i)} + q_1$$

$$m_2^{(i)} = O_2 n_2^{(i)} + q_2$$

for $i=0, 1, \ldots, L-1$, and the quantities $\varphi_{l,i}$, $u_m$, $v_{l,m}$ are given by $$\varphi_{l,i} = \begin{cases} e^{j2\pi c_{l,i}/N_{PSK}} & \text{SubbandAmplitude = OFF} \\ e^{j2\pi c_{l,i}/N_{PSK}} & \text{SubbandAmplitude = ON, } \min(M_l, K^{(2)}) - \\ & 1 \text{ strongest coefficients} \\ e^{j2\pi c_{l,i}/4} & \text{SubbandAmplitude = ON, } 2L - \min(M_l, K^{(2)}) \\ & \text{weakest coefficients} \end{cases}$$

$$u_m = \begin{cases} \left[ 1 \quad e^{j\frac{2\pi m}{O_2 N_2}} \quad \ldots \quad e^{j\frac{2\pi m(N_2-1)}{O_2 N_2}} \right] & N_2 > 1 \\ 1 & N_2 = 1 \end{cases}$$

$$v_{l,m} = \left[ u_m \quad e^{j\frac{2\pi l}{O_1 N_1}} u_m \quad \ldots \quad e^{j\frac{2\pi l(N_1-1)}{O_1 N_1}} u_m \right]^T.$$

TABLE 8

Codebook for 1-layer and 2-layer CSI reporting using antenna ports [3000 to 2999 + $P_{CSI-RS}$]

$i_{1,1} = q_1 = 0, 1, \ldots, O_1 - 1$
$i_{1,2} = q_2 = 0, 1, \ldots, O_2 - 1$ if $N_2 > 1$; $i_{1,2} = q_2 = 0$ otherwise
$i_{1,3} = [n_1 \; n_2]$
$i_{1,4,l} = b_l^{max} = 0, 1, \ldots, 2L - 1$ TABLE 8-continued Codebook for 1-layer and 2-layer CSI reporting using antenna ports
[3000 to 2999 + $P_{CSI-RS}$]

| $i_{1,5,l} = k_l^{(1)} = [k_{l,0}^{(1)}, \ldots, k_{l,2L-1}^{(1)}]$ | $i_{2,1,l} = c_l = [c_{l,0}, \ldots, c_{l,2L-1}]$ | $i_{2,2,l} = k_l^{(2)} = [k_{l,0}^{(2)}, \ldots, k_{l,2L-1}^{(2)}]$ |
|---|---|---|
| The range of values of $k_{l,i}^{(1)}$ and mapping to $p_l^{(1)}$ as explained above | The range of values of $c_{l,i}$ as explained above | The range of values of $k_{l,i}^{(2)}$ and mapping to $p_l^{(2)}$ as explained above |

$$W^l_{q_1,q_2,n_1,n_2,p_l^{(1)},p_l^{(2)},c_l} = \frac{1}{\sqrt{N_1 N_2 \sum_{i=0}^{2L-1}(p_{l,i}^{(1)}p_{l,i}^{(2)})^2}} \begin{bmatrix} \sum_{i=0}^{L-1} v_{m_1^{(i)},m_2^{(i)}} p_{l,i}^{(1)} p_{l,i}^{(2)} \varphi_{l,i} \\ \sum_{i=0}^{L-1} v_{m_1^{(i)},m_2^{(i)}} p_{l,i+L}^{(1)} p_{l,i+L}^{(2)} \varphi_{l,i+L} \end{bmatrix},$$

$l = 1, 2$ 1 layer ($\upsilon = 1$): $W^{(1)}_{q_1,q_2,n_1,n_2,p_1^{(1)},p_1^{(2)},c_1} = W^1_{q_1,q_2,n_1,n_2,p_1^{(1)},p_1^{(2)},c_1}$ 2 layers ($\upsilon = 2$):

$W^{(2)}_{q_1,q_2,n_1,n_2,p_1^{(1)},p_1^{(2)},c_1,p_2^{(1)},p_2^{(2)},c_2} =$ $\frac{1}{\sqrt{2}}[W^1_{q_1,q_2,n_1,n_2,p_1^{(1)},p_1^{(2)},c_1} \quad W^2_{q_1,q_2,n_1,n_2,p_2^{(1)},p_2^{(2)},c_2}]$ In some embodiments 9-2, a UE is configured with a 1 layer and a 2 layer codebooks for Type II (high-resolution) CSI reporting as follows. For 4 antenna ports (e.g. {3000, 3001, 3002, 3003}), 8 antenna ports (e.g. {3000, 3001, ..., 3007}), 12 antenna ports (e.g. {3000, 3001, ..., 3011}), 16 antenna ports (e.g. {3000, 3001, ..., 3015}), 24 antenna ports (e.g. {13000, 3001, ..., 3023}), and 32 antenna ports (e.g. {3000, 3001, ..., 3031}), when the UE is configured with higher layer parameters CodebookType set to Type2_Parameters, where Type2_Parameters contains parameters (Codebook-Config-N1, CodebookConfig-N2, NumberOfBeams, PhaseAlphabetSize, SubbandAmplitude): the values of $N_1$ and $N_2$ are configured with the higher-layer parameters CodebookConfig-N1 and CodebookConfig-N2, respectively. The supported configurations of ($N_1$, $N_2$) for a given number of CSI-RS ports and the corresponding values of ($O_1$,$O_2$) are given in TABLE 1. The number of CSI-RS ports, $P_{CSI-RS}$, is $2N_1N_2$; the value of L is configured with the higher-layer parameter NumberOfBeams, where $L \in \{2,3,4\}$. When $P_{CSI-RS}=4$, $L>2$ is not supported; the value of $N_{PSK}$ is configured with the higher-layer parameter PhaseAlphabetSize, where $N_{PSK} \in \{4,8\}$; and the UE is configured with the higher-layer parameter SubbandAmplitude set to OFF or ON.

When $\upsilon \leq 2$, where $\upsilon$ is the associated RI value, each PMI value corresponds to the codebook indices $i_1$ and $i_2$ where $i_1 = \begin{cases} [i_{1,1} \quad i_{1,2} \quad i_{1,3,1} \quad i_{1,4,1}] & \upsilon = 1 \\ [i_{1,1} \quad i_{1,2} \quad i_{1,3,1} \quad i_{1,4,1} \quad i_{1,3,2} \quad i_{1,4,2}] & \upsilon = 2 \end{cases}$ and $i_2 = \begin{cases} [i_{2,1,1}] & SubbandAmplitude = OFF, \upsilon = 1 \\ [i_{2,1,1} \quad i_{2,1,2}] & SubbandAmplitude = OFF, \upsilon = 2 \\ [i_{2,1,1} \quad i_{2,2,1}] & SubbandAmplitude = ON, \upsilon = 1 \\ [i_{2,1,1} \quad i_{2,1,2} \quad i_{2,1,1} \quad i_{2,2,2}] & SubbandAmplitude = ON, \upsilon = 2 \end{cases}$ The L vectors combined by the codebook are identified by the indices $i_{1,1}$ and $i_{1,2}$, where $i_{1,1} = [q_1 \quad q_2]$ $q_1 \in \{0, 1, \ldots, O_1 - 1\}$ $q_2 \in \{0, 1, \ldots, O_2 - 1\}$ $i_{1,2} = [n_1 \quad n_2]$ $n_1 = [n_1^{(0)}, \ldots, n_1^{(L-1)}]$ and $n_2 = [n_2^{(0)}, \ldots, n_2^{(L-1)}]$.

$n_1^{(i)} \in \{0, 1, \ldots, N_1 - 1\}$ $n_1^{(i)} \in \{0, 1, \ldots, N_2 - 1\}$ In one example, if $N_2=1$, $q_2=0$ and $n_2^{(i)}=0$ for i=0, 1, ..., L-1, and neither $q_2$ nor $n_2$ are reported. In another example, when ($N_1$, $N_2$)=(2,1), $n_1=[0,1]$ and $n_2=[0,0]$, and $i_{1,2}$ is not reported. In yet another example, when ($N_1$, $N_2$)=(4,1) and L=4, $n_1=[0,1,2,3]$ and $n_2=[0,0,0,0]$, and $i_{1,2}$ is not reported. In yet another example, when ($N_1$, $N_2$)=(2,2) and L=4, $n_1=[0,0,1,1]$ and $n_2=[0,1,0,1]$, and $i_{1,2}$ is not reported. In yet another example, two alternatives to report [$q_1$ $q_2$] are as follows.

In one example of Alt 9-2-0 (independent reporting), $q_1$ and $q_2$ are reported independently using $\lceil \log_2 (O_1) \rceil = 2$ bits and $\lceil \log_2 (O_2) \rceil = 2$ bits only if $N_2=1$), respectively. In another example of Alt 9-2-1 (joint reporting), $q_1$ and $q_2$ are reported jointly in accordance with one of the two methods: (1) for a given $q_1$ and $q_2$, $i_{1,1}=O_2 q_1+q_2$ is reported which belongs to $\{0, 1, \ldots, O_1 O_2-1\}$ hence requires $\lceil \log_2 (O_1 O_2) \rceil = 4$ bits (if $N_2>1$) or 2 bits only if $N_2=1$). For a given $i_{1,1}$, $q_1 = \left\lfloor \frac{i_{1,1}}{O_2} \right\rfloor$ and $q_2 = i_{1,1} \mod O_1$; and (2) for a given $q_1$ and $q_2$, $i_{1,1}=O_1 q_2 + q_1$ is reported which belongs to $(0, 1, \ldots, O_1 O_2-1)$ hence requires $\lceil \log_2 (O_1 O_2) \rceil = 4$ bits (if $N_2>1$) or 2 bits only if $N_2=1$). For a given $i_{1,1}$, $q_2 = \left\lfloor \frac{i_{1,1}}{O_1} \right\rfloor$ and $q_1 = i_{1,1} \mod O_2$.

The strongest coefficient on layer l,l=1, ..., ν is identified by $i_{1,3,l} \in \{0,1, \ldots, 2L-1\}$. The amplitude coefficient indicators $i_{1,4,l}$ and $i_{2,2,l}$ are $$i_{1,4,l} = [k_{l,0}^{(1)}, k_{l,1}^{(1)}, \ldots, k_{l,2L-1}^{(1)}]$$

$$i_{2,2,l} = [k_{l,0}^{(2)}, k_{l,1}^{(2)}, \ldots, k_{l,2L-1}^{(2)}]$$

$$k_{l,i}^{(1)} \in \{0, 1, \ldots, 7\}$$

$$k_{l,i}^{(2)} \in \{0, 1\}$$

for l=1, ..., ν. The mapping from $k_{l,i}^{(1)}$ to the amplitude coefficient $p_{l,i}^{(1)}$, is given in TABLE 5 and the mapping from $k_{l,i}^{(2)}$ to the amplitude coefficient $p_{l,i}^{(2)}$ is given in TABLE 6. The amplitude coefficients are represented $$p_l^{(1)} = [p_{l,0}^{(1)}, p_{l,1}^{(1)}, \ldots, p_{l,2L-1}^{(1)}]$$

$$p_l^{(2)} = [p_{l,0}^{(2)}, p_{l,1}^{(2)}, \ldots, p_{l,2L-1}^{(2)}]$$

for l=1, ..., ν.

The phase coefficient indicators are $i_{2,1,l} = c_l = [c_{l,0}, c_{l,1}, \ldots, c_{l,2L-1}]$ for l=1, ..., ν. The amplitude and phase coefficient indicators are reported as follows. In one example, the indicators $k_{l,i_{1,3,l}}^{(1)}=7$, $k_{l,i_{1,3,l}}^{(2)}=1$, and $c_{l,i_{1,3,l}}=0$ (l=1, ..., ν). $k_{l,i_{1,3,l}}^{(1)}$, $k_{l,i_{1,3,l}}^{(2)}$, and $c_{l,i_{1,3,l}}$ are not reported for l=1, ..., ν. In another example, the remaining 2L−1 elements of $i_{1,4,l}$ (l=1, ..., ν) are reported, where $k_{l,i}^{(1)} \in \{0,1,\ldots,7\}$. Let $M_l$ (l=1, ..., ν) be the number of elements of $i_{1,4,l}$ that satisfy $k_{l,i}^{(1)}>0$. In another example, the remaining 2L−1 elements of $i_{2,1,l}$ and $i_{2,2,l}$ (l=1, ..., ν) are reported as follows. In one instance, when SubbandAmplitude=OFF, $k_{l,i}^{(2)}=1$ for l=1, ..., ν and i=0, 1, ..., 2L−1. $i_{2,2,l}$ is not reported for i=1, ..., ν and for l=1, ..., ν, the $M_l$−1 elements of $i_{2,1,l}$ corresponding to the coefficients that satisfy $k_{l,i}^{(1)}>0$, as determined by the reported elements of $i_{1,4,l}$, are reported, where $c_{l,i} \in \{0, 1, \ldots, N_{PSK}-1\}$, and the remaining $2L-M_l$ elements of $i_{2,1,l}$ are not reported and are set to $c_{l,i}=0$. In another instance, when SubbandAmplitude=ON, for l=1, ..., ν, the elements of $i_{2,2,l}$ and $i_{2,1,l}$ corresponding to the min($M_l$, $K^{(2)}$)−1 strongest coefficients, as determined by the corresponding elements of $i_{1,4,l}$, are reported, where $k_{l,i}^{(2)} \in \{0,1\}$ and $c_{l,i} \in \{0, 1, \ldots, N_{PSK}-1\}$. The values of $K^{(2)}$ are given in TABLE 7. The remaining 2L−min($M_l$, $K^{(2)}$) elements of $i_{2,2,l}$ are not reported and are set to $k_{l,i}^{(2)}=1$. The remaining 2L−min($M_l$, $K^{(2)}$) elements of $i_{2,1,l}$ are reported, where $c_{l,i} \in \{0,1,2,3\}$. In yet another instance of SubbandAmplitude=ON when two elements, $k_{l,x}^{(1)}$, and $k_{l,y}^{(1)}$, of the reported $i_{1,4,l}$ are identical ($k_{l,x}^{(1)}=k_{l,y}^{(1)}$), then the element min(x,y) is prioritized to be included in the set of the min($M_l$, $K^{(2)}$)−1 strongest coefficients for $i_{2,2,l}$ and $i_{2,1,l}$ (l=1, ..., ν) reporting. In another alternative, max(x,y) is prioritized to be included in the set of the min($M_l$, $K^{(2)}$)−1 strongest coefficients for $i_{2,2,l}$ and $i_{2,1,l}$ (l=1, ..., ν) reporting.

The codebook for 1-2 layers is given in TABLE 9, where the quantities $m_1^{(i)}$ and $m_2^{(i)}$ are given by $$m_1^{(i)} = O_1 n_1^{(i)} + q_1$$

$$m_2^{(i)} = O_2 n_2^{(i)} + q_2$$

for i=0, 1, ..., L−1, and the quantities $\varphi_{l,i}$, $u_m$, and $v_{l,m}$ are given $$\varphi_{l,i} = \begin{cases} e^{j2\pi c_{l,i}/N_{PSK}} & \text{SubbandAmplitude = OFF} \\ e^{j2\pi c_{l,i}/N_{PSK}} & \text{SubbandAmplitude = ON, min}(M_l, K^{(2)}) - \\ & 1 \text{ strongest coefficients} \\ e^{j2\pi c_{l,i}/4} & \text{SubbandAmplitude = ON, } 2L - \text{min}(M_l, K^{(2)}) \\ & \text{weakest coefficients} \end{cases}$$

$$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases}$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T.$$

TABLE 9

Codebook for 1-layer and 2-layer CSI reporting using antenna ports [3000 to 2999 + $P_{CSI-RS}$]

Layers $\upsilon = 1$ $$W_{q_1,q_2,n_1,n_2,p_l^{(1)},p_l^{(2)},i_{2,1,1}}^{(1)} = W_{q_1,q_2,n_1,n_2,p_l^{(1)},p_l^{(2)},i_{2,1,1}}^{1}$$

$\upsilon = 2$ $$W_{q_1,q_2,n_1,n_2,p_1^{(1)},p_1^{(2)},i_{2,1,1},p_2^{(1)},p_2^{(2)},i_{2,1,2}}^{(2)} =$$

$$\frac{1}{\sqrt{2}} \begin{bmatrix} W_{q_1,q_2,n_1,n_2,p_1^{(1)},p_1^{(2)},i_{2,1,1}}^1 & W_{q_1,q_2,n_1,n_2,p_2^{(1)},p_2^{(2)},i_{2,1,2}}^2 \end{bmatrix}$$

where $$W_{q_1,q_2,n_1,n_2,p_l^{(1)},p_l^{(2)},c_l}^l = \frac{1}{\sqrt{N_1 N_2 \sum_{i=0}^{2L-1} (p_{l,i}^{(1)} p_{l,i}^{(2)})^2}} \begin{bmatrix} \sum_{i=0}^{L-1} v_{m_1^{(i)},m_2^{(i)}} p_{l,i}^{(1)} p_{l,i}^{(2)} \varphi_{l,i} \\ \sum_{i=0}^{L-1} v_{m_1^{(i)},m_2^{(i)}} p_{l,i+L}^{(1)} p_{l,i+L}^{(2)} \varphi_{l,i+L} \end{bmatrix},$$

l = 1, 2, and the mappings from $i_1$ to $q_1$, $q_2$, $n_1$, $n_2$, $p_1^{(1)}$, and $p_2^{(1)}$, and from $i_2$ to $i_{2,1,1}$, $i_{2,1,2}$, $p_1^{(2)}$ and $p_2^{(2)}$, are as described above, including the ranges of the constituent indices of $i_1$ and $i_2$.

In some embodiments 10, a UE is configured with a dual-stage $W=W_1 W_2$ codebook for rank 1 and 2 as follows. In one example, the supported number of ports is up to 32 ports, i.e., $X=P \in \{4, 8, 12, 16, 24, 32\}$. In another example, the $W_1$ codebook is a port selection codebook (e.g., embodiment 1). In yet another example, the rank-R dual-stage precoding matrix structure is as follows: $W=W_1 W_2$, each column of W is normalized to $$\frac{1}{\sqrt{R}}; W_1 = \begin{bmatrix} E_{\frac{X}{2} \times L} & 0 \\ 0 & E_{\frac{X}{2} \times L} \end{bmatrix},$$

where $L \in \{2,3,4\}$ or $L \in \{1,2,3,4\}$ is configurable, and $X \geq 2L$; and $$W_2 = \begin{bmatrix} p_{0,0,0}^{(WB)} \cdot p_{0,0,0}^{(SB)} \cdot c_{0,0,0} & p_{0,1,0}^{(WB)} \cdot p_{0,1,0}^{(SB)} \cdot c_{0,1,0} \\ \vdots & \vdots \\ p_{0,0,L-1}^{(WB)} \cdot p_{0,0,L-1}^{(SB)} \cdot c_{0,0,L-1} & p_{0,1,L-1}^{(WB)} \cdot p_{0,1,L-1}^{(SB)} \cdot c_{0,1,L-1} \\ p_{1,0,L-1}^{(WB)} \cdot p_{1,0,L-1}^{(SB)} \cdot c_{1,0,L-1} & p_{1,1,L-1}^{(WB)} \cdot p_{1,1,L-1}^{(SB)} \cdot c_{1,1,L-1} \\ \vdots & \vdots \\ p_{1,0,L-1}^{(WB)} \cdot p_{1,0,L-1}^{(SB)} \cdot c_{1,0,L-1} & p_{1,1,L-1}^{(WB)} \cdot p_{1,1,L-1}^{(SB)} \cdot c_{1,1,L-1} \end{bmatrix}$$

for rank 2 (R=2), where $p_{r,l,i}^{(WB)}$ wideband (WB) coefficient amplitude scaling factor for coefficient i and on polarization r and layer l, $p_{r,l,i}^{(SB)}$ subband (SB) coefficient amplitude scaling factor for coefficient i and on polarization r and layer l, and $c_{r,l,i}$ combining coefficient (phase) for coefficient i and on polarization r and layer l.

In yet another example, the codebook for phase reporting is configurable (via RRC) between QPSK (2 bits) and 8PSK (3 bits). In yet another example, the amplitude scaling mode is configurable (via RRC) between WB+SB (with unequal bit allocation) and WB-only.

The strongest out of 2L coefficient is reported per layer in a WB manner, which requires $\lceil \log_2(2L) \rceil$ bits per layer. The rest of the (2L−1) coefficients are normalized by the strongest coefficient and the amplitude and phase of the normalized 2L−1 coefficients are reporter per layer.

The reporting of amplitude scaling is as follows: each amplitude scaling is independently, selected for each beam, polarization, and layer; a UE is configured to report wideband amplitude with or without subband amplitude; the wideband amplitude codebook is $\{1, \sqrt{0.5}, \sqrt{0.25}, \sqrt{0.125}, \sqrt{0.0625}, \sqrt{0.0313}, \sqrt{0.0156}, 0\}$, which requires 3 bits per WB amplitude; the subband amplitude codebook is $\{1, \sqrt{0.5}\}$, which requires 1 bit per SB amplitude; and the PMI payload (amplitude and phase) can vary depending on whether a WB amplitude is zero or not.

The reporting of phase for combining coefficients is as follows: each phase is reported independently per SB, selected for each beam, polarization, and layer; and the phase codebook is either $\{e^{j\frac{\pi n}{2}}, n = 0, 1, 2, 3\}$ (2 bits) or $\{e^{j\frac{\pi n}{4}}, n = 0, 1, \ldots, 7\}$ (3 bits).

In some embodiment 10-0, the port selection matrix $$E_{\frac{X}{2} \times L}$$

is based on fixed port selection patterns. For example, $$E_{\frac{X}{2} \times L} = \begin{bmatrix} e_{mod(md, \frac{X}{2})}^{(\frac{X}{2})} & e_{mod(md+1, \frac{X}{2})}^{(\frac{X}{2})} & \cdots & e_{mod(md+L-1, \frac{X}{2})}^{(\frac{X}{2})} \end{bmatrix}$$

where $e_i^{(\frac{X}{2})}$ is a length X/2 port select column vector whose all entries all zero except i-th entry which is 1, m∈

$$\left\{0, 1, \ldots, \left\lceil \frac{X}{2d} \right\rceil - 1\right\},$$

d∈{1, 2,3,4} is configurable (via RRC), and d≤L and d<X The overhead for port selection reporting using the $W_1$ codebook is $$\left\lceil \log_2 \left\lceil \frac{X}{2d} \right\rceil \right\rceil$$

bits, which is reported in a WB manner and it is common for all layers and two polarizations.

In some embodiment 10-1, the port selection matrix $$E_{\frac{X}{2} \times L}$$

is based on free port selection from any of X/2 ports. The overhead for port selection reporting using the $W_1$ codebook is $$\left\lceil \log_2 \binom{X/2}{L} \right\rceil$$

bits, which is reported in a WB manner and it is common for all layers and two polarizations.

In some embodiment 10-2, a UE is configured with a 1 layer and a 2 layer codebooks for Type II (high-resolution) CSI reporting as follows. For 4 antenna ports (e.g. {15, 16, 17, 18}), 8 antenna ports (e.g. {15, 16, ..., 22}), 12 antenna ports (e.g. {15, 16, ..., 26}), 16 antenna ports (e.g. {15, 16, ..., 30}), 24 antenna ports (e.g. {15, 16, ..., 38}), and 32 antenna ports (e.g. {15, 16, ..., 46}), when the UE is configured with higher layer parameter TypeIIBFCSI-RSCodebookEnabled: the number of CSI-RS ports is given by $P_{CSI-RS} \in \{4,8,12,16,24,32\}$; the value of d is configured with the higher layer parameter CodebookConfig-d, where d∈{1,2,3,4}; the value of L is configured with the higher-layer parameter CodebookConfig-L, where L∈{2,3,4}. When $P_{CSI-RS}=4$, L>2 is not supported; the value of $N_{PSK}$ is configured with the higher-layer parameter CodebookConfig-Phase, where $N_{PSK} \in \{4,8\}$; and the UE is configured with the higher-layer parameter CodebookConfig-Amp set to WB-Amplitude or WBPlusSB-Amplitude.

When ν≤2, where ι is the associated RI value, each PMI value corresponds to the codebook indices $i_1$ and $i_2$ where $$i_1 = \begin{cases} [i_{1,1} \quad b_1^{max} \quad k_1^{(WB)}] & \nu = 1 \\ [i_{1,1} \quad b_1^{max} \quad k_1^{(WB)} \quad b_2^{max} \quad k_2^{(WB)}] & \nu = 2 \end{cases}$$

$$i_2 = \begin{cases} [c_1] & WB-\text{amplitude } \nu = 1 \\ [c_1 \quad c_2] & WB-\text{amplitude, } \nu = 2 \\ [c_1 \quad k_2^{(SB)}] & WBPlusSB-\text{amplitude, } \nu = 1 \\ [c_1 \quad c_2 \quad k_1^{(SB)} \quad k_2^{(SB)}] & WBPlusSB-\text{amplitude, } \nu = 2 \end{cases}.$$

The antenna ports are selected by the quantity $i_{1,1}$, where $$i_{1,1} \in \left\{0, 1, \ldots, \left\lceil \frac{P_{CSI-RS}}{2d} \right\rceil - 1\right\}.$$

The strongest beam (or coefficient) on layer $l$, $l=1, \ldots, v$ is identified by $b_l^{max}=[i_l^{max}, r_l^{max}]$ where $i_l^{max} \in \{0, 1, \ldots, L-1\}$ is the beam (or coefficient) index and $r_l^{max} \in \{0,1\}$ identifies the polarization. $i_l^{max}$ and $r_l^{max}$ are reported for $l=1, \ldots, v$. The beam (or coefficient) amplitude indicators $k_l^{(WB)}$ and $k_l^{(SB)}$ are $$k_l^{(WB)} = [k_{0,l,0}^{(WB)}, k_{1,l,0}^{(WB)}, \ldots, k_{0,l,L-1}^{(WB)}, k_{1,l,L-1}^{(WB)}]$$
$$k_l^{(SB)} = [k_{0,l,0}^{(SB)}, k_{1,l,0}^{(SB)}, \ldots, k_{0,l,L-1}^{(SB)}, k_{1,l,L-1}^{(SB)}]$$
$$k_{r,l,i}^{(WB)} \in \{0, 1, \ldots, 7\}$$
$$k_{r,l,i}^{(SB)} \in \{0, 1\}$$

for $l=1, \ldots, v$.

The mapping from $k_{r,l,i}^{(WB)}$ to the beam (or coefficient) amplitude $p_{r,l,i}^{(WB)}$ is given in TABLE 2 and the mapping from $k_{r,l,i}^{(SB)}$ to the beam amplitude $p_{r,l,i}^{(SB)}$ is given in TABLE 3. The beam (or coefficient) amplitudes are represented by $$p_l^{(WB)} = [p_{0,l,0}^{(WB)}, p_{1,l,0}^{(WB)}, \ldots, p_{0,l,L-1}^{(WB)}, p_{1,l,L-1}^{(WB)}]$$
$$p_l^{(SB)} = [p_{0,l,0}^{(SB)}, p_{1,l,0}^{(SB)}, \ldots, p_{0,l,L-1}^{(SB)}, p_{1,l,L-1}^{(SB)}]$$

for $i=1, \ldots, v$.

The beam (or coefficient) phase indicators are $c_l=[c_{0,l,0}, c_{1,l,0}, \ldots, c_{0,l,L-1}, c_{1,l,L-1}]$ for $l=1, \ldots, v$. When CodebookConfig-Amp is set to WB-Amplitude, $k_{r,l,i}^{(WB)} \in \{0, 1, \ldots, 7\}$, $k_{r,l,i}^{(SB)}=1$, and $c_{r,l,i} \in \{0, 1, \ldots, N_{PSK}-1\}$ for $r=0, 1, l=1, \ldots, v$, and $i=0, 1, \ldots, L-1$. $k_l^{(SB)}$ is not reported for $l=1, \ldots, v$. The indicators $k_{r_l^{max},l,i_l^{max}}^{(WB)}=7$ and $c_{r_l^{max},l,i_l^{max}}=0$. ($l=1, \ldots, v$). $k_{r_l^{max},l,i_l^{max}}^{(WB)}$ and $c_{r_l^{max},l,i_l^{max}}$ are not reported for $l=1, \ldots, v$. The remaining $2L-1$ elements of $k_l^{(WB)}$ and $c_l$ ($l=1, \ldots, v$) are reported. When CodebookConfig-Amp is set to WBPlusSB-Amplitude, $k_{r,l,i}^{(WB)} \in \{0, 1, \ldots, 7\}$ $r=0, 1, l=1, \ldots, v$, and $l=0, 1, \ldots, L-1$. The indicators $k_{r_l^{max},l,i_l^{max}}^{(WB)}=7$, $k_{r_l^{max},l,i_l^{max}}^{(SB)}=1$, and $c_{r_l^{max},l,i_l^{max}}=0$ ($l=1, \ldots, v$). $k_{r_l^{max},l,i_l^{max}}^{(WB)}$, $k_{r_l^{max},l,i_l^{max}}^{(SB)}$, and $c_{r_l^{max},l,i_l^{max}}$ are not reported for $i=1, \ldots, v$. The remaining $2L-1$ elements of $k_l^{(WB)}$ ($l=1, \ldots, v$) are reported. The elements of $k_l^{(SB)}$ and $c_l$ ($l=1, \ldots, v$) corresponding to the $K^{(SB)}-1$ strongest beams (or coefficients) in the reported elements of $k_l^{(WB)}$, as determined by the corresponding elements of $p_l^{(WB)}$, are reported, where $k_{r,l,i}^{(SB)} \in \{0,1\}$ and $c_{r,l,i} \in \{0, 1, \ldots, N_{PSK}-1\}$. When two elements of $p_l^{(WB)}$ are identical, then the element with smaller index (starting from the left-hand-size of $p_l^{(WB)}$) has higher priority for $k_l^{(SB)}$ reporting. The values of $K^{(SB)}$ are given in TABLE 4. The remaining $2L-K^{(SB)}$ elements of $k_l^{(SB)}$ ($l=1, \ldots, v$) are not reported. The remaining $2L-K^{(SB)}$ elements of $c_l$ ($l=1, \ldots, v$) are reported, where $c_{r,l,i} \in \{0,1,2,3\}$).

The codebook entry for $v=1$ is $W_{i_{1,1},p_1^{(WB)},p_1^{(SB)},c_1}^{(1)}$ and the codebook entry for $v=2$ is $W_{i_{1,1},p_1^{(WB)},p_1^{(SB)},c_1}^{(2)}$ where $$W_{i_{1,1},p_l^{(WB)},p_l^{(SB)},c_l}^{l} = \frac{1}{\sqrt{\sum_{i=0}^{L-1}(p_{0,l,i}^{(WB)}p_{0,l,i}^{(SB)})^2 + (p_{1,l,i}^{(WB)}p_{1,l,i}^{(SB)})^2}} \begin{bmatrix} \sum_{i=0}^{L-1} v_{i_{1,1}d+i} p_{0,l,i}^{(WB)} p_{0,l,i}^{(SB)} \varphi_{0,l,i} \\ \sum_{i=0}^{L-1} v_{i_{1,1}d+i} p_{1,l,i}^{(WB)} p_{1,l,i}^{(SB)} \varphi_{1,l,i} \end{bmatrix},$$

$l=1,2$, $$W_{i_{1,1},p_1^{(WB)},p_1^{(SB)},c_1}^{(1)} = W_{i_{1,1},p_1^{(WB)},p_1^{(SB)},c_1}^{1}, \text{ and}$$

$$W_{i_{1,1},p_1^{(WB)},p_1^{(SB)},c_1,p_2^{(WB)},p_2^{(SB)},c_2}^{(2)} = \frac{1}{\sqrt{2}} \begin{bmatrix} W_{i_{1,1},p_1^{(WB)},p_1^{(SB)},c_1}^{1} & W_{i_{1,1},p_2^{(WB)},p_2^{(SB)},c_2}^{2} \end{bmatrix}$$

The quantity $\varphi_{r,l,i}$ is given by $$\varphi_{r,l,i} = \begin{cases} e^{j2\pi c_{r,l,i}/N_{PSK}} & WB - \text{Amplitude} \\ e^{j2\pi c_{r,l,i}/N_{PSK}} & WBPlusSB - \text{Amplitude, } K^{(SB)} - 1 \text{ strongest beams} \\ & \text{(coefficients)} \\ e^{j2\pi c_{r,l,i}/4} & WBPlusSB - \text{Amplitude, } 2L - K^{(SB)} \text{ weakest beams} \\ & \text{(coefficients)} \end{cases}$$

and $v_m$ is a $P_{CSI-RS}/2$-element column vector containing a value of 1 in element ($m \mod P_{CSI-RS}/2$) and zeros elsewhere, i.e, $v_m = [0_{1 \times m} \ 1 \ 0_{1 \times (L-m-1)}]^T$ where $0_{1 \times 0}=[\ ]$ (empty) and $0_{1 \times m}$, is a zero vector of length m.

In some embodiment 10-3, a UE is configured with a 1 layer and a 2 layer codebooks for Type II (high-resolution) CSI reporting as follows. For 4 antenna ports (e.g. {3000, 3001, 3002, 3003}), 8 antenna ports (e.g. {3000, 3001, . . . , 3007}), 12 antenna ports (e.g. {3000, 3001, . . . , 3011}), 16 antenna ports (e.g. {3000, 3001, . . . , 3015}), 24 antenna ports (e.g. {13000, 3001, . . . , 3023}), and 32 antenna ports (e.g. {3000, 3001, . . . , 3031}), when the UE is configured with higher layer parameters CodebookType set to Type2_Parameters, where Type2_Parameters contains parameters (Codebook-Config-N1, CodebookConfig-N2, NumberOfBeams, Phase-AlphabetSize, SubbandAmplitude, PortSelectionSampling-Size): the number of CSI-RS ports is given by $P_{CSI-RS} \in \{4, 8,12,16,24,32\}$; the value of L is configured with the higher-layer parameter NumberOfBeams, where $L \in \{2,3,4\}$ when $P_{CSI-RS}>4$ and L=2 when $P_{CSI-RS}=4$; the value of d is configured with the higher layer parameter PortSelection-SamplingSize, where $d \in \{1,2,3,4\}$, $$d \leq \frac{P_{CSI-RS}}{2}$$

$d \leq L$, alternatively $$d \leq \min\left(\frac{P_{CSI-RS}}{2}, L\right);$$

the value of $N_{PSK}$ is configured with the higher-layer parameter PhaseAlphabetSize, where $N_{PSK} \in \{4,8\}$; and the UE is configured with the higher-layer parameter SubbandAmplitude set to OFF or ON.

When $v \leq 2$, where $v$ is the associated RI value, each PMI value corresponds to the codebook indices $i_1$ and $i_2$ where $$i_1 = \begin{cases} [i_{1,1} \quad i_{1,4,1} \quad i_{1,5,1}] & v = 1 \\ [i_{1,1} \quad i_{1,4,1} \quad i_{1,5,1} \quad i_{1,4,2} \quad i_{1,5,2}] & v = 2 \end{cases} \text{ and}$$

$$i_2 = \begin{cases} [i_{2,1,1}] & SubbandAmplitude = OFF, v = 1 \\ [i_{2,1,1} \quad i_{2,1,2}] & SubbandAmplitude = OFF, v = 2 \\ [i_{2,1,1} \quad i_{2,2,1}] & SubbandAmplitude = ON, v = 1 \\ [i_{2,1,1} \quad i_{2,2,1} \quad i_{2,1,2} \quad i_{2,2,2}] & SubbandAmplitude = ON, v = 2 \end{cases}$$

The L antenna ports per polarization are selected by the quantity $i_{1,1}$, where $$i_{1,1} \in \left\{0, 1, \ldots, \left\lceil \frac{P_{CSI-RS}}{2d} \right\rceil - 1\right\}.$$

The strongest coefficient on layer $l, l=1, \ldots, v$ is identified by $i_{1,4,l} = b_l^{max} \in \{0, 1, \ldots, 2L-1\}$. The coefficient amplitude indicators $i_{1,5,l}$ and $i_{2,2,l}$ are $$i_{1,5,l} = k_l^{(1)} = [k_{l,0}^{(1)}, k_{l,1}^{(1)}, \ldots, k_{l,2L-1}^{(1)}]$$
$$i_{2,2,l} = k_l^{(2)} = [k_{l,0}^{(2)}, k_{l,1}^{(2)}, \ldots, k_{l,2L-1}^{(2)}]$$
$$k_{l,i}^{(1)} \in \{0, 1, \ldots, 7\}$$
$$k_{l,i}^{(2)} \in \{0, 1\}$$

for $l=1, \ldots, v$.

The mapping from $k_{l,i}^{(1)}$ to the coefficient amplitude $p_{l,i}^{(1)}$ is given in TABLE 5 and the mapping from $k_{l,i}^{(2)}$ to the coefficient amplitude $p_{l,i}^{(2)}$ is given in TABLE 6. The coefficient amplitudes are represented by $$p_l^{(1)} = [p_{l,0}^{(1)}, p_{l,1}^{(1)}, \ldots, p_{l,2L-1}^{(1)}]$$
$$p_l^{(2)} = [p_{l,0}^{(2)}, p_{l,1}^{(2)}, \ldots, p_{l,2L-1}^{(2)}]$$

$l=1, \ldots, v$. The coefficient phase indicators are $i_{2,1,l} = c_l = [c_{l,0}, c_{l,1}, \ldots, c_{l,2L-1}]$ for $l=1, \ldots, v$.

The coefficient amplitude and phase indicators are reported as follows. In one example, the indicators $k_{l,b_l^{max}}^{(1)} = 7$, $k_{l,b_l^{max}}^{(2)}$, and $c_{l,b_l^{max}} = 0$ ($l=1, \ldots, v$). $k_{l,b_l^{max}}^{(1)}$, $k_{l,b_l^{max}}^{(2)}$, and $c_{l,b_l^{max}}$ are not reported for $l=1, \ldots, v$. In another example, the remaining $2L-1$ elements of $k_l^{(1)}$ ($l=1, \ldots, v$) are reported, where $k_{l,i}^{(1)} \in \{0, 1, \ldots, 7\}$. Let $M_l$ ($l=1, \ldots, v$) be the number of elements of $k_l^{(1)}$ that satisfy $k_{l,i}^{(1)} > 0$. In another example, the remaining $2L-1$ elements of $k_l^{(2)}$ and $c_l$ ($l=1, \ldots, v$) are reported as follows. In one instance, when SubbandAmplitude=OFF, $k_{l,i}^{(2)} = 1$ for $l=1, \ldots, v$ and $i=0, 1, \ldots, 2L-1$. $k_l^{(2)}$ is not reported for $l=1, \ldots, v$, and for $i=1, \ldots, v$, the $M_l-1$ elements of $c_l$ corresponding to the coefficients that satisfy $k_{l,i}^{(1)} > 0$, as determined by the reported elements of $k_l^{(1)}$, are reported, where $c_{l,i} \in \{0, 1, \ldots, N_{PSK}-1\}$, and the remaining $2L-M_l$ elements of $c_l$ are not reported and are set to $c_{l,i} = 0$. In another instance, when SubbandAmplitude=ON, for $l=1, \ldots, v$, the elements of $k_l^{(2)}$ and $c_l$ corresponding to the min($M_l, K^{(2)}$)$-1$ strongest coefficients, as determined by the corresponding elements of $k_l^{(1)}$, are reported, where $k_{l,i}^{(2)} \in \{0,1\}$ and $c_{l,i} \in (0, 1, \ldots, N_{PSK}-1)$. The values of $K^{(2)}$ are given in TABLE 7. The remaining $2L-\min(M_l, K^{(2)})$ elements of $k_l^{(2)}$ are not reported and are set to $k_{l,i}^{(2)} = 1$. The remaining $2L-\min(M_l, K^{(2)})$ elements of $c_l$ are reported, where $c_{l,i} \in \{0, 1,2,3\}$. In yet another instance, when SubbandAmplitude=ON, when two elements, $k_{l,x}^{(1)}$, and $k_{l,y}^{(1)}$, of the reported $k_l^{(1)}$ are identical ($k_{l,x}^{(1)} = k_{l,y}^{(1)}$), then the element min(x,y) is prioritized to be included in the set of the min($M_l, K^{(2)}$)$-1$ strongest coefficients for $k_l^{(2)}$ and $c_l$ ($l=1, \ldots, v$) reporting. In another alternative, max(x,y) is prioritized to be included in the set of the min($M_l, K^{(2)}$)$-1$ strongest coefficients for $k_l^{(2)}$ and $c_l$ ($l=1, \ldots, v$) reporting.

The codebook for 1-2 layers is given in TABLE 10, where the quantity $\varphi_{l,i}$ is given by $$\varphi_{l,i} = \begin{cases} e^{j2\pi c_{l,i}/N_{PSK}} & SubbandAmplitude = OFF \\ e^{j2\pi c_{l,i}/N_{PSK}} & SubbandAmplitude = ON, \min(M_l, K^{(2)}) - 1 \text{ strongest coefficients} \\ e^{j2\pi c_{l,i}/4} & SubbandAmplitude = ON, 2L - \min(M_l, K^{(2)}) \text{ weakest coefficients} \end{cases}$$

and $v_m$ is a $P_{CSI-RS}/2$-element column vector containing a value of 1 in element (m mod $P_{CSI-RS}/2$) and zeros elsewhere.

TABLE 10

Codebook for 1-layer and 2-layer CSI reporting using antenna ports
[3000 to 2999 + $P_{CSI-RS}$]

$$i_{1,1} = 0, 1, \ldots, \left\lceil \frac{P_{CSI-RS}}{2d} \right\rceil - 1$$

$$i_{1,4,l} = b_l^{max} = 0, 1, \ldots, 2L - 1$$

$i_{1,5,l} = k_l^{(1)} = [k_{l,0}^{(1)}, \ldots, k_{l,2L-1}^{(1)}] \quad i_{2,1,l} = c_l = [c_{l,0}, \ldots, c_{l,2L-1}] \quad i_{2,2,l} = k_l^{(2)} = [k_{l,0}^{(2)}, \ldots, k_{l,2L-1}^{(2)}]$

| The range of values of $k_{l,i}^{(1)}$ and mapping to $p_l^{(1)}$ as explained above | The range of values of $c_{l,i}$ as explained above | The range of values of $k_{l,i}^{(2)}$ and mapping to $p_l^{(2)}$ as explained above |
| --- | --- | --- |

TABLE 10-continued

Codebook for 1-layer and 2-layer CSI reporting using antenna ports
[3000 to 2999 + $P_{CSI-RS}$]

where $$W^l_{i_{1,1},p^{(1)}_l,p^{(2)}_l,c_l} = \frac{1}{\sqrt{\sum_{i=0}^{2L-1}(p^{(1)}_{l,i}p^{(2)}_{l,i})^2}}\begin{bmatrix}\sum_{i=0}^{L-1}v_{i_{1,1}d+i}p^{(1)}_{l,i}p^{(2)}_{l,i}\varphi_{l,i}\\ \sum_{i=0}^{L-1}v_{i_{1,1}d+1,p^{(1)}_{l,i+L}p^{(2)}_{l,i+L}\varphi_{l,i+L}}\end{bmatrix}, l=1,2$$

1 layer ($v = 1$): $W^{(1)}_{i_{1,1},p^{(1)}_1,p^{(2)}_1,c_1} = W^1_{i_{1,1},p^{(1)}_1,p^{(2)}_1,c_1}$ 2 layers ($v = 2$):
$$W^{(2)}_{i_{1,1},p^{(1)}_1,p^{(2)}_1,c_1,p^{(1)}_2,p^{(2)}_2,c_2} = \frac{1}{\sqrt{2}}[W^1_{i_{1,1},p^{(1)}_1,p^{(2)}_1,c_1} \quad W^2_{i_{1,1},p^{(1)}_2,p^{(2)}_2,c_2}]$$

In some embodiments 10-4, a UE is configured with a 1 layer and a 2 layer codebooks for Type II (high-resolution) CSI reporting as follows. For 4 antenna ports (e.g. {3000, 3001, 3002, 3003}), 8 antenna ports (e.g. {3000, 3001, ..., 3007}), 12 antenna ports (e.g. {3000, 3001, ..., 3011}), 16 antenna ports (e.g. {3000, 3001, ..., 3015}), 24 antenna ports (e.g. {13000, 3001, ..., 3023}), and 32 antenna ports (e.g. {3000, 3001, ..., 3031}), when the UE is configured with higher layer parameters CodebookType set to Type2_Parameters, where Type2_Parameters contains parameters {Codebook-Config-N1, CodebookConfig-N2, NumberOfBeams, PhaseAlphabetSize, SubbandAmplitude, PortSelectionSamplingSize}: the number of CSI-RS ports is given by $P_{CSI-RS} \in \{4,8,12,16,24,32\}$; the value of L is configured with the higher-layer parameter NumberOfBeams, where L=2 when $P_{CSI-RS}=4$ and $L \in \{2,3,4\}$ when $P_{CSI-RS}>4$; the value of d is configured with the higher layer parameter PortSelectionSamplingSize, where $d \in \{1,2,3,4\}$, $$d \le \frac{P_{CSI-RS}}{2}$$

and $d \le L$, alternatively $$d \le \min\left(\frac{P_{CSI-RS}}{2}, L\right);$$

the value of $N_{PSK}$ is configured with the higher-layer parameter PhaseAlphabetSize, where $N_{PSK} \in \{4,8\}$; and the UE is configured with the higher-layer parameter SubbandAmplitude set to OFF or ON.

When $v \le 2$, where $v$ is the associated RI value, each PMI value corresponds to the codebook indices $i_1$ and $i_2$ where $$i_1 = \begin{cases}[i_{1,1} \quad i_{1,3,1} \quad i_{1,4,1}] & v=1 \\ [i_{1,1} \quad i_{1,3,1} \quad i_{1,4,1} \quad i_{1,3,2} \quad i_{1,4,2}] & v=2\end{cases} \text{ and }$$

-continued $$i_2 = \begin{cases}[i_{2,1,1}] & SubbandAmplitude = \text{OFF}, v=1 \\ [i_{2,1,1} \quad i_{2,1,2}] & SubbandAmplitude = \text{OFF}, v=2 \\ [i_{2,1,1} \quad i_{2,2,1}] & SubbandAmplitude = \text{ON}, v=1 \\ [i_{2,1,1} \quad i_{2,2,1} \quad i_{2,1,2} \quad i_{2,2,2}] & SubbandAmplitude = \text{ON}, v=2\end{cases}.$$

The L antenna ports per polarization are selected by the index $i_{1,1}$, where $$i_{1,1} \in \left\{0, 1, \ldots, \left\lceil\frac{P_{CSI-RS}}{2d}\right\rceil - 1\right\}.$$

The strongest coefficient on layer l,l=1, ..., $v$ is identified by $i_{1,3,l} \in \{0, 1, \ldots, 2L-1\}$. The amplitude coefficient indicators $i_{1,4,l}$ and $i_{2,2,l}$ are $$i_{1,4,l} = [k^{(1)}_{l,0}, k^{(1)}_{l,1}, \ldots, k^{(1)}_{l,2L-1}]$$
$$i_{2,2,l} = [k^{(2)}_{l,0}, k^{(2)}_{l,1}, \ldots, k^{(2)}_{l,2L-1}]$$
$$k^{(1)}_{l,i} \in \{0, 1, \ldots, 7\}$$
$$k^{(2)}_{l,i} \in \{0, 1\}$$

for l=1, ..., $v$. The mapping from $k_{l,i}^{(1)}$ to the amplitude coefficient $p_{l,i}^{(1)}$ is given in TABLE 5 and the mapping from $k_{l,i}^{(2)}$ to the amplitude coefficient $p_{l,i}^{(2)}$ is given in TABLE 6.

The amplitude coefficients are represented by $$p^{(1)}_l = [p^{(1)}_{l,0}, p^{(1)}_{l,1}, \ldots, p^{(1)}_{l,2L-1}]$$
$$p^{(2)}_l = [p^{(2)}_{l,0}, p^{(2)}_{l,1}, \ldots, p^{(2)}_{l,2L-1}]$$

for l=1, ..., $v$. The phase coefficient indicators are $i_{2,1,l}=c_l=[c_{l,0}, c_{l,1}, \ldots, c_{l,2L-1}]$ for l=1, ..., $v$.

The amplitude and phase coefficient indicators are reported as follows. In one example, the indicators $k_{l,i_{1,3,l}}^{(1)}=7$, $k_{l,i_{1,3,l}}^{(2)}=1$ and $c_{l,i_{1,3,l}}=0$ (l=1, ..., $v$). $k_{l,i_{1,3,l}}^{(1)}$, $k_{l,i_{1,3,l}}^{(2)}$, and $c_{l,i_{1,3,l}}$ are not reported for i=1, ..., $v$. In another example, the remaining 2L-1 elements of $i_{1,4,1}$ (l=1, ..., $v$) are reported, where $k_{l,i}^{(1)} \in \{0, 1, \ldots, 7\}$. Let $M_l$ (l=1, ..., $v$) be the number of elements of $i_{1,4,1}$ that satisfy $k_{l,i}^{(1)} > 0$. In yet another example, the remaining $2L-1$ elements of $i_{2,1,l}$ and $i_{2,2,l}$ ($l=1, \ldots, v$) are reported as follows: In one instance, when SubbandAmplitude=OFF, $k_{l,i}^{(2)}=1$ for $l=1, \ldots, v$ and $i=0, 1, \ldots, 2L-1$. $i_{2,2,l}$ is not reported for $l=1, \ldots, v$ and for $l=1, \ldots,$, the $M_l-1$ elements of $i_{2,1,l}$ corresponding to the coefficients that satisfy $k_{l,i}^{(1)} > 0$, as determined by the reported elements of $i_{1,4,l}$, are reported, where $c_{l,i} \in \{0, 1, \ldots, N_{PSK}-1\}$, and the remaining $2L-M_l$ elements of $i_{2,1,l}$ are not reported and are set to $c_{l,i}=0$. In another instance, when SubbandAmplitude=ON, for $l=1, \ldots, v$, the elements of $i_{2,2,l}$ and $i_{2,1,l}$ corresponding to the $\min(M_l, K^{(2)})-1$ strongest coefficients, as determined by the corresponding elements of $i_{1,4,l}$, are reported, where $k_{l,i}^{(2)} \in \{0,1\}$ and $c_{l,i} \in \{0, 1, \ldots, N_{PSK}-1\}$. The values of $K^{(2)}$ are given in TABLE 7. The remaining $2L-\min(M_l, K^{(2)})$ elements of $i_{2,2,l}$ are not reported and are set to $k_{l,i}^{(2)}=1$. The remaining $2L-\min(M_l, K^{(2)})$ elements of $i_{2,1,l}$ are reported, where $k_{l,i}^{(2)} \in \{0,1,2,3\}$. In yet another instance, when SubbandAmplitude=ON, when two elements, $k_{l,x}^{(1)}$ and $k_{l,y}^{(1)}$, of the reported $i_{1,4,1}$ are identical ($k_{l,x}^{(1)}=k_{l,y}^{(1)}$), then the element $\min(x,y)$ is prioritized to be included in the set of the $\min(M_l, K^{(2)})-1$ strongest coefficients for $i_{2,2,l}$ and $i_{2,1,l}$ ($l=1, \ldots, v$) reporting. In another alternative, $\max(x,y)$ is prioritized to be included in the set of the $\min(M_l, K^{(2)})-1$ strongest coefficients for $i_{2,2,l}$ and $i_{2,1,l}$ ($l=1, \ldots, v$) reporting.

The codebook for 1-2 layers is given in TABLE 11, where the quantity $\varphi_{l,i}$ is given by $$\varphi_{l,i} = \begin{cases} e^{j2\pi c_{l,i}/N_{PSK}} & SubbandAmplitude = \text{OFF} \\ e^{j2\pi c_{l,i}/N_{PSK}} & SubbandAmplitude = \text{ON}, \min(M_l, K^{(2)}) - 1 \text{ strongest coefficients} \\ e^{j2\pi c_{l,i}/4} & SubbandAmplitude = \text{ON}, 2L - \min(M_l, K^{(2)}) \text{ weakest coefficients} \end{cases}$$

and $v_m$ is a $P_{CSI-RS}/2$-element column vector containing a value of 1 in element (m mod $P_{CSI-RS}/2$) and zeros elsewhere (where the first element is element 0).

TABLE 11

Codebook for 1-layer and 2-layer CSI reporting using antenna ports [3000 to 2999 + $P_{CSI-RS}$]

| Layers | |
|---|---|
| $v = 1$ | $W^{(1)}_{i_{1,1},p_l^{(1)},p_l^{(2)},i_{2,1,1}} = W^1_{i_{1,1},p_1^{(1)},p_1^{(2)},i_{2,1,1}}$ |
| $v = 2$ | $W^{(2)}_{i_{1,1},p_l^{(1)},p_l^{(2)},i_{2,1,1},p_2^{(1)},p_2^{(2)},i_{2,1,2}} =$ $\frac{1}{\sqrt{2}}\left[ W^1_{i_{1,1},p_1^{(1)},p_1^{(2)},i_{2,1,1}} \quad W^2_{i_{1,1},p_2^{(1)},p_2^{(2)},i_{2,1,2}} \right]$ |

TABLE 11-continued

Codebook for 1-layer and 2-layer CSI reporting using antenna ports [3000 to 2999 + $P_{CSI-RS}$]

Layers where $$W^l_{i_{1,1},p_l^{(1)},p_l^{(2)},i_{2,1,l}} = \frac{1}{\sqrt{\sum_{i=0}^{2L-1}(p_{l,i}^{(1)}p_{l,i}^{(2)})^2}} \begin{bmatrix} \sum_{i=0}^{L-1} v_{i_{1,1}d+i}p_{l,i}^{(1)}p_{l,i}^{(2)}\varphi_{l,i} \\ \sum_{i=0}^{L-1} v_{i_{1,1}d+i}p_{l,i+L}^{(1)}p_{l,i+L}^{(2)}\varphi_{l,i} \end{bmatrix}, l = 1, 2,$$

and the mappings from $i_1$ to $i_{1,1}$, $p_1^{(1)}$, and $p_2^{(1)}$ and from $i_2$ to $i_{2,1,1}$, $i_{2,1,2}$, $p_1^{(2)}$, and $p_2^{(2)}$ are as described above, including the ranges of the constituent indices of $i_1$ and $i_2$.

Figure 15:
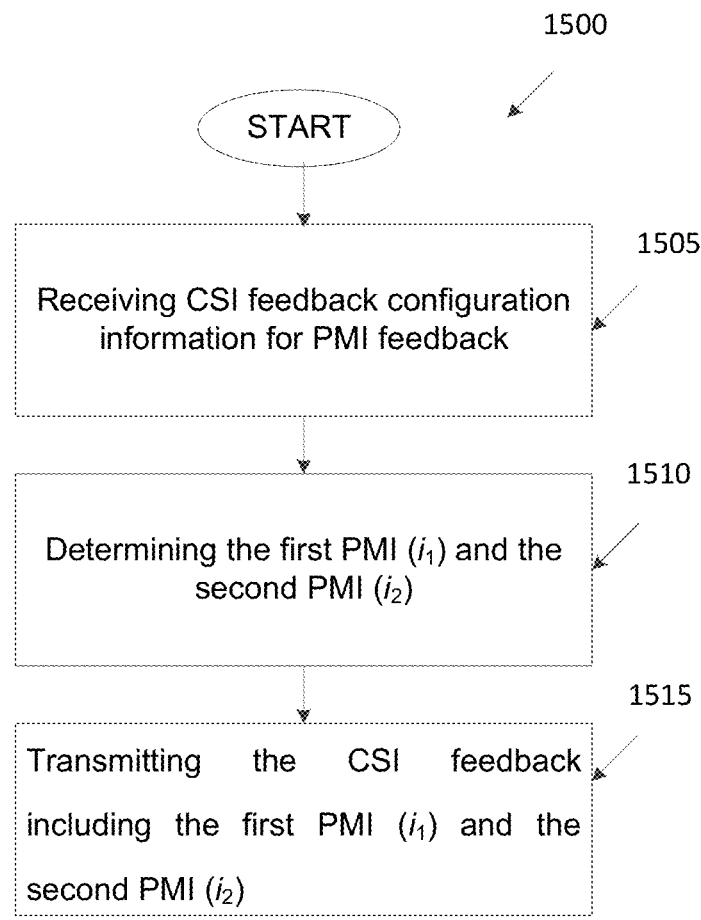
FIG. 15 illustrates an example flow chart of a method for multi-resolution CSI reporting according to embodiments of the present disclosure.

FIG. 15 illustrates an example flow chart of a method 1500 for multi-resolution CSI reporting according to embodiments of the present disclosure, as may be performed by a UE. An embodiment of the method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

As shown in FIG. 15, the method 1500 begins at 1505. In step 1505, the UE receives, from a base station (BS), CSI feedback configuration information for a pre-coding matrix indicator (PMI) feedback indicating a linear combination (LC) pre-coding matrix that corresponds to a linear combination of a plurality of L beams and a plurality of coefficients. In step 1505, each of the plurality of coefficients comprises at least an amplitude coefficient and a phase coefficient, and the PMI comprises a first PMI ($i_1$) and a second PMI ($i_2$) indicating wideband (WB) and subband (SB) components of the LC pre-coding matrix, respectively. In addition, in step 1505, the first PMI ($i_1$) includes a first set and a second set of indicators indicating common WB components for all layers of a plurality of layers and independent WB components for each layer of the plurality of layers, respectively, the second PMI ($i_2$) includes a set of indicators indicating independent SB components for each layer of the plurality of layers, and the plurality of layers is determined based on a value v associated with a rank indicator (RI).

Next, in step 1510, the UE determines the first PMI ($i_1$) and the second PMI ($i_2$).

In step 1510, the first PMI ($i_1$) includes the first set of indicators $S_1 = [i_{1,1} \; i_{1,2}]$ indicating the plurality of L beams that comprise common WB components for all layers of the plurality of layers. In some embodiments, the first PMI ($i_1$) includes the second set of indicators $$S_2 = \begin{cases} [i_{1,3,1} \; i_{1,4,1}] & \text{if } v = 1 \\ [i_{1,3,1} \; i_{1,4,1} \; i_{1,3,2} \; i_{1,4,2}] & \text{if } v = 2 \end{cases}$$

to indicate independent WB components for each layer of the plurality of v=1 or v=2 layers, wherein v=1 is a first layer and v=2 are first and second layers. In such embodiments, $i_{1,3,1}$ and $i_{1,3,2}$ indicate a strongest coefficient among the plurality of coefficients for each of the first layer and the second layer, respectively, and $i_{1,4,1}$ and $i_{1,4,2}$ indicate a plurality of WB amplitude coefficients for each of the first layer and the second layer, respectively.

In some embodiments, in step 1510, the second PMI ($i_2$) includes the set of indicator $$i_{2,1} = \begin{cases} [i_{2,1,1}] & \text{if } \upsilon = 1 \\ [i_{2,1,1} \ i_{2,1,2}] & \text{if } \upsilon = 2 \end{cases}$$

to indicate independent SB components for each layer of the plurality of $\upsilon=1$ or $\upsilon=2$ layers, wherein $\upsilon=1$ is a first layer and $\upsilon=2$ are first and second layers, and wherein $i_{2,1,1}$ and $i_{2,1,2}$ indicate a plurality of SB phase coefficients for each of the first layer and the second layer, respectively.

In some embodiments, in step 1510, the second PMI ($i_2$) includes the set of indicators $$i_{2,2} = \begin{cases} [i_{2,2,1}] & \text{if } \upsilon = 1 \\ [i_{2,2,1} \ i_{2,2,2}] & \text{if } \upsilon = 2 \end{cases}$$

to indicate independent SB components for each layer of the plurality of $\upsilon=1$ or $\upsilon=2$ layers, wherein $\upsilon=1$ is a first layer and $\upsilon=2$ are first and second layers, and wherein where $i_{2,2,1}$ and $i_{2,2,2}$ indicate a plurality of SB amplitude coefficients for each of the first layer and the second layer, respectively.

In such embodiments, the amplitude coefficient is determined as given in table:

| Indicator | Amplitude coefficient |
|---|---|
| 0 | 0 |
| 1 | $\sqrt{1/64}$ |
| 2 | $\sqrt{1/32}$ |
| 3 | $\sqrt{1/16}$ |
| 4 | $\sqrt{1/8}$ |
| 5 | $\sqrt{1/4}$ |
| 6 | $\sqrt{1/2}$ |
| 7 | 1 |

In such embodiments, an LC codebook for both $\upsilon=1$ and $\upsilon=2$ is given by:

| Layers | |
|---|---|
| $\upsilon = 1$ | $W^{(1)}_{q_1,q_2,n_1,n_2,p_1^{(1)},p_1^{(2)},i_{2,1,1}} = W^1_{q_1,q_2,n_1,n_2,p_1^{(1)},p_1^{(2)},i_{2,1,1}}$ |
| $\upsilon = 2$ | $W^{(2)}_{q_1,q_2,n_1,n_2,p_1^{(1)},p_1^{(2)},i_{2,1,1},p_2^{(1)},p_2^{(2)},i_{2,1,2}} =$ $\frac{1}{\sqrt{2}} [ W^1_{q_1,q_2,n_1,n_2,p_1^{(1)},p_1^{(2)},i_{2,1,1}} \ W^2_{q_1,q_2,n_1,n_2,p_2^{(1)},p_2^{(2)},i_{2,1,2}} ]$ | where $$W^l_{q_1,q_2,n_1,n_2,p_l^{(1)},p_l^{(2)},c_l} = \frac{1}{\sqrt{N_1 N_2 \sum_{i=0}^{2L-1} (p_{l,i}^{(1)} p_{l,i}^{(2)})^2}}$$

$$\begin{bmatrix} \sum_{i=0}^{L-1} v_{m_1^{(i)}, m_2^{(i)}} p_{l,i}^{(1)} p_{l,i}^{(2)} \varphi_{l,i} \\ \sum_{i=0}^{L-1} v_{m_1^{(i)}, m_2^{(i)}} p_{l,i+L}^{(1)} p_{l,i+L}^{(2)} \varphi_{l,i+L} \end{bmatrix}, l = 1, 2,$$

| Layers | |
|---|---|
| ($N_1$, $N_2$) is dual polarized CSI-RS antenna port layout values that determine a number of CSI-RS ports $P = 2N_1N_2$; | |
| $v_{m_1^{(i)}, m_2^{(i)}}$ is $i$-th of a plurality of L discrete Fourier transform (DFT) beams indicated by $i_{1,1}$ and $i_{1,2}$ | |
| $u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}$ | |
| $v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$ | |
| $[p_{l,0}^{(1)}, p_{l,1}^{(1)}, \ldots, p_{l,2L-1}^{(1)}]$ are WB amplitude coefficients for layer $l = 1, \ldots, \upsilon$ indicated by $i_{1,3,1}, i_{1,3,2}, i_{1,4,1}$ and $i_{1,4,2}$; | |
| $[p_{l,0}^{(2)}, p_{l,1}^{(2)}, \ldots, p_{l,2L-1}^{(2)}]$ are SB amplitude coefficients for layer $l = 1, \ldots, \upsilon$ indicated by $i_{2,2,1}$ and $i_{2,2,2}$; and | |
| $[c_{l,0}, c_{l,1}, \ldots, c_{l,2L-1}]$ are SB phase coefficient indicator for layer $l = 1, \ldots, \upsilon$, indicated by $i_{2,1,1}$ and $i_{2,1,2}$ where a phase value is given by $\varphi_{l,1} = e^{j2\pi c_{l,i}/N_{PSK}}$. | | and wherein $\upsilon=1$ is a first layer and $\upsilon=2$ are first and second layers.

Finally, in step 1515, the UE transmits, to the BS, the CSI feedback including the first PMI ($i_1$) and the second PMI ($i_2$) over an uplink channel.

In some embodiments, in step 1515, the CSI feedback configuration information includes a value of the plurality of L DFT beams, a value of a phase alphabet size $N_{PSK}$, and a value of ($N_1$, $N_2$), and wherein the L is determined as $L \in \{2,3,4\}$, the $N_{PSK}$ is determined as $N_{PSK} \in \{4,8\}$, and the ($N_1$, $N_2$) and ($O_1$,$O_2$) are determined as:

| Number of CSI-RS ports, $P_{CSI-RS}$ | ($N_1$, $N_2$) | ($O_1$, $O_2$) |
|---|---|---|
| 4 | (2, 1) | (4, 1) |
| 8 | (2, 2) | (4, 4) |
|  | (4, 1) | (4, 1) |
| 12 | (3, 2) | (4, 4) |
|  | (6, 1) | (4, 1) |
| 16 | (4, 2) | (4, 4) |
|  | (8, 1) | (4, 1) |
| 24 | (4, 3) | (4, 4) |
|  | (6, 2) | (4, 4) |
|  | (12, 1) | (4, 1) |
| 32 | (4, 4) | (4, 4) |
|  | (8, 2) | (4, 4) |
|  | (16, 1) | (4, 1) |

In some embodiments, in step 1515, the CSI feedback configuration information includes a value of $L \in \{2,3,4\}$, a value of $N_{PSK} \in \{4,8\}$, a value of a number of CSI-RS ports $P_{CSI-RS} \in \{4,8,12,16,24,32\}$ at the BS, and a value of $d \in \{1,2,3,4\}$ where $$d \leq \min\left(\frac{P_{CSI-RS}}{2}, L\right);$$

the first PMI ($i_1$) comprises the first set of indicators $S_1 = [i_{1,1}]$ indicating the plurality of L out of $P_{CSI-RS}/2$ antenna port selection where this selection is common for all layers of the plurality of layers; and an LC codebook for both $\upsilon=1$ and $\upsilon=2$ is given by:

| Layers | |
|---|---|
| $\upsilon = 1$ | $W^{(1)}_{i_{1,1},p_1^{(1)},p_1^{(2)},i_{2,1,1}} = W^1_{i_{1,1},p_1^{(1)},p_1^{(2)},i_{2,1,1}}$ |
| $\upsilon = 2$ | $W^{(2)}_{i_{1,1},p_1^{(1)},p_1^{(2)},i_{2,1,1},p_2^{(1)},p_2^{(2)},i_{2,1,2}} = \frac{1}{\sqrt{2}} [W^1_{i_{1,1},p_1^{(1)},p_1^{(2)},i_{2,1,1}} \ W^2_{i_{1,1},p_2^{(1)},p_2^{(2)},i_{2,1,2}}]$ | where $$W^l_{i_{1,1},p_l^{(1)},p_l^{(2)},i_{2,1,l}} = \frac{1}{\sqrt{\sum_{i=0}^{2L-1}(p_{l,i}^{(1)}p_{l,i}^{(2)})^2}} \begin{bmatrix} \sum_{i=0}^{L-1} v_{i_{1,1}d+i} p_{l,i}^{(1)} p_{l,i}^{(2)} \varphi_{l,i} \\ \sum_{i=0}^{L-1} v_{i_{1,1}d+i} p_{l,i+L}^{(1)} p_{l,i+L}^{(2)} \varphi_{l,i} \end{bmatrix},$$

$l = 1, 2,$ $v_{i_{1,1}d+i}$ is i-th of the plurality of L selected antenna ports indicated by $i_{1,1}$, where $v_m$ is a $P_{CSI-RS}/2$-element column vector containing a value of 1 in element (m mod $P_{CSI-RS}/2$) and zeros elsewhere (where a first element is element 0);

$[p_{l,0}^{(1)}, p_{l,1}^{(1)}, \ldots, p_{l,2L-1}^{(1)}]$ are WB amplitude coefficients for layer $l = 1, \ldots, \upsilon$ indicated by $i_{1,3,1}, i_{1,3,2}, i_{1,4,1}$ and $i_{1,4,2}$;

$[p_{l,0}^{(2)}, p_{l,1}^{(2)}, \ldots, p_{l,2L-1}^{(2)}]$ are SB amplitude coefficients for layer $l = 1, \ldots, \upsilon$ indicated by $i_{2,2,1}$ and $i_{2,2,2}$; and $[c_{l,0}, c_{l,1}, \ldots, c_{l,2L-1}]$ are SB phase coefficient indicator for layer $l = 1, \ldots, \upsilon$, indicated by $i_{2,1,1}$ and $i_{2,1,2}$ where a phase value is given by $\varphi_{l,1} = e^{j2\pi c_{l,i}/N_{PSK}}$.

and wherein $\upsilon=1$ is a first layer and $\upsilon=2$ are a first layer and a second layers.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) for channel state information (CSI) feedback in a wireless communication system, the UE comprising:
   a transceiver configured to receive, from a base station (BS), CSI feedback configuration information for a pre-coding matrix indicator (PMI) feedback indicating a linear combination (LC) pre-coding matrix that corresponds to a linear combination of a plurality of L beams and a plurality of coefficients, wherein:
     each of the plurality of coefficients comprises at least an amplitude coefficient and a phase coefficient;
     the PMI comprises a first PMI ($i_1$) and a second PMI ($i_2$) indicating wideband (WB) and subband (SB) components of the LC pre-coding matrix, respectively;
     the first PMI ($i_1$) includes first and second sets of indicators indicating common WB components for all layers of a plurality of layers and independent WB components for each layer of the plurality of layers, respectively;
     the second PMI ($i_2$) includes a set of indicators indicating independent SB components for each layer of the plurality of layers; and
     the plurality of layers is determined based on a value v associated with a rank indicator (RI); and
   at least one processor configured to determine the first PMI ($i_1$) and the second PMI ($i_2$), wherein the transceiver is further configured to transmit, to the BS, the CSI feedback including the first PMI ($i_1$) and the second PMI ($i_2$) over an uplink channel.

2. The UE of claim 1, wherein the first PMI ($i_1$) includes a first set of indicators $s_1 = [i_{1,1} \ i_{1,2}]$ indicating the plurality of L beams that comprise common WB components for all layers of the plurality of layers.

3. The UE of claim 1, wherein the first PMI ($i_1$) includes a second set of indicators $$S_2 = \begin{cases} [i_{1,3,1} \ i_{1,4,1}] & \text{if } \upsilon = 1 \\ [i_{1,3,1} \ i_{1,4,1} \ i_{1,3,2} \ i_{1,4,2}] & \text{if } \upsilon = 2 \end{cases}$$

to indicate independent WB components for each layer of the plurality of $\upsilon=1$ or $\upsilon=2$ layers, and wherein $\upsilon=1$ corresponds to a first layer and $\upsilon=2$ corresponds to first and second layers, $i_{1,3,1}$ and $i_{1,3,2}$ indicate a strongest coefficient among the plurality of coefficients for each of the first layer and the second layer, respectively, and $i_{1,4,1}$ and $i_{1,4,2}$ indicate a plurality of WB amplitude coefficients for each of the first layer and the second layer, respectively.

4. The UE of claim 1, wherein the second PMI ($i_2$) includes the set of indicators $$i_{2,1} = \begin{cases} [i_{2,1,1}] & \text{if } \upsilon = 1 \\ [i_{2,1,1} \ i_{2,1,2}] & \text{if } \upsilon = 2 \end{cases}$$

to indicate independent SB components for each layer of the plurality of $\upsilon=1$ or $\upsilon=2$ layers, and wherein $\upsilon=1$ corresponds to a first layer and $\upsilon=2$ corresponds to first and second layers, and wherein $i_{2,1,1}$ and $i_{2,1,2}$ indicate a plurality of SB phase coefficients for each of the first layer and the second layer, respectively.

5. The UE of claim 1, wherein the second PMI ($i_2$) includes the set of indicators $$i_{2,2} = \begin{cases} [i_{2,2,1}] & \text{if } \upsilon = 1 \\ [i_{2,2,1} \ i_{2,2,2}] & \text{if } \upsilon = 2 \end{cases}$$

to indicate independent SB components for each layer of the plurality of $\upsilon=1$ or $\upsilon=2$ layers, and wherein $\upsilon=1$ corresponds to a first layer and $\upsilon=2$ corresponds to first and second layers, and wherein $i_{2,2,1}$ and $i_{2,2,2}$ indicate a plurality of SB amplitude coefficients for each of the first layer and the second layer, respectively.

6. The UE of claim 1, wherein the amplitude coefficient is determined as given in table:

| Indicator | Amplitude coefficient |
|---|---|
| 0 | 0 |
| 1 | $\sqrt{1/64}$ |
| 2 | $\sqrt{1/32}$ |
| 3 | $\sqrt{1/16}$ |

-continued

| Indicator | Amplitude coefficient |
|---|---|
| 4 | $\sqrt{1/8}$ |
| 5 | $\sqrt{1/4}$ |
| 6 | $\sqrt{1/2}$ |
| 7 | 1. |

7. The UE of claim 1, wherein an LC codebook for $v=1$ and $v=2$ is given by:

| Layers | |
|---|---|
| $v = 1$ | $W^{(1)}_{q_1,q_2,n_1,n_2,p_1^{(1)},p_1^{(2)},i_{2,1,1}} = W^1_{q_1,q_2,n_1,n_2,p_1^{(1)},p_1^{(2)},i_{2,1,1}}$ |
| $v = 2$ | $W^{(2)}_{q_1,q_2,n_1,n_2,p_1^{(1)},p_1^{(2)},i_{2,1,1},p_2^{(1)},p_2^{(2)},i_{2,1,2}} =$ $\frac{1}{\sqrt{2}}\begin{bmatrix} W^1_{q_1,q_2,n_1,n_2,p_1^{(1)},p_1^{(2)},i_{2,1,1}} & W^2_{q_1,q_2,n_1,n_2,p_2^{(1)},p_2^{(2)},i_{2,1,2}} \end{bmatrix}$ | where:

$$W^l_{q_1,q_2,n_1,n_2,p_l^{(1)},p_l^{(2)},c_l} = \frac{1}{\sqrt{N_1 N_2 \sum_{i=0}^{2L-1}(p_{l,i}^{(1)}p_{l,i}^{(2)})^2}} \begin{bmatrix} \sum_{i=0}^{L-1} v_{m_1^{(i)},m_2^{(i)}} p_{l,i}^{(1)} p_{l,i}^{(2)} \varphi_{l,i} \\ \sum_{i=0}^{L-1} v_{m_1^{(i)},m_2^{(i)}} p_{l,i+L}^{(1)} p_{l,i+L}^{(2)} \varphi_{l,i+L} \end{bmatrix}, l = 1, 2,$$

($N_1$, $N_2$) is dual polarized CSI reference signal (CSI-RS) port layout values that determine a number of CSI-RS ports $P_{CSI-RS} = 2N_1 N_2$ at the BS, $v_{m_1^{(i)},m_2^{(i)}}$ is i-th of a plurality of L discrete Fourier transform (DFT) beams indicated by $i_{1,1}$ and $i_{1,2}$, $$u_m = \begin{cases} \begin{bmatrix} 1 & e^{j\frac{2\pi m}{O_2 N_2}} & \ldots & e^{j\frac{2\pi m(N_2-1)}{O_2 N_2}} \end{bmatrix} & N_2 > 1 \\ 1 & N_2 = 1 \end{cases}$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T,$$

$[p_{l,0}^{(1)}, p_{l,1}^{(1)}, \ldots, p_{l,2L-1}^{(1)}]$ are WB amplitude coefficients for layer $l=1, \ldots, v$ indicated by $i_{1,3,1}$, $i_{1,3,2}$, $i_{1,4,1}$ and $i_{1,4,2}$,
$[p_{l,0}^{(2)}, p_{l,1}^{(2)}, \ldots, p_{l,2L-1}^{(2)}]$ are SB amplitude coefficients for layer $l=1, \ldots, v$ indicated by $i_{2,2,1}$ and $i_{2,2,2}$,
$[c_{l,0}, c_{l,1}, \ldots, c_{l,2L-1}]$ are SB phase coefficient indicator for layer $l=1, \ldots, v$, indicated by $i_{2,1,1}$ and $i_{2,1,2}$, a phase value is given by $\varphi_{l,i}=e^{j2\pi c_{l,i}/N_{PSK}}$, $O_1$ and $O_2$ are oversampling factors, $N_{PSK}$ indicates an order of phase shift keying (PSK), and $v=1$ corresponds to a first layer and $v=2$ corresponds to first and second layers.

8. The UE of claim 7, wherein CSI feedback configuration information includes a value of the plurality of L DFT beams, a value of a phase alphabet size $N_{PSK}$, and a value of ($N_1$, $N_2$), and wherein the L is determined as $L \in \{2,3,4\}$, the $N_{PSK}$ is determined as $N_{PSK} \in \{4,8\}$, and values for ($N_1$, $N_2$) and ($O_1$, $O_2$) are determined as:

| Number of CSI-RS ports, $P_{CSI-RS}$ | ($N_1$, $N_2$) | ($O_1$, $O_2$) |
|---|---|---|
| 4 | (2, 1) | (4, 1) |
| 8 | (2, 2) | (4, 4) |
|  | (4, 1) | (4, 1) |
| 12 | (3, 2) | (4, 4) |
|  | (6, 1) | (4, 1) |
| 16 | (4, 2) | (4, 4) |
|  | (8, 1) | (4, 1) |
| 24 | (4, 3) | (4, 4) |
|  | (6, 2) | (4, 4) |
|  | (12, 1) | (4, 1) |
| 32 | (4, 4) | (4, 4) |
|  | (8, 2) | (4, 4) |
|  | (16, 1) | (4, 1). |

9. The UE of claim 1, wherein:
the CSI feedback configuration information includes a value of $L \in \{2,3,4\}$, a value of $N_{PSK} \in \{4,8\}$, a value of a number of CSI-RS ports $P_{CSI-RS} \in \{4,8,12,16,24,32\}$ at the BS, and a value of $d \in \{1,2,3,4\}$ where $$d \leq \min\left(\frac{P_{CSI-RS}}{2}, L\right);$$

the first PMI ($i_1$) comprises a first set of indicators $s_1=[i_{1,1}]$ indicating the plurality of L beams out of $P_{CSI-RS}/2$ antenna port selection where this selection is common for all layers of the plurality of layers; and
an LC codebook for both $v=1$ and $v=2$ is given by:

| Layers | |
|---|---|
| $v = 1$ | $W^{(1)}_{i_{1,1},p_1^{(1)},p_1^{(2)},i_{2,1,1}} = W^1_{i_{1,1},p_1^{(1)},p_1^{(2)},i_{2,1,1}}$ |
| $v = 2$ | $W^{(2)}_{i_{1,1},p_1^{(1)},p_1^{(2)},i_{2,1,1},p_2^{(1)},p_2^{(2)},i_{2,1,2}} =$ $\frac{1}{\sqrt{2}}\begin{bmatrix} W^1_{i_{1,1},p_1^{(1)},p_1^{(2)},i_{2,1,1}} & W^2_{i_{1,1},p_2^{(1)},p_2^{(2)},i_{2,1,2}} \end{bmatrix}$ | where:

$$W^l_{i_{1,1},p_l^{(1)},p_l^{(2)},i_{2,1,l}} = \frac{1}{\sqrt{\sum_{i=0}^{2L-1}(p_{l,i}^{(1)}p_{l,i}^{(2)})^2}} \begin{bmatrix} \sum_{i=0}^{L-1} v_{i_{1,1}d+i} p_{l,i}^{(1)} p_{l,i}^{(2)} \varphi_{l,i} \\ \sum_{i=0}^{L-1} v_{i_{1,1}d+i} p_{l,i+L}^{(1)} p_{l,i+L}^{(2)} \varphi_{l,i+L} \end{bmatrix}, l = 1, 2,$$

$v_{i_{1,1}d+i}$ is i-th of the plurality of L selected antenna ports indicated by $i_{1,1}$, where $v_m$ is a $P_{CSI-RS}/2$-element column vector containing a value of 1 in element (m mod $P_{CSI-RS}/2$) and zeros elsewhere where a first element is element 0;
$[p_{l,0}^{(1)}, p_{l,1}^{(1)}, \ldots, p_{l,2L-1}^{(1)}]$ are WB amplitude coefficients for layer $l=1, \ldots, v$ indicated by $i_{1,3,1}$, $i_{1,3,2}$, $i_{1,4,1}$ and $i_{1,4,2}$;
$[p_{l,0}^{(2)}, p_{l,1}^{(2)}, \ldots, p_{l,2L-1}^{(2)}]$ are SB amplitude coefficients for layer $l=1, \ldots, v$ indicated by $i_{2,2,1}$ and $i_{2,2,2}$;
$[c_{l,0}, c_{l,1}, \ldots, c_{l,2L-1}]$ are SB phase coefficient indicator for layer $l=1, \ldots, v$, indicated by $i_{2,1,1}$ and $i_{2,1,2}$; a phase value is given by $\varphi_{l,i}=e^{j2\pi c_{l,i}/N_{PSK}}$; and $v=1$ corresponds to a first layer and $v=2$ corresponds to first and second layers.

10. A method of user equipment (UE) for channel state information (CSI) feedback in a wireless communication system, the method comprising:

receiving, from a base station (BS), CSI feedback configuration information for a pre-coding matrix indicator (PMI) feedback indicating a linear combination (LC) pre-coding matrix that corresponds to a linear combination of a plurality of L beams and a plurality of coefficients, wherein:
  each of the plurality of coefficients comprises at least an amplitude coefficient and a phase coefficient;
  the PMI comprises a first PMI ($i_1$) and a second PMI ($i_2$) indicating wideband (WB) and subband (SB) components of the LC pre-coding matrix, respectively;
  the first PMI ($i_1$) includes first and second sets of indicators indicating common WB components for all layers of a plurality of layers and independent WB components for each layer of the plurality of layers, respectively;
  the second PMI ($i_2$) includes a set of indicators indicating independent SB components for each layer of the plurality of layers, and
  the plurality of layers is determined based on a value ν associated with a rank indicator (RI);
  determining the first PMI ($i_1$) and the second PMI ($i_2$); and
  transmitting, to the BS, the CSI feedback including the first PMI ($i_1$) and the second PMI ($i_2$) over an uplink channel.

11. The method of claim 10, wherein the first PMI ($i_1$) includes a first set of indicators $s_1 = [i_{1,1}\ i_{1,2}]$ indicating the plurality of L beams that comprise common WB components for all layers of the plurality of layers.

12. The method of claim 10, wherein the first PMI ($i_1$) includes a second set of indicators $$S_2 = \begin{cases} [i_{1,3,1}\ \ i_{1,4,1}] & \text{if } \nu = 1 \\ [i_{1,3,1}\ \ i_{1,4,1}\ \ i_{1,3,2}\ \ i_{1,4,2}] & \text{if } \nu = 2 \end{cases}$$

to indicate independent WB components for each layer of the plurality of ν=1 or ν=2 layers, and wherein ν=1 corresponds to a first layer and ν=2 corresponds to first and second layers, $i_{1,3,1}$ and $i_{1,3,2}$ indicate a strongest coefficient among the plurality of coefficients for each of the first layer and the second layer, respectively, and $i_{1,4,1}$ and $i_{1,4,2}$ indicate a plurality of WB amplitude coefficients for each of the first layer and the second layer, respectively.

13. The method of claim 10, wherein the second PMI ($i_2$) includes the set of indicators $$i_{2,1} = \begin{cases} [i_{2,1,1}] & \text{if } \nu = 1 \\ [i_{2,1,1}\ \ i_{2,1,2}] & \text{if } \nu = 2 \end{cases}$$

to indicate independent SB components for each layer of the plurality of ν=1 or ν=2 layers, and wherein ν=1 corresponds to a first layer and ν=2 corresponds to first and second layers, and wherein $i_{2,1,1}$ and $i_{2,1,2}$ indicate a plurality of SB phase coefficients for each of the first layer and the second layer, respectively.

14. The method of claim 10, wherein the second PMI ($i_2$) includes the set of indicators $$i_{2,2} = \begin{cases} [i_{2,2,1}] & \text{if } \nu = 1 \\ [i_{2,2,1}\ \ i_{2,2,2}] & \text{if } \nu = 2 \end{cases}$$

to indicate independent SB components for each layer of the plurality of ν=1 or ν=2 layers, and wherein ν=1 corresponds to a first layer and ν=2 corresponds to first and second layers, and wherein $i_{2,2,1}$ and $i_{2,2,2}$ indicate a plurality of SB amplitude coefficients for each of the first layer and the second layer, respectively.

15. The method of claim 10, wherein the amplitude coefficient is determined as given in table:

| Indicator | Amplitude coefficient |
|---|---|
| 0 | 0 |
| 1 | $\sqrt{1/64}$ |
| 2 | $\sqrt{1/32}$ |
| 3 | $\sqrt{1/16}$ |
| 4 | $\sqrt{1/8}$ |
| 5 | $\sqrt{1/4}$ |
| 6 | $\sqrt{1/2}$ |
| 7 | 1. |

16. The method of claim 10, wherein an LC codebook for ν=1 and ν=2 is given by:

| Layers | |
|---|---|
| ν = 1 | $W^{(1)}_{q_1,q_2,n_1,n_2,p_1^{(1)},p_1^{(2)},i_{2,1,1}} = W^1_{q_1,q_2,n_1,n_2,p_1^{(1)},p_1^{(2)},i_{2,1,1}}$ |
| ν = 2 | $W^{(2)}_{q_1,q_2,n_1,n_2,p_1^{(1)},p_1^{(2)},i_{2,1,1},p_2^{(1)},p_2^{(2)},i_{2,1,2}} =$ $\frac{1}{\sqrt{2}} [\ W^1_{q_1,q_2,n_1,n_2,p_1^{(1)},p_1^{(2)},i_{2,1,1}}\ \ \ W^2_{q_1,q_2,n_1,n_2,p_2^{(1)},p_2^{(2)},i_{2,1,2}}\ ]$ | where:

$$W^l_{q_1,q_2,n_1,n_2,p_l^{(1)},p_l^{(2)},c_l} = \frac{1}{\sqrt{N_1 N_2 \sum_{i=0}^{2L-1}(p_{l,i}^{(1)} p_{l,i}^{(2)})^2}} \begin{bmatrix} \sum_{i=0}^{L-1} v_{m_1^{(i)},m_2^{(i)}} p_{l,i}^{(1)} p_{l,i}^{(2)} \varphi_{l,i} \\ \sum_{i=0}^{L-1} v_{m_1^{(i)},m_2^{(i)}} p_{l,i+L}^{(1)} p_{l,i+L}^{(2)} \varphi_{l,i+L} \end{bmatrix}, l = 1, 2,$$

($N_1$, $N_2$) is dual polarized CSI reference signal (CSI-RS) port layout values that determine a number of CSI-RS ports $P_{CSI-RS} = 2N_1 N_2$ at the BS,
$v_{m_1^{(i)},m_2^{(i)}}$ is i-th of a plurality of L discrete Fourier transform (DFT) beams indicated by $i_{1,1}$ and $i_{1,2}$ $$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T,$$

$[p_{l,0}^{(1)}, p_{l,1}^{(1)}, \ldots, p_{l,2L-1}^{(1)}]$ are WB amplitude coefficients for layer l=1, ..., ν indicated by $i_{1,3,1}, i_{1,3,2}, i_{1,4,1}$ and $i_{1,4,2}$,
$[p_{l,0}^{(2)}, p_{l,1}^{(2)}, \ldots, p_{l,2L-1}^{(2)}]$ are SB amplitude coefficients for layer l=1, ..., ν indicated by $i_{2,2,1}$ and $i_{2,2,2}$,
$[c_{l,0}, c_{l,1}, \ldots, c_{l,2L-1}]$ are SB phase coefficient indicator for layer l=1, ..., ν, indicated by $i_{2,1,1}$ and $i_{2,1,2}$, a phase value is given by $\varphi_{l,i}=e^{j2\pi c_{l,i}/N_{PSK}}$, $O_1$ and $O_2$ are oversampling factors, $N_{PSK}$ indicates an order of phase shift keying (PSK), and v=1 corresponds to a first layer and v=2 corresponds to first and second layers.

17. The method of claim 16, wherein the CSI feedback configuration information includes a value of the plurality of L DFT beams, a value of a phase alphabet size $N_{PSK}$, and a value of ($N_1$, $N_2$), and wherein the L is determined as L∈{2,3,4}, the $N_{PSK}$ is determined as $N_{PSK}$ ∈{4,8}, and values for ($N_1$, $N_2$) and ($O_1$, $O_2$) are determined as:

| Number of CSI-RS ports, $P_{CSI-RS}$ | ($N_1$, $N_2$) | ($O_1$, $O_2$) |
|---|---|---|
| 4 | (2, 1) | (4, 1) |
| 8 | (2, 2) | (4, 4) |
|   | (4, 1) | (4, 1) |
| 12 | (3, 2) | (4, 4) |
|   | (6, 1) | (4, 1) |
| 16 | (4, 2) | (4, 4) |
|   | (8, 1) | (4, 1) |
| 24 | (4, 3) | (4, 4) |
|   | (6, 2) | (4, 4) |
|   | (12, 1) | (4, 1) |
| 32 | (4, 4) | (4, 4) |
|   | (8, 2) | (4, 4) |
|   | (16, 1) | (4, 1). |

18. The method of claim 10, wherein:
the CSI feedback configuration information includes a value of L∈{2,3,4}, a value of $N_{PSK}$ ∈{4, 8}, a value of a number of CSI-RS ports $P_{CSI-RS}$ ∈{4,8,12,16,24, 32} at the BS, and a value of d∈{1,2,3,4} where $$d \leq \min\left(\frac{P_{CSI-RS}}{2}, L\right);$$

the first PMI ($i_l$) comprises a first set of indicators $s_1=[i_{1,1}]$ indicating the plurality of L beams out of $P_{CSI-RS}/2$ antenna port selection where this selection is common for all layers of the plurality of layers; and
an LC codebook for both v=1 and v=2 is given by:

| Layers | |
|---|---|
| v = 1 | $W^{(1)}_{i_{1,1},p_1^{(1)},p_1^{(2)},i_{2,1,1}} = W^1_{i_{1,1},p_1^{(1)},p_1^{(2)},i_{2,1,1}}$ |
| v = 2 | $W^{(2)}_{i_{1,1},p_1^{(1)},p_1^{(2)},i_{2,1,1},p_2^{(1)},p_2^{(2)},i_{2,1,2}} =$ $\frac{1}{\sqrt{2}}\left[W^1_{i_{1,1},p_1^{(1)},p_1^{(2)},i_{2,1,1}} \quad W^2_{i_{1,1},p_2^{(1)},p_2^{(2)},i_{2,1,2}}\right]$ | where:

$$W^l_{i_{1,1},p_l^{(1)},p_l^{(2)},i_{2,1,l}} = \frac{1}{\sqrt{\sum_{i=0}^{2L-1}(p_{l,i}^{(1)}p_{l,i}^{(2)})^2}}\begin{bmatrix}\sum_{i=0}^{L-1}v_{i_{1,1}d+i}p_{l,i}^{(1)}p_{l,i}^{(2)}\varphi_{l,i}\\ \sum_{i=0}^{L-1}v_{i_{1,1}d+i}p_{l,i+L}^{(1)}p_{l,i+L}^{(2)}\varphi_{l,i}\end{bmatrix}, l=1,2,$$

$v_{i_{1,1}d+i}$ is i-th of the plurality of L selected antenna ports indicated by $i_{1,1}$, where $v_m$ is a $P_{CSI-RS}/2$-element column vector containing a value of 1 in element (m mod $P_{CSI-RS}/2$) and zeros elsewhere where a first element is element 0;

$[p_{l,0}^{(1)}, p_{l,1}^{(1)}, \ldots, p_{l,2L-1}^{(1)}]$ are WB amplitude coefficients for layer l=1, . . . , v indicated by $i_{1,3,1}$, $i_{1,3,2}$, $i_{1,4,1}$ and $i_{1,4,2}$, $[p_{l,0}^{(2)}, p_{l,1}^{(2)}, \ldots, p_{l,2L-1}^{(2)}]$ are SB amplitude coefficients for layer l=1, . . . , v indicated by $i_{2,2,1}$ and $i_{2,2,2}$;
$[c_{l,0}, c_{l,1}, \ldots, c_{l,2L-1}]$ are SB phase coefficient indicator for layer l=1, . . . , v, indicated by $i_{2,1,1}$ and $i_{2,1,2}$; a phase value is given by $\varphi_{l,i}=e^{j2\pi c_{l,i}/N_{PSK}}$; and v=1 corresponds to a first layer and v=2 corresponds to first and second layers.

19. A base station (BS) for channel state information (CSI) feedback in a wireless communication system, the BS comprising:
a transceiver configured to transmit, to a user equipment (UE), CSI feedback configuration information for a pre-coding matrix indicator (PMI) feedback indicating a linear combination (LC) pre-coding matrix that corresponds to a linear combination of a plurality of L beams and a plurality of coefficients, wherein:
each of the plurality of coefficients comprises at least an amplitude coefficient and a phase coefficient;
the PMI comprises a first PMI ($i_1$) and a second PMI ($i_2$) indicating wideband (WB) and subband (SB) components of the LC pre-coding matrix, respectively;
the first PMI ($i_l$) includes first and second sets of indicators indicating common WB components for all layers of a plurality of layers and independent WB components for each layer of the plurality of layers, respectively;
the second PMI ($i_2$) includes a set of indicators indicating independent SB components for each layer of the plurality of layers; and
the plurality of layers is determined based on a value v associated with a rank indicator (RI); and
at least one processor configured to reconstruct the LC pre-coding matrix indicated by the first PMI ($i_l$) and the second PMI ($i_2$), wherein the transceiver is further configured to receive, from the UE, the CSI feedback including the first PMI ($i_l$) and the second PMI ($i_2$) over an uplink channel.

20. The BS of claim 19, wherein:
the first PMI ($i_l$) includes:
a first set of indicators $s_1=[i_{1,1} \; i_{1,2}]$ indicating the plurality of L beams comprises common WB components for all layers of the plurality of layers; and
a second set of indicators $$S_2 = \begin{cases}[i_{1,3,1} \; i_{1,4,1}] & \text{if } v=1 \\ [i_{1,3,1} \; i_{1,4,1} \; i_{1,3,2} \; i_{1,4,2}] & \text{if } v=2\end{cases}$$

to indicate independent WB components for each layer of the plurality of v=1 or v=2 layers, wherein v=1 corresponds to a first layer and v=2 corresponds to first and second layers, and wherein $i_{1,3,1}$ and $i_{1,3,2}$ indicate a strongest coefficient among the plurality of coefficients for each of the first layer and the second layer, respectively, and $i_{1,4,1}$ and $i_{1,4,2}$ indicate a plurality of WB amplitude coefficients for each of the first layer and the second layer, respectively; and
the second PMI ($i_2$) includes:
the set of indicators $$i_{2,1} = \begin{cases}[i_{2,1,1}] & \text{if } v=1 \\ [i_{2,1,1} \; i_{2,1,2}] & \text{if } v=2\end{cases}$$

to indicate independent SB components for each layer of the plurality of v=1 or v=2 layers where $i_{2,1,1}$ and $i_{2,1,2}$ indicate a plurality of SB phase coefficients for each of the first layer and the second layer, respectively; and
the set of indicators $$i_{2,2} = \begin{cases} [i_{2,2,1}] & \text{if } \nu = 1 \\ [i_{2,2,1} \quad i_{2,2,2}] & \text{if } \nu = 2 \end{cases}$$

to indicate independent SB components for each layer of the plurality of v=1 or v=2 layers where $i_{2,2,1}$ and $i_{2,2,2}$ indicate a plurality of SB amplitude coefficients for each of the first layer and the second layer, respectively.

\* \* \* \* \*